US011629768B2

(12) United States Patent
Dohi et al.

(10) Patent No.: US 11,629,768 B2
(45) Date of Patent: *Apr. 18, 2023

(54) REVERSE INPUT CUTOFF CLUTCH

(71) Applicant: NSK Ltd., Tokyo (JP)

(72) Inventors: Nagao Dohi, Fujisawa (JP); Yuya Daikoku, Fujisawa (JP); Tomoyuki Miyazaki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/624,896

(22) PCT Filed: Sep. 23, 2020

(86) PCT No.: PCT/JP2020/035776
§ 371 (c)(1),
(2) Date: Jan. 5, 2022

(87) PCT Pub. No.: WO2021/054481
PCT Pub. Date: Mar. 25, 2021

(65) Prior Publication Data
US 2022/0268331 A1 Aug. 25, 2022

(30) Foreign Application Priority Data
Sep. 20, 2019 (JP) .............................. JP2019-171016
Dec. 16, 2019 (JP) .............................. JP2019-226114
(Continued)

(51) Int. Cl.
*F16D 67/02* (2006.01)
*F16D 13/14* (2006.01)
(Continued)

(52) U.S. Cl.
CPC ............. *F16D 67/02* (2013.01); *F16D 13/14* (2013.01); *F16D 41/069* (2013.01); *F16D 43/02* (2013.01);
(Continued)

(58) Field of Classification Search
CPC ...... F16D 41/069; F16D 41/08; F16D 41/084; F16D 41/10; F16D 43/02; F16D 43/211;
(Continued)

(56) References Cited

U.S. PATENT DOCUMENTS 1,617,745 A * 2/1927 Coisinard ............... F16D 59/02
192/223.3
2,031,186 A 2/1936 Still
(Continued)

FOREIGN PATENT DOCUMENTS

EP 3 663 601 A1 6/2020
JP 2018-204785 A 12/2018
(Continued)

OTHER PUBLICATIONS

Notice of Reasons for Refusal of Japanese Application No. 2021-507543 dated May 20, 2021.
(Continued)

*Primary Examiner* — Richard M Lorence
(74) *Attorney, Agent, or Firm* — Sughrue Mion, PLLC

(57) ABSTRACT

The reverse input cutoff clutch includes: a pressed member having a pressed surface around the inner peripheral surface; an input member coaxially arranged with the pressed surface and having an input-side engaging portion arranged on the radially inner side of the pressed surface; an output member coaxially arranged with the pressed surface and having an output-side engaging portion arranged further on the radially inner side than the input-side engaging portion; and an engaging element arranged so as to be movable in a first
(Continued)

direction as a direction toward or away from the pressed surface on the radially inner side of the pressed surface. The engaging element has a main engaging element body having a pressing surface and a pivot-support shaft, and a link member. The link member has a first end portion pivotally linked to the pivot-support shaft, and a second end portion pivotally linked to the input-side engaging portion.

19 Claims, 44 Drawing Sheets

(30) Foreign Application Priority Data

Mar. 6, 2020 (JP) .............. JP2020-038432
Apr. 28, 2020 (JP) .............. JP2020-079274

(51) Int. Cl.
*F16D 41/069* (2006.01)
*F16D 43/02* (2006.01)
*F16D 51/12* (2006.01)
*F16D 65/22* (2006.01)
*F16D 43/21* (2006.01)
*F16D 121/14* (2012.01)

(52) U.S. Cl.
CPC ............ *F16D 43/211* (2013.01); *F16D 51/12* (2013.01); *F16D 65/22* (2013.01); *F16D 2121/14* (2013.01)

(58) Field of Classification Search
CPC .......... F16D 51/10; F16D 51/12; F16D 59/00; F16D 59/02; F16D 65/22; F16D 67/02; F16D 13/14; F16D 2121/14; F01B 1/02; F01B 1/04

USPC ........................................ 192/223
See application file for complete search history.

(56) References Cited

U.S. PATENT DOCUMENTS

| 2,359,010 | A | * | 9/1944 | Smith | F16B 1/04 |
| | | | | | 192/223.1 |
| 2,755,396 | A | | 7/1956 | Lee et al. | |
| 3,024,884 | A | * | 3/1962 | Sieber | F16B 1/04 |
| | | | | | 188/82.8 |
| 3,335,831 | A | * | 8/1967 | Kains | F16B 1/04 |
| | | | | | 74/625 |
| 5,007,511 | A | * | 4/1991 | Ostrander | F16D 59/00 |
| | | | | | 192/223 |
| 11,300,166 | B2 | * | 4/2022 | Dohi | F16D 41/069 |
| 11,415,185 | B2 | * | 8/2022 | Dohi | F16D 59/00 |
| 2018/0195560 | A1 | | 7/2018 | Chino | |

FOREIGN PATENT DOCUMENTS

WO 2007/086127 A1 8/2007
WO 2019/026794 A1 2/2019

OTHER PUBLICATIONS

International Search Report of PCT/JP2020/035776 dated Dec. 8, 2020 [PCT/ISA/210].
Supplementary European Search Report dated Sep. 6, 2022 in European Application No. 20 86 5188.

* cited by examiner

REVERSE INPUT CUTOFF CLUTCH

CROSS REFERENCE TO RELATED APPLICATIONS

This application is a National Stage of International Application No. PCT/JP2020/035776, filed Sep. 23, 2020, claiming priorities to Japanese Patent Application No. 2019-171016, filed Sep. 20, 2019, Japanese Patent Application No. 2019-226114, filed Dec. 16, 2019, Japanese Patent Application No. 2020-038432, filed Mar. 6, 2020 and Japanese Patent Application No. 2020-079274, filed Apr. 28, 2020.

TECHNICAL FIELD

The present invention relates to a reverse input cutoff clutch that transmits rotational torque that is inputted to an input member to an output member; however, completely cuts off rotational torque that is reversely inputted to the output member and does transmit the reversely inputted torque to the input member, or transmits only a part of the reversely inputted torque and cuts off the remaining part.

BACKGROUND ART

The reverse input cutoff clutch includes an input member that is connected to an input-side mechanism such as a drive source or the like, and an output member that is connected to an output-side mechanism such as a speed-reducing mechanism or the like, and has a function of transmitting rotational torque that is inputted to the input member to the output member; however, completely cutting off rotational torque that is reversely inputted to the output member and not transmitting the reversely inputted torque to the input member, or transmitting only a part of the reversely inputted torque and cutting off the remaining part.

FIG. 38 to FIG. 44 illustrate an example of conventional construction of a reverse input cutoff clutch such as described in WO 2019/026794.

A reverse input cutoff clutch 101 includes an input member 102, an output member 103, a pressed member 104, and a pair of engaging elements 105.

The input member 102 is connected to an input-side mechanism such as an electric motor or the like, and rotational torque is inputted to the input member 102. The input member 102, as illustrated in FIG. 40, has an input-shaft portion 106, and a pair of input-side engaging portions 107. A small-diameter base-end portion of the input-shaft portion 106 is connected to an output portion of the input-side mechanism. The pair of input-side engaging portions 107 are configured by convex portions that extend in the axial direction from two locations on the tip-end surface of the input-shaft portion 106 on opposites sides in the radial direction.

The output member 103 is connected to an output-side mechanism such as a speed-reducing mechanism or the like, and outputs rotational torque. The output member 103 is coaxially arranged with the input member 102, and as illustrated in FIG. 41, has an output-shaft portion 108 and an output-side engaging portion 109. The base-end portion of the output-shaft portion 108 is connected to the input portion of the output-side mechanism. The output-side engaging portion 109 has an elliptical columnar shape that extends in the axial direction from the central portion of the tip-end surface of the output-shaft portion 108. The output-side engaging portion 109 is arranged in a portion between the pair of input-side engaging portions 107.

The pressed member 104, as illustrated in FIG. 39 has an annular shape, and by being fastened to another member (not illustrated) such as a housing or the like, the rotation of the pressed member 104 is restricted. The pressed member 104 is coaxially arranged with the input member 102 and the output member 103, and is arranged on the outer side in the radial direction of the pair of input-side engaging portions 107 and the output-side engaging portion 109. The inner peripheral surface of the pressed member 104 is configured by a pressed surface 110 that is a cylindrical shaped concave surface.

Each of the pair of engaging elements 105 has a semi-circular plate shape, and is arranged on the inner side in the radial direction of the pressed member 104. The pair of engaging elements 105 has outer side surfaces in the radial direction that face the pressed surface 110, and inner side surfaces in the radial direction that face each other. The outer side surface in the radial direction of each of the pair of engaging elements 105 is configured by a pressing surface 111 that is a partially cylindrical shaped convex surface, and each inner side surface in the radial direction is configured by a bottom surface 112 that is a flat surface except for a portion where an output-side engaged portion 114 (described later) is formed. The radius of curvature of the pressing surface 111 is equal to or less than the radius of curvature of the pressed surface 110. Note that the radial direction of the engaging element 105 refers to a direction orthogonal to the bottom surface 112 as indicated by an arrow α in FIG. 38, and the direction parallel to the bottom surface 112 indicated by an arrow 13 in FIG. 38 refers to the width direction of the engaging element 105.

In a state in which the pair of engaging elements 105 is arranged on the inner side in the radial direction of the pressed member 104, the inner-diameter dimension of the pressed member 104 and the dimension in the radial direction of the engaging elements 105 are regulated so that there is a gap in at least one of the portion between the pressed surface 110 and the pressing surface 111, and the portion between the bottom surfaces 112.

Each of the pair of engaging elements 105 has an input-side engaged portion 113 and an output-side engaged portion 114. The input-side engaged portion 113 is configured by a hole that penetrates in the axial direction through a central portion in the radial direction of the engaging element 105. The input-side engaged portion 113 has a size such that the input-side engaging portion 107 may be loosely inserted therein. Therefore, the input-side engaging portion 107 is able to displace in the direction of rotation of the input member 102 with respect to the input-side engaged portion 113 (engaging element 105), and the input-side engaged portion 113 (engaging element 105) is able to displace in the radial direction of the engaging element 105 with respect to the input-side engaging portion 107. The output-side engaged portion 114 is configured by a substantially rectangular concave portion that is recessed outward in the radial direction from a central portion in the width direction of the bottom surface 112 of the engaging element 105. The output-side engaged portion 114 has a size such that a front-half portion in the minor axis direction of the output-side engaging portion 109 can be arranged on the inner side thereof.

In the assembled state of the reverse input cutoff clutch 101, the pair of input-side engaging portions 107 of the input member 102 that is arranged on one side in the axial direction is inserted in the axial direction into the input-side engaged portions 113 of the pair of engaging elements 105, and the output-side engaging portion 109 of the output member 103 that is arranged on the other side in the axial direction is inserted in the axial direction between the pair of output-side engaged portions 114. In other words, the pair of engaging elements 105 is arranged so that the output-side engaged portions 114 sandwich the output-side engaging portion 109 from the outer sides in the radial direction.

As illustrated in FIG. 42, when a rotational torque is inputted to the input member 102 from the input-side mechanism, the input-side engaging portions 107 rotate on the inner side of the input-side engaged portions 113 in the direction of rotation of the input member 102 (clockwise direction in the example in FIG. 42). When this occurs, the inner side surfaces in the radial direction of the input-side engaging portions 107 press the inner surfaces of the input-side engaged portions 113 inward in the radial direction, which causes each of the pair of engaging elements 105 to move in directions away from the pressed surface 110. As a result, the pair of output-side engaged portions 114 sandwiches the output-side engaging portion 109 of the output member 103 from both sides in the radial direction, and the output-side engaging portion 109 and the pair of output-side engaged portions 114 engage with no looseness. As a result, rotational torque that is inputted to the input member 102 is transmitted to the output member 103 through the pair of engaging elements 105 and outputted from the output member 103.

On the other hand, as illustrated of FIG. 43, when rotational torque is reversely inputted to the output member 103 from the output-side mechanism, the output-side engaging portion 109 rotates on the inner side of the pair of output-side engaged portions 114 in the direction of rotation (clockwise direction in the example in FIG. 43) of the output member 103. When this occurs, corner portions of the output-side engaging portion 109 presses the bottom surfaces of the output-side engaged portions 114 outward in the radial direction, which causes each of the pair of engaging elements 105 to move toward the pressed surface 110. As a result, the pressing surfaces 111 of the pair of engaging elements 105 are pressed against the pressed surface 110 of the pressed member 104. As a result, rotational torque that is reversely inputted to the output member 103 is transmitted to the pressed member 104 that is fixed to another member (not illustrated) and completely cut off and not transmitted to the input member 102, or only a part of the rotational torque reversely inputted to the output member 103 is transmitted to the input member 102 and the remaining part is cut off.

In order that rotational torque that is reversely inputted to the output member 103 is completely cut off so as not to be transmitted to the input member 102, the output member 103 is locked by wedging the pair of engaging elements 105 between the output-side engaging portion 109 and the pressed member 104 so that the pressing surfaces 111 do not slide with respect to (rotate relative to) the pressed surface 110. On the other hand, in order that only a part of rotational torque that is reversely inputted to the output member 103 is transmitted to the input member 102 and the remaining portion is cut off, the output member 103 is semi-locked by wedging the pair of engaging elements 105 between the output-side engaging portion 109 and the pressed member 104 so that the pressing surfaces 111 slide with respect to the pressed surface 110. In a state in which the output member 103 is semi-locked and rotational torque is further reversely inputted to the output member 103, the pair of engaging elements 105, due to the engagement between the output-side engaging portion 109 and the output-side engaged portions 114, rotate around the center of rotation of the output member 103 while allowing the pressing surfaces 111 to slide with respect to the pressed surface 110. When the pair of engaging elements 105 rotate, the inner surfaces of the input-side engaged portion 113 press the inner side surfaces in the radial direction of the input-side engaging portions 107 in the circumferential direction (direction of rotation), and part of the rotational torque of the input member 102 is transmitted.

CITATION LIST

Patent Literature

Patent Literature 1: WO 2019/026794

SUMMARY OF INVENTION

Technical Problem

In the case of the conventional reverse input cutoff clutch 101 described above, there is room for improvement from that aspect of smoothly switching from a locked or semi-locked state as illustrated in FIG. 43 to an unlocked state as illustrated in FIG. 42 as rotational torque is inputted to the input member 102.

In the conventional construction, as illustrated in FIG. 44, when rotational torque T is inputted to the input member 102 from the locked state or semi-locked state illustrated in FIG. 43, the input-side engaging portions 107 of the input member 102 come in contact with the input-side engaged portions 113 of the engaging elements 105, and translational loads Ft due to the rotational torque T (T=Ft*R) (R is the distance from the center of rotation O of the input member 102 to the area of contact X) act on the areas of contact X between the input-side engaging portions 107 and the input-side engaged portions 113. The directions of the translational loads Ft, or in other words, the directions of the loads acting on the engaging elements 105 from the input member 102 are largely inclined with respect to the radial direction of the engaging elements 105 (directions the engaging elements 105 move when going toward or away from the pressed surface 110), which are directions in which the engaging elements 105 move when switching from the locked state or semi-locked state to the unlocked state. From the aspect of smoothly performing switching from the locked state or semi-locked state to the unlocked state, it is preferable that the directions of the loads acting on the engaging elements 105 from the input member 102 are mostly parallel with the radial direction of the engaging elements 105.

In consideration of the situation described above, an object of the present invention is to achieve construction of a reverse input cutoff clutch that is capable of smoothly performing switching from a locked state or semi-locked state to an unlocked state when rotational torque is inputted to a input member.

Solution to Problem

The reverse input cutoff clutch according to one aspect of the present invention includes: a pressed member, an input member, an output member, and an engaging element.

The pressed member has a pressed surface around an inner peripheral surface thereof.

The input member has an input-side engaging portion arranged on an inner side in a radial direction of the pressed surface, and is coaxially arranged with the pressed surface.

The output member has an output-side engaging portion on the inner side in the radial direction of the pressed surface arranged further on the inner side in the radial direction than the input-side engaging portion, and is coaxially arranged with the pressed surface.

The engaging element has a main engaging element body and a link member, and is arranged on the inner side in the radial direction of the pressed surface so as to be able to move in a first direction as a direction away from or toward the pressed surface.

The main engaging element body has a pressing surface that faces the pressed surface, a pivot-supporting portion located on a side nearer to the pressed surface than the input-side engaging portion in the first direction, and an output-side engaged portion that engages with the output-side engaging portion.

The link member has a first end portion that is pivotally linked to the pivot-supporting portion, and a second end portion that is pivotally linked to the input-side engaging portion.

The engaging element, by the pivot-supporting portion being pulled by the input-side engaging portion through the link member when a rotational torque is inputted to the input member, displaces so as to move away from the pressed surface, and by causing the output-side engaged portion to engage with the output-side engaging portion, transmits the rotational torque inputted to the input member to the output member; and when rotational torque is reversely inputted to the output member, by pressing the pressing surface against the pressed surface due to engagement between the output-side engaging portion and the output-side engaged portion, causes the pressing surface to frictionally engage with the pressed surface.

In one aspect of the present invention, the main engaging element body has an insertion hole; the input-side engaging portion is inserted through the insertion hole; and between the input-side engaging portion and the inner surface of the insertion hole, there is a gap that allows the input-side engaging portion to displace in the direction of rotation of the input member with respect to the main engaging element body, and there is a gap that allows the main engaging element body to displace in the first direction with respect to the input-side engaging portion.

In one aspect of the present invention, the main engaging element body includes: a pair of main body plates that are coupled together and arranged so as to overlap in the axial direction of the pressed surface; and a pivot-support shaft, with both side portions in the axial direction of the pivot-support shaft being supported by the pair of main body plates; the output-side engaged portion is provided in the pair of main body plates; the pivot-supporting portion is configured by the pivot-support shaft; and the link member is arranged between the pair of main body plates.

In one aspect of the present invention, the main engaging element body further includes an intermediate plate between the main body plates on both side portions in a second direction, the second direction being orthogonal to both the first direction and the axial direction of the pressed surface, and held in the axial direction between the main body plates; wherein the pivot-support shaft is supported on both side portions in the axial direction of the pivot-support shaft in an intermediate portion in the second direction of the pair of main body plates; and the link member is pivotally arranged in the intermediate portion in the second direction between the pair of main body plates.

In one aspect of the present invention, the pressing surface is provided on the pair of main body plates.

Alternatively, in one aspect of the present invention, the pressing surface is provided on the intermediate plate.

In one aspect of the present invention, both side portions in the axial direction of the pivot-support shaft are rotatably supported by the pair of main body plates.

In one aspect of the present invention, the main engaging element body includes a main body plate, and a pivot-support shaft, the base-end side portion in the axial direction of the pivot-support shaft being supported by the main body plate in a cantilever form; the pressing surface and the output-side engaged portion are provided on the main body plate; and the pivot-supporting portion is configured by the pivot-support shaft.

In one aspect of the present invention, a pair of the engaging elements is provided so as to sandwich the output-side engaging portion from both side in the radial direction, and the input member includes a pair of the input-side engaging portions.

In one aspect of the present invention, a biasing member is arranged between the pair of engaging elements and elastically presses each of the engaging elements in a direction toward the pressed surface.

In one aspect of the present invention, the biasing member is a coil spring; and the main engaging element body has a holding convex portion that holds the coil spring by being inserted into the coil spring.

In one aspect of the present invention, the intermediate plate of the main engaging element body has the holding convex portion.

In one aspect of the present invention, the biasing member is a coil spring; and the main engaging element body has a holding concave portion that holds the coil spring by an end portion of the coil spring being inserted into the holding concave portion.

In one aspect of the present invention, the holding concave portion is open on a far side in the first direction from the pressed surface, and is covered on both sides in the axial direction of the pressed surface.

In one aspect of the present invention, the intermediate plate of the main engaging element body has the holding concave portion.

In one aspect of the present invention, the holding concave portion is configured by a notch provided in an end portion of the intermediate plate on a far side in the first direction from the pressed surface; and openings on both sides of the notch in the axial direction of the pressed surface are covered by the pair of main body plates.

In one aspect of the present invention, a reinforcing member that spans between tip-end portions of the input-side engaging portions is further provided.

In one aspect of the present invention, the output-side engaged portion is configured by a concave portion provided on a side surface of the main engaging element body on a far side from the pressed surface in the first direction; the inner surface of the concave portion has a pair of guided surfaces on both side portions in the second direction that is orthogonal to both the first direction and the axial direction of the pressed surface, with the pair of guided surface facing each other in the second direction; the output-side engaging portion has a pair of guide surfaces at two locations facing the pair of guided surfaces; and by the pair of guided surfaces being guided by the pair of guide surfaces when the engaging element displaces in a direction away from the pressed surface in the first direction due to rotational torque being inputted to the input member, the engaging element is restricted so as to move in the second direction.

In one aspect of the present invention, the pair of guided surfaces is configured by a pair of concave curved surfaces inclined in directions such that a space between the pair of guided surfaces becomes larger as going in a direction away from the pressed surface in the first direction; and the pair of guide surfaces are configured by a pair of convex curved surfaces that are capable of coming in contact with the pair of concave curved surfaces.

Advantageous Effects of Invention

With the reverse input cutoff clutch according to one aspect of the present invention, it is possible to smoothly perform switching from a state in which a pressing surface is pressed against a pressed surface (a locked state or semi-locked state) to a state in which the pressing surface is separated from the pressed surface (a unlocked state) when a rotational torque is inputted to an input member.

BRIEF DESCRIPTION OF DRAWINGS

FIG. 19A (b) is a view illustrating a state after rotational torque has been inputted to the input member from the state illustrated in FIG. 19A (a); FIG. 19B (b) is a view illustrating a state after rotational torque has been inputted to the input member from the state illustrated in FIG. 19B (a).

DESCRIPTION OF EMBODIMENTS

First Example

Figure 1:
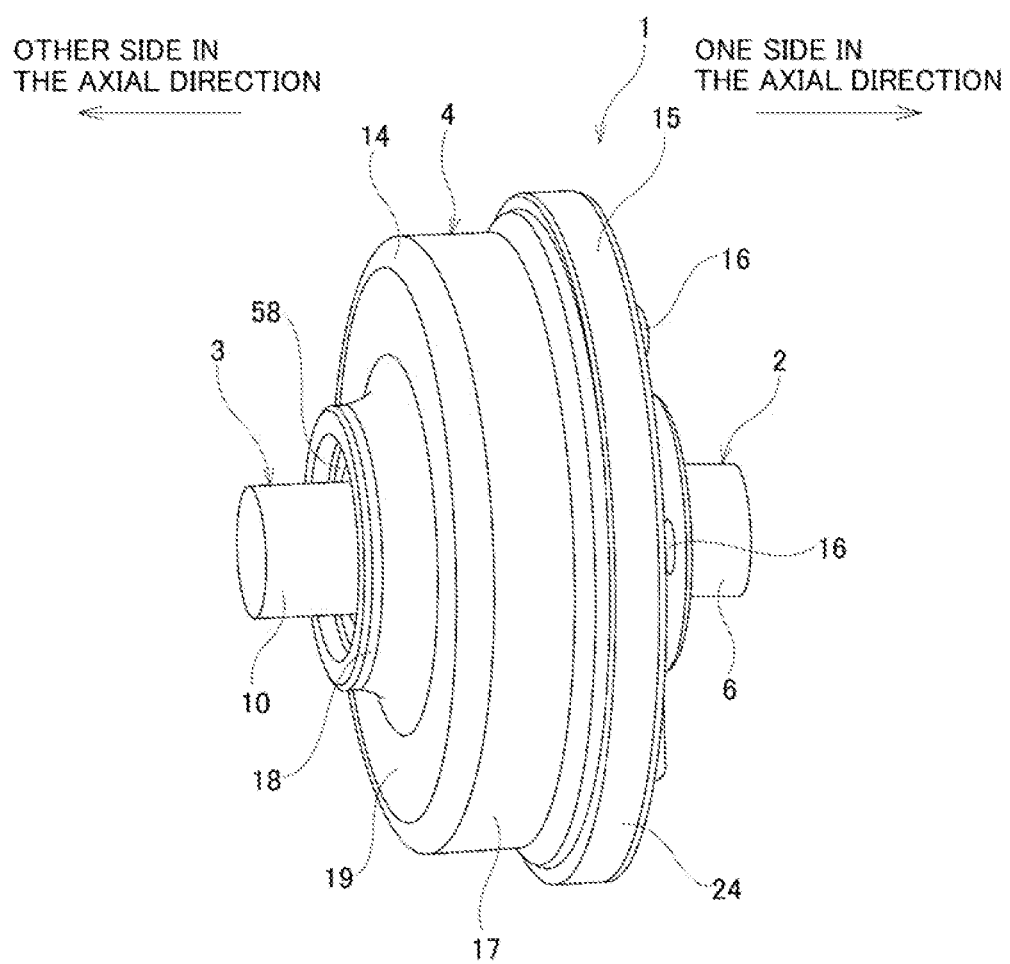
FIG. 1 is a perspective view of a reverse input cutoff clutch of a first example of an embodiment of the present invention.
Figure 2:
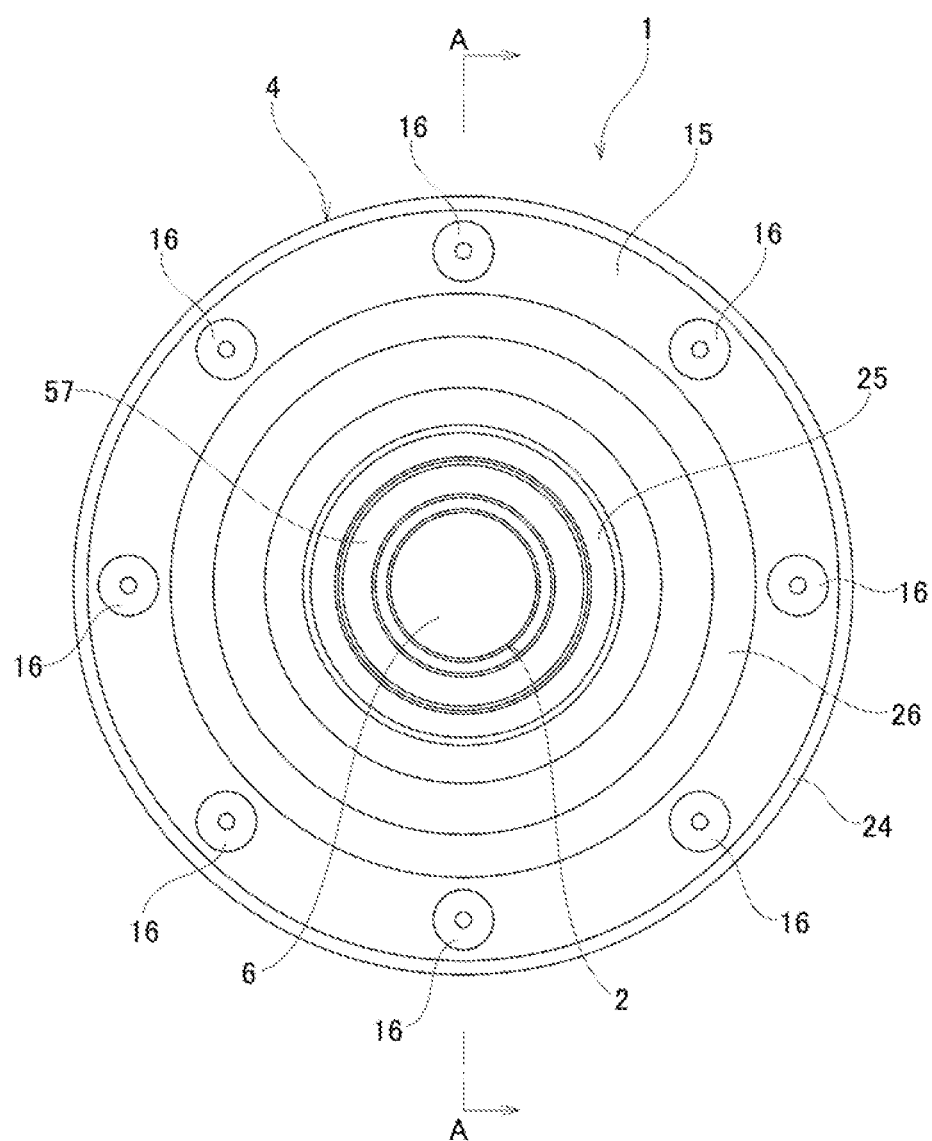
FIG. 2 is a view of the reverse input cutoff clutch of the first example as viewed in the axial direction from the right in FIG. 1.

A first example of an embodiment of the present invention will be described using FIG. 1 to FIG. 20.

Note that in the description below, the axial direction, the radial direction, and the circumferential direction, unless stated otherwise, refer to the axial direction, the radial direction, and the circumferential direction of a reverse input cutoff clutch 1. In this example, the axial direction, the radial direction, and the circumferential direction of the reverse input cutoff clutch 1 coincides with the axial direction, the radial direction, and the circumferential direction of an input member 2 and coincides with the axial direction, the radial direction, and the circumferential direction of an output member 3. In the case of the reverse input cutoff clutch 1, one side in the axial direction is the right side in FIG. 1, FIG. 3, FIG. 4, FIG. 9, FIG. 12, FIG. 13, and FIG. 15 to FIG. 18, and the other side in the axial direction is the left side in FIG. 1, FIG. 3, FIG. 4, FIG. 9, FIG. 12, FIG. 13, and FIG. 15 to FIG. 18.

[Construction of the Reverse Input Cutoff Clutch]

The reverse input cutoff clutch 1 of this example includes an input member 2, an output member 3, a housing 4 as a pressed member, a pair of engaging elements 5, and a pair of biasing members 56. The reverse input cutoff clutch 1 has a reverse input cutoff function that transmits rotational torque that is inputted to the input member 2 to the output member 3; however, completely cuts off rotational torque that is inputted to the output member 3 and does not transmit the rotational torque to the input member 2, or transmits a part of the rotational torque to the input member 2 and cuts off the remaining part.

(Input Member 2)

Figure 3:
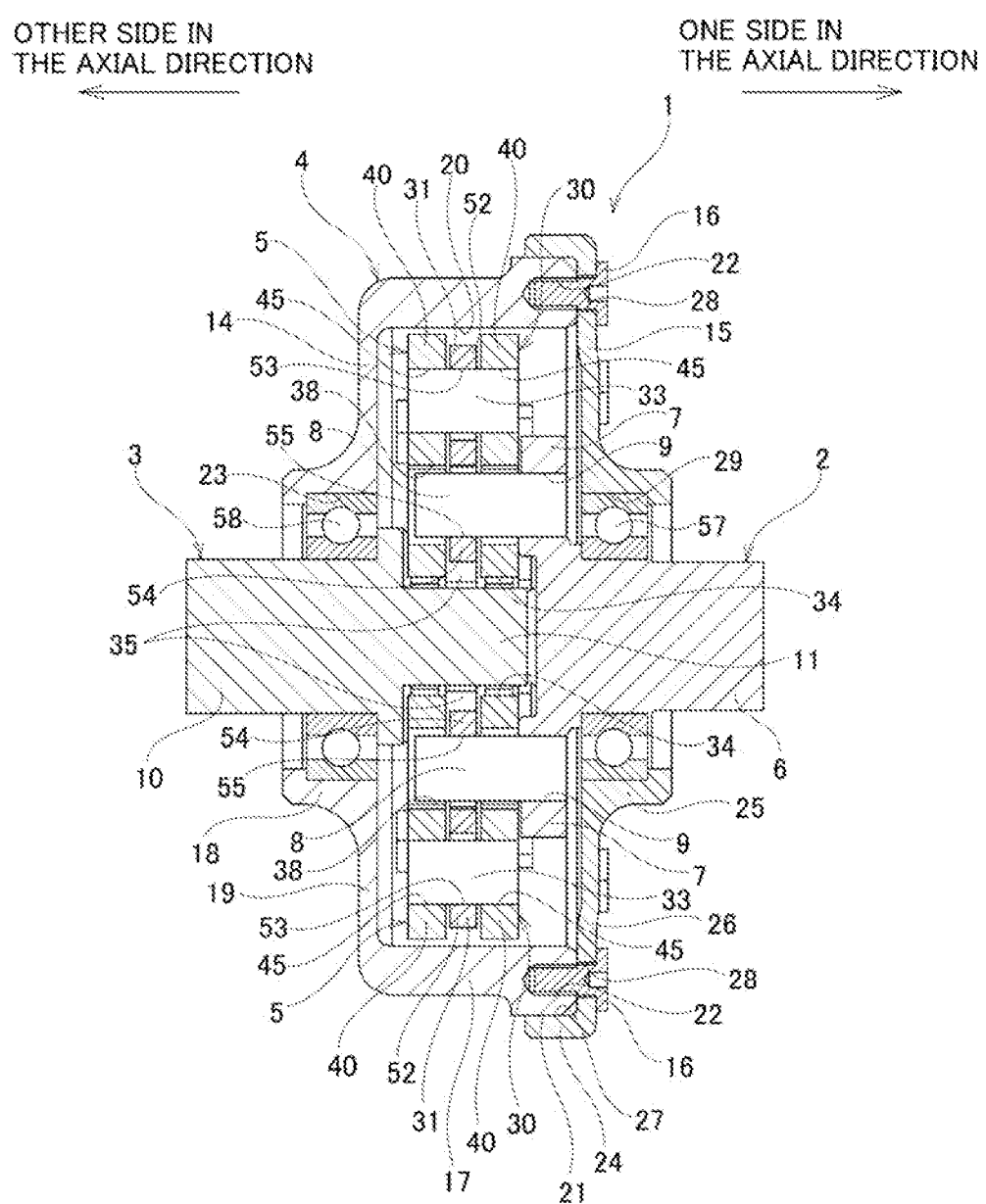
FIG. 3 is a cross-sectional view of section A-A in FIG. 2.
Figure 4:
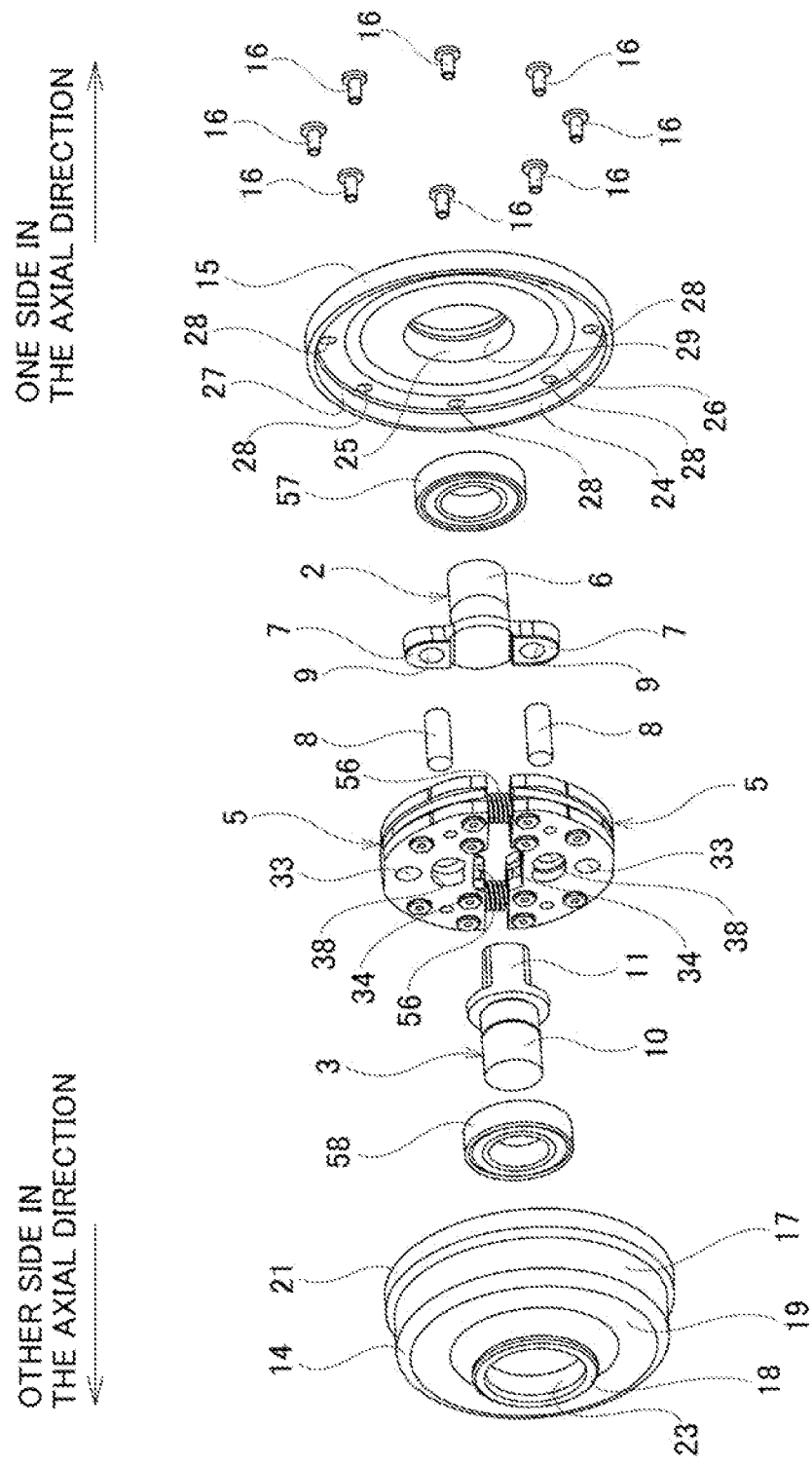
FIG. 4 is an exploded perspective view of the reverse input cutoff clutch of the first example.

The input member 2 is connected to an input-side mechanism such as an electric motor or the like, and rotational torque is inputted to the input member 2. As illustrated in FIG. 3 and FIG. 4, for example, the input member 2 has an input-shaft portion 6, a pair of input-arm portions 7, and a pair of input-side engaging portions 8. The input-shaft portion 6 has a columnar shape, and an end portion on the one side in the axial direction of the input-shaft portion 6 is connected to an output portion of the input-side mechanism. The pair of input-arm portions 7 extend from an end portion on the other side in the axial direction of the input-shaft portion 6 toward the opposite sides in the radial direction from each other, and have support holes 9 that are through holes in the axial direction. Each of the pair of input-side engaging portions 8 is configured by a columnar shaped pin, and the end portion on the one side in the axial direction of each of the input-side engaging portions is pressure fitted and fixed inside the corresponding support hole 9 of the pair of input-arm portions 7. In this state, the pair of input-side engaging portions 8 extend toward the one side in the axial direction from the pair of input-arm portions 7. Note that the input member can be integrally configured (as a single part) as a whole.

(Output Member 3)

The output member 3 is connected to an output-side mechanism such as a speed-reducing mechanism or the like, and outputs rotational torque. The output member 3 is coaxially arranged with the input member 2, and as illustrated in FIG. 3 and FIG. 4, for example, has an output-shaft portion 10 and an output-side engaging portion 11. The output-shaft portion 10 has a columnar shape, and an end portion on the other side in the axial direction of the output-shaft portion 10 is connected to an input portion of the output-side mechanism. The output-side engaging portion 11 has an oblong columnar shape, and extends toward the one side in the axial direction from a central portion of the end surface of the one side in the axial direction of the output-shaft portion 10. The outer peripheral surface of the output-side engaging portion 11, as illustrated in FIG. 5, FIG. 6, FIG. 20A and FIG. 20B, for example, has side surfaces 12 on both sides in the minor axis direction (vertical direction in FIG. 5, FIG. 6, FIG. 20A and FIG. 20B), and a pair of guide surfaces 13 as the side surfaces on both sides in the major axis direction (horizontal direction in FIG. 5, FIG. 6, FIG. 20A and FIG. 20B).

Each of the pair of side surfaces 12 is configured by a flat surface that is orthogonal to the minor axis direction of the output-side engaging portion 11. Each of the pair of guide surfaces 13 is configured by a convex surface. More specifically, each of the pair of guide surfaces 13 is configured by a partially cylindrical shaped convex surface that is centered on the center axis of the output-side engaging portion 11 (center axis of the output member 3). Therefore, regarding the output member 3, the outer peripheral surface of a round bar material, for example, can be used for the pair of guide surfaces 13, and the processing cost can be suppressed accordingly. However, in a case of implementing the present invention, the convex surfaces of the pair of guide surfaces may be partially cylindrical shaped convex surfaces centered on an axis parallel to the center axis of the output member 3, or may be non-cylindrical shaped convex surfaces such as partially elliptical shaped convex surfaces or the like. Moreover, in this example, the output-shaft portion 10 and the output-side engaging portion 11 are integrally manufactured; however, in a case of implementing the present invention, an output-shaft portion and an output-side engaging portion that are separately manufactured from each other may be coupled and fixed together. The output-side engaging portion 11 is arranged further on the inner side in the radial direction than the pair of input-side engaging portions 8, and more specifically, is arranged in a portion between the pair of input-side engaging portions 8.

(Housing 4)

The housing 4, as illustrated in FIG. 1 to FIG. 4, for example, has a hollow circular disk shape, is fixed to another member (not illustrated) and the rotation of the housing 4 is restricted. The housing 4 is coaxially arranged with the input member 2 and the output member 3, and houses the pair of input-side engaging portions 8, the output-side engaging portion 11, the pair of engaging elements 5, the pair of biasing members 56 and the like on the inner side thereof. The housing 4 is configured by coupling together an output-side housing element (main housing body) 14 arranged on the other side in the axial direction and an input-side housing element (housing cover) 15 arranged on the one side in the axial direction by a plurality of bolts 16.

The output-side housing element 14 includes an outer-diameter-side tubular portion 17, an inner-diameter-side tubular portion 18, and a side plate portion 19. The outer-diameter-side tubular portion 17 has a cylindrical shape. The inner-diameter-side tubular portion 18 has a cylindrical shape that is coaxially arranged with the outer-diameter-side tubular portion 17 on the other side in the axial direction of the outer-diameter-side tubular portion 17. The side plate portion 19 has an annular plate shape, and an end portion on the outer side in the radial direction of the side plate portion 19 is coupled with an end portion on the other side in the axial direction of the outer-diameter-side tubular portion 17, and an end portion on the inner side in the radial direction of the side plate portion 19 is coupled with an end portion on the one side in the axial direction of the inner-diameter-side tubular portion 18.

The inner peripheral surface of the outer-diameter-side tubular portion 17 forms a pressed surface 20 composed of a cylindrical surface centered on the center axis of the output-side housing element 14. The outer-diameter-side tubular portion 17 has an output-side in-row fitting surface 21 around the outer peripheral surface of the end portion on the one side in the axial direction having an outer-diameter dimension that is larger than that of the outer peripheral surface of a portion adjacent on the other side in the axial direction. The output-side in-row fitting surface 21 is configured by a cylindrical surface centered on the center axis of the output-side housing element 14. The outer-diameter-side tubular portion 17 has screw holes 22 at a plurality of locations (eight locations in the illustrated example) that are evenly spaced in the circumferential direction in the end portion on the one side in the axial direction, and that open to the one side in the axial direction. The inner-diameter-side tubular portion 18 has an output-side bearing fitting surface 23 along a portion from the end portion to an intermediate portion on the one side in the axial direction of the inner peripheral surface. The output-side bearing fitting surface 23 is configured by a cylindrical surface centered on the center axis of the output-side housing element 14. In other words, the pressed surface 20, the output-side in-row fitting surface 21, and the output-side bearing fitting surface 23 are coaxially arranged with each other.

The input-side housing element 15 includes an outer-diameter-side tubular portion 24, an inner-diameter-side tubular portion 25, and a side plate portion 26. The outer-diameter-side tubular portion 24 has a cylindrical shape. The inner-diameter-side tubular portion 25 has a cylindrical shape that is coaxially arranged with the outer-diameter-side tubular portion 24 on the one side in the axial direction of the outer-diameter-side tubular portion 24. The side plate portion 26 has an annular plate shape, and an end portion on the outer side in the radial direction of the side plate portion 26 is coupled with an end portion on the one side in the axial direction of the outer-diameter-side tubular portion 24, and an end portion on the inner side in the radial direction of the side plate portion 26 is coupled with an end portion on the other side in the axial direction of the inner-diameter-side tubular portion 25.

The outer-diameter-side tubular portion 24 has an input-side in-row fitting surface 27 around the inner peripheral surface. The input-side in-row fitting surface 27 is configured by a cylindrical surface centered on the center axis of the input-side housing element 15. The input-side in-row fitting surface 27 has an inner-diameter dimension capable of fitting with the output-side in-row fitting surface 21 of the output-side housing element 14 without looseness. The side plate portion 26 has through holes 28 at a plurality of locations evenly spaced in the circumferential direction in the end portion on the outer side in the radial direction and aligned with the screw holes 22 of the output-side housing element 14. The inner-diameter-side tubular portion 25 has an input-side bearing fitting surface 29 along a portion from the end portion to an intermediate portion on the other side in the axial direction of the inner peripheral surface. The input-side bearing fitting surface 29 is configured by a cylindrical surface centered on the center axis of the input-side housing element 15. In other words, the input-side in-row fitting surface 27 and the input-side bearing fitting surface 29 are coaxially arranged with each other.

The housing 4 is assembled by coupling and fixing the output-side housing element 14 and the input-side housing element 15 together by fitting the input-side in-row fitting surface 27 of the input-side housing element 15 with the output-side in-row fitting surface 21 of the output-side housing element 14 so there is no looseness, and screwing the bolts 16 that are inserted through the through holes 28 of the input-side housing element 15 into the screw holes 22 of the output-side housing element 14 and further tightening. In this example, the output-side in-row fitting surface 21 of the output-side housing element 14 and the output-side bearing fitting surface 23 are coaxially arranged with each other, and the input-side in-row fitting surface 27 of the input-side housing element 15 and the input-side bearing fitting surface 29 are coaxially arranged with each other. Therefore, in the assembled state of the housing 4 in which the output-side in-row fitting surface 21 is fitted without looseness with the input-side in-row fitting surface 27, the input-side bearing fitting surface 29 and the output-side bearing fitting surface 23 are coaxially arranged with each other.

In the assembled state of the housing 4, the input-shaft portion 6 of the input member 2 is rotatably supported by an input-side bearing 57 so as to be able to rotate with respect to the input-side bearing fitting surface 29 of the input-side housing element 15. Moreover, the output-shaft portion 10 of the output member 3 is rotatably supported by an output-side bearing 58 so as to be able to rotate with respect to the output-side bearing fitting surface 23 of the output-side housing element 14. As a result, the input member 2 and the output member 3 are coaxially arranged with each other, and coaxially arranged with the pressed surface 20 of the housing 4. Furthermore, in this state, the pair of input-side engaging portions 8 and the output-side engaging portion 11 are arranged on the inner side in the radial direction of the pressed surface 20 of the housing 4. Note that regarding the reverse input cutoff clutch 1, in a case where it is desired to increase the performance level of switching from a locked state or semi-locked state (described later) to an unlocked state (lock releasing performance) or the like, it is necessary that the coaxality and inclination of the input member 2 and the output member 3 be strictly managed. In such a case, it is possible to apply methods of common bearing usage such as changing each of the input-side bearing 57 and the output-side bearing 58 from single-row rolling bearings as illustrated in the drawings to double-row rolling bearings or the like.

(Pair of Engaging Elements 5)

The reverse input cutoff clutch 1 of this example includes a pair of engaging elements 5. The pair of engaging elements 5 is arranged on the inner side in the radial direction of the pressed surface 20. Each of the pair of engaging elements 5 includes a main engaging element body 30, and a link member 31 that is pivotally linked to the main engaging element body 30.

(Main Engaging Element Body 30)

In the construction of this example, each main engaging element body 30, as illustrated in FIG. 13 to FIG. 18, is configured by combining a plurality of parts. In the following, the construction of the assembled main engaging element body 30 will be described, after which the construction of each part of the main engaging element body 30 will be described.

The main engaging element body 30 has a substantially semi-circular plate shape and includes a pair of pressing surfaces 32 facing the pressed surface 20, a pivot-support shaft 33 as a pivot-supporting portion, and an output-side engaged portion 34 that engages with the output-side engaging portion 11.

In this example, the outer peripheral surface of the main engaging element body 30 is configured by a convex arc-shaped outer-side surface in the radial direction that corresponds to the arc of the main engaging element body 30, and a crank-shaped inner-side surface in the radial direction corresponding to the chord of the main engaging element body 30. Note that the radial direction of the main engaging element body 30 refers to a direction indicated by arrow a in FIG. 5 that is orthogonal to the chord of the main engaging element body 30. Moreover, the width direction of the main engaging element body 30 refers to a direction indicated by arrow 13 in FIG. 5 that is parallel to the chord of the main engaging element body 30. Note that in this example, the radial direction of the main engaging element body 30 is the direction of movement of the main engaging element body 30 (engaging element 5) when moving away from or toward the pressed surface 20 and corresponds to a first direction. Furthermore, in this example, the width direction of the main engaging element body 30 corresponds to a second direction that is orthogonal to both the first direction and to the axial direction of the pressed surface 20.

In this example, the pair of engaging elements 5 is arranged on the inner side in the radial direction of the pressed surface 20 in a state in which the outer-side surfaces in the radial direction of the main engaging element bodies 30 are faced toward the opposite sides and the inner-side surfaces in the radial direction of the main engaging element bodies 30 are faced toward each other. In a state in which the pair of engaging elements 5 is arranged on the inner side in the radial direction of the pressed surface 20, the inner-diameter dimension of the pressed surface 20 and the dimension in the radial direction of the main engaging element bodies 30 are regulated so that there are gaps in at least portions between the pressed surface 20 and the outer-side surfaces in the radial direction of the main engaging element bodies 30 and a portion between the inner-side surfaces in the radial direction of the main engaging element bodies 30 that allow the main engaging element bodies 30 to move in the radial direction.

Each main engaging element body 30 has a pair of pressing surfaces 32 on the outer-side surface in the radial direction. The pair of pressing surfaces 32, in the locked state or semi-locked state of the output member 3, are portions that are pressed against the pressed surface 20, and are arranged on both side portions in the circumferential direction of the outer-side surface in the radial direction of the main engaging element body 30 so as to be separated in the circumferential direction. Each of the pair of pressing surfaces 32 protrudes further toward the pressed surface 20 than the portions of the outer-side surface in the radial direction of the main engaging element body 30 that are separated from the pressing surface 32 in the circumferential direction. Each of the pair of pressing surfaces 32 is a partial cylindrical shaped convex surface having a radius of curvature that is smaller than the radius of curvature of the pressed surface 20. The portions of the outer-side surface in the radial direction of the main engaging element body 30 that are separated in the circumferential direction from the pair of pressing surfaces 32 (a portion located between the pair of pressing surfaces 32 in the circumferential direction) are non-contact surfaces that do not come in contact with the pressed surface 20.

The main engaging element body 30 has an internal space 35 in the central portion in the thickness direction (axial direction) of the central portion in the width direction. The end portions on both sides in the radial direction of the internal space 35 are respectively open to the outer-side surface in the radial direction and the inner-side surface in the radial direction of the main engaging element body 30. The main engaging element body 30 has a pivot-support shaft 33 that is arranged in the axial direction, and an intermediate portion in the axial direction of the pivot-support shaft 33 is arranged in an outer-side portion in the radial direction of a central portion in the width direction of the internal space 35. The pivot-support shaft 33 is configured by a columnar shaped pin, and the end portions on both sides in the axial direction of the pivot-support shaft 33 are supported by portions of the main engaging element body 30 that sandwich the internal space 35 from both sides in the axial direction.

The main engaging element body 30 has an output-side engaged portion 34 in a central portion in the width direction of the inner-side surface in the radial direction. The output-side engaged portion 34 is configured by a substantially rectangular concave portion that is recessed outward in the radial direction from the central portion in the width direction of the inner side surface in the radial direction of the main engaging element body 30 (side surface on the far side from the pressed surface 20).

Figure 5:
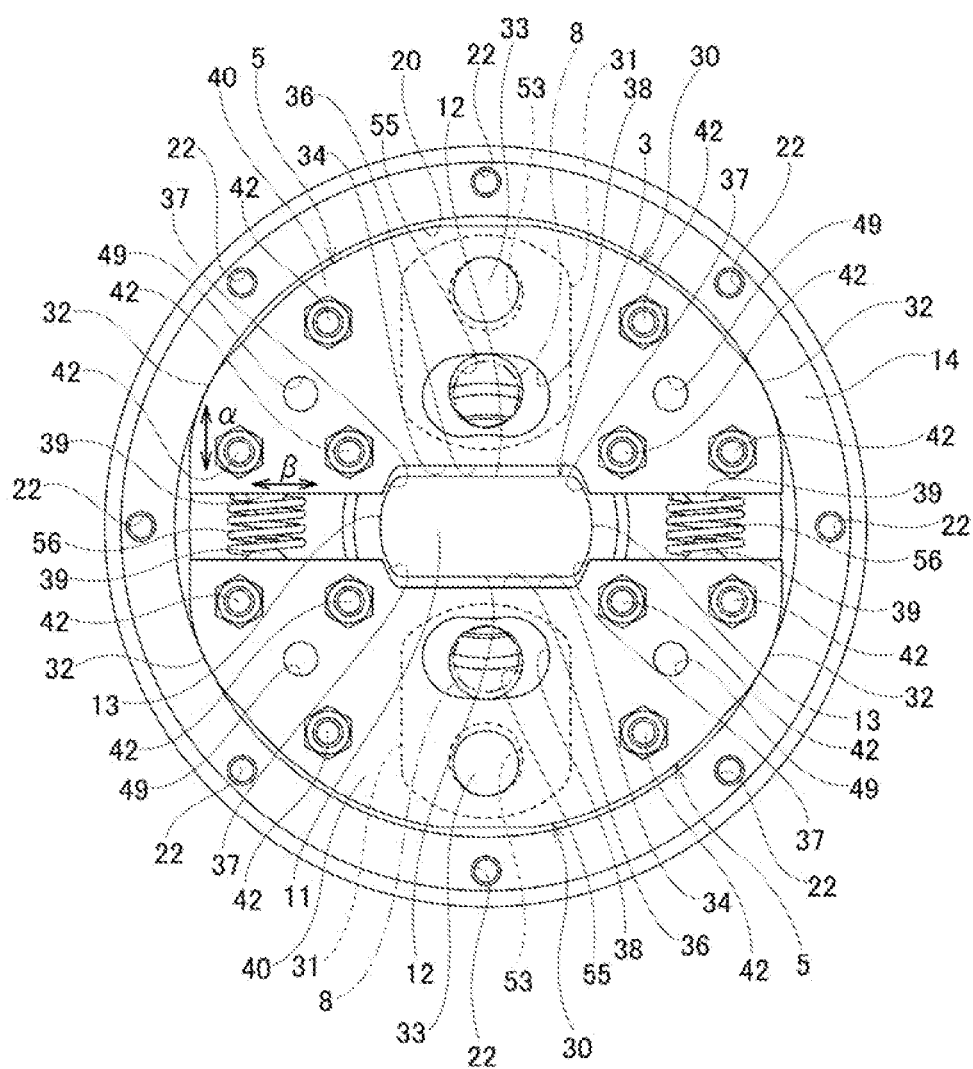
FIG. 5 is a view of the reverse input cutoff clutch illustrated in FIG. 3 and illustrates a state in which an input member, an input-side housing element and input-side bearing are removed, and illustrates a neutral state in which a rotational torque is not reversely inputted to an output member.
Figure 6:
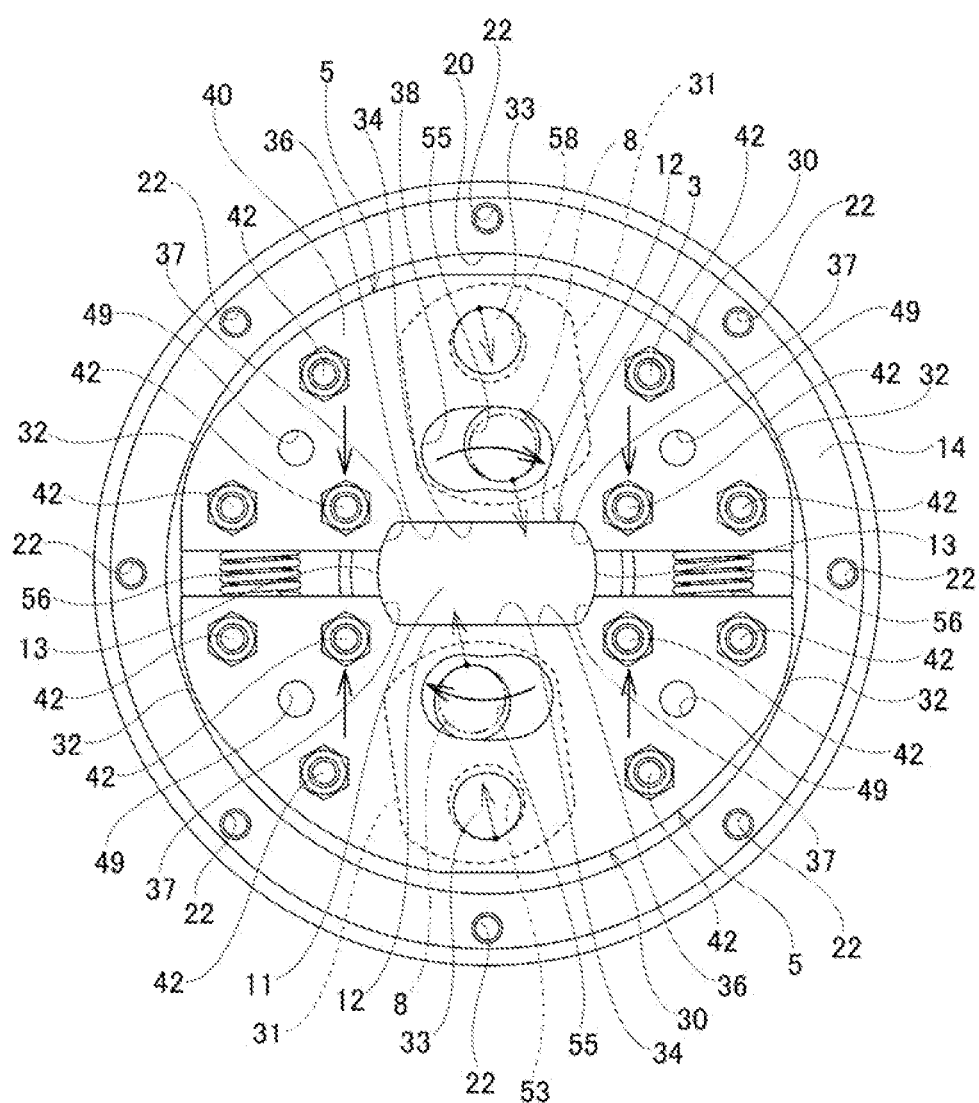
FIG. 6 is a view similar to FIG. 5 and illustrates a state in which a rotational torque is inputted to the input member.

The output-side engaged portion 34, as illustrated in FIG. 5, FIG. 6, FIG. 20A and FIG. 20B, has a size such that the front-half portion in the minor axis direction of the output-side engaging portion 11 can be arranged on the inner side thereof. In particular, in this example, as illustrated in FIG. 6 and FIG. 20B, the output-side engaged portion 34 has an inner-surface shape that coincides with the outer peripheral surface of the front-half portion in the minor axis direction of the output-side engaging portion 11.

The inner surface of the output-side engaged portion 34 has a bottom surface 36 and a pair of guided surfaces 37. The bottom surface 36 is configured by a flat surface that is orthogonal to the radial direction of the main engaging element body 30. Of the inner surface of the output-side engaged portion 34, the pair of guided surfaces 37 are arranged on the end portions on both sides in the width direction of the main engaging element body 30, and face each other in the width direction. The pair of guided surfaces 37 is configured by a pair of concave curved surfaces that are inclined in directions such that the distance between the surfaces increases as going toward the inner side in the radial direction of the main engaging element body 30, or in other words, as going in a direction in the radial direction of the main engaging element body 30 away from the pressed surface 20.

The pair of guided surfaces 37 is configured by partial cylindrical shaped concave surfaces that are capable of coming in contact with the pair of guide surfaces 13 of the output-side engaging portion 11, and have a radius of curvature that is the same size as the radius of curvature of the guide surfaces 13, or slightly larger than the radius of curvature of the guide surfaces 13. In other words, in this example, as illustrated in FIG. 6 and FIG. 20B, the output-side engaged portion 34 has an inner-surface shape that coincides with the outer peripheral surface of the front-half portion of the minor axis direction of the output-side engaging portion 11. That is, the bottom surface 36 of the output-side engaged portion 34 can be brought into surface contact with the side surface 12 of the output-side engaging portion 11, and the pair of guided surfaces 37 of the output-side engaged portion 34 can be brought into surface contact with the front-half portion in the minor axis direction of the pair of guide surfaces 13 of the output-side engaging portion 11. Note that in a case of implementing the present invention, the guided surfaces may be a non-cylindrical shaped concave surface such as a partial elliptical tubular shape or the like.

The main engaging element body 30 has an insertion hole 38 in an inner-side portion in the radial direction of the central portion in the width direction. The insertion hole 38 is configured by an arc-shaped long hole that penetrates in the axial direction through an inner-side portion in the radial direction of the central portion in the width direction of the main engaging element body 30, and that extends in the circumferential direction. The insertion hole 38 has a size that allows the input-side engaging portion 8 to be loosely inserted therein. More specifically, when the input-side engaging portion 8 is inserted into the inner side of the insertion hole 38, there is a gap in the circumferential direction and a gap in the radial direction of the main engaging element body 30 between the input-side engaging portion 8 and the inner surface of the insertion hole 38. Therefore, the input-side engaging portion 8 is able to displace in the direction of rotation of the input member 2 with respect to the insertion hole 38 (main engaging element body 30) due to the existence of the gap in the circumferential direction, and the insertion hole 38 (main engaging element body 30) is able to displace in the radial direction of the main engaging element body 30 with respect to the input-side engaging portion 8 due to the existence of the gap in the radial direction of the main engaging element body 30. In other words, the size of the insertion hole 38 is regulated so that operation is not hindered due to interference between the inner peripheral edge of the insertion hole 38 and the input-side engaging portion 8 during operation of the reverse input cutoff clutch 1 described later.

The main engaging element body 30 has protruding shaped holding convex portions 39 on both sides in the width direction of the inner-side surface in the radial direction, and the holding convex portions 39 protrude toward the inner side in the radial direction. The holding convex portions 39 protrude toward the inner side in the radial direction from a central portion in the thickness direction (axial direction) on both side portions in the width direction of the inner-side surface in the radial direction of the main engaging element body 30. The holding convex portions 39 are used for holding biasing members 56 that will be described later.

The main engaging element body 30 is configured by combining a plurality of parts. More specifically, the main engaging element body 30 includes a pair of main body plates 40, a pair of intermediate plates 41, the pivot-support shaft 33, and a plurality of bolts 42 and nuts 43 as coupling members.

The pair of main body plates 40 are parts that form both side portions in the thickness direction of the main engaging element body 30, and are arranged so as to overlap in the axial direction. Each of the pair of main body plates 40 is a press-molded part that is made by punching a metal plate such as steel plate or the like by press working, and has a substantially semi-circular plate shape. Each of the pair of main body plates 40 has convex surfaces 44 at two locations on the outer-side surface in the radial direction that are separated in the circumferential direction and that form the pressing surfaces 32 in the assembled state of the main engaging element body 30. Therefore, the pair of convex surfaces 44 that are provided in portions of the outer-side surface in the radial direction of each of the pair of main body plates 40 have matching phases in the circumferential direction and form the pressing surfaces 32. Moreover, the main engaging element body 30 provided with the pair of pressing surfaces 32 has four convex surfaces 44. The pair of main body plates 40 has circular support holes 45 in outer-side portions in the radial direction of the central portion in the width direction. The pair of main body plates 40 has a pair of concave portions 46 in the central portion in the width direction of the inner-side surfaces in the radial direction that, in the assembled state of the main engaging element body 30, form the output-side engaged portion 34. Therefore, the pair of concave portions 46 arranged separated from each other in the axial direction form the output-side engaged portion 34. The pair of main body plates 40 having through holes 47 in an inner-side portion in the radial direction of the central portion in the width direction that form the insertion hole 38 in the assembled state of the main engaging element body 30. The main engaging element body 30 has a plurality of through holes 48 (three in the illustrated example) in each of both side portions in the width direction. The main engaging element body 30 has a positioning hole 49 in each of both side portions in the width direction at a location that is separated from the plurality of through holes 48.

The pair of intermediate plates 41 are members that form the intermediate portion in the thickness direction of the main engaging element body 30. Each of the pair of intermediate plates 41 is a press-molded part that is made by punching a metal plate such as steel plate or the like by press working, and has a substantially fan plate shape. The pair of intermediate plates 41 is held between both side portions in the width direction of the pair of main body plates 40. Each of the pair of intermediate plates 41 has a holding convex portion 39 in an intermediate portion in the width direction of the inner-side surface in the radial direction. The holding convex portions 39 protrude further toward the inner side in the radial direction than the inner-side surface in the radial direction of the pair of main body plates 40. Of the pair of intermediate plates 41, the portions other than the holding convex portions 39 are arranged between the pair of main body plates 40. Particularly, the outer-side surfaces of each of the pair of intermediate plates 41 are located further on the inner side in the radial direction than the outer-side surfaces in the radial direction of the pair of main body plates 40, and do not come in contact with the pressed surface 20. Each of the pair of intermediate plates 41 has through holes 50 at a plurality of locations that are aligned with each of the through holes 48 of the pair of main body plates 40. Each of the plurality of intermediate plates 41 has a positioning hole 51 that is aligned with each of the positioning holes 49 of the pair of main body plates 40.

The pair of main body plates 40 and the pair of intermediate plates 41 are coupled and fastened together by screwing nuts 43 onto the tip-end portions of a plurality of bolts 42 that are inserted through the through holes 48 of the pair of main body plates 40 and the through holes 50 of the pair of intermediate plates 41 that are aligned together, and further tightening. Note that in the construction of this example, when performing this kind of coupling and fastening work, it is possible to easily perform the work of aligning the through holes 48 of the pair of main body plates 40 and the through holes 50 of the pair of intermediate plates 41 by inserting positioning rods for the positioning work through the positioning holes 49 of the pair of main body plates 40 and the positioning holes 51 of the pair of intermediate plates 41 that are aligned with each other. In the construction of this example, in a state in which the pair of main body plates 40 and the pair of intermediate plates 41 are coupled and fastened together as described above, the internal space 35 is formed between the pair of main body plates 40 and between the pair of intermediate plates 41 in the width direction.

The pivot-support shaft 33 is configured by a columnar shaped pin. The end portions on both sides in the axial direction of the pivot-support shaft 33 are pressure fitted and fixed inside the support holes 45 of the pair of main body plates 40. The intermediate portion of the pivot-support shaft 33 is arranged inside the internal space 35.

(Link Member 31)

The link member 31 is a press-molded part made by punching a metal plate such a steel plate or the like by press working, has a substantially rectangular plate shape or oblong plate shape, and is arranged in the internal space 35 of the main engaging element body 30 (between the pair of main body plates 40).

The thickness dimension of the link member 31 is smaller than the width dimension in the axial direction of the internal space 35 (the distance between the side surfaces of the pair of main body plates 40 that face each other, or the thickness dimension of the intermediate plates 41). The link member 31 has a first hole 53 in a first end portion 52 or end portion on one side in the lengthwise direction, and has a second hole 55 that corresponds to the input-side engaged portion in a second end portion 54 or end portion on the other side in the lengthwise direction.

The pivot-support shaft 33 is inserted through the first hole 53. As a result, the first end portion 52 is pivotally linked with the pivot-support shaft 33. The input-side engaging portion 8 is inserted through the second hole 55. As a result, the second end portion 54 is pivotally linked with the input-side engaging portion 8.

Figure 8:
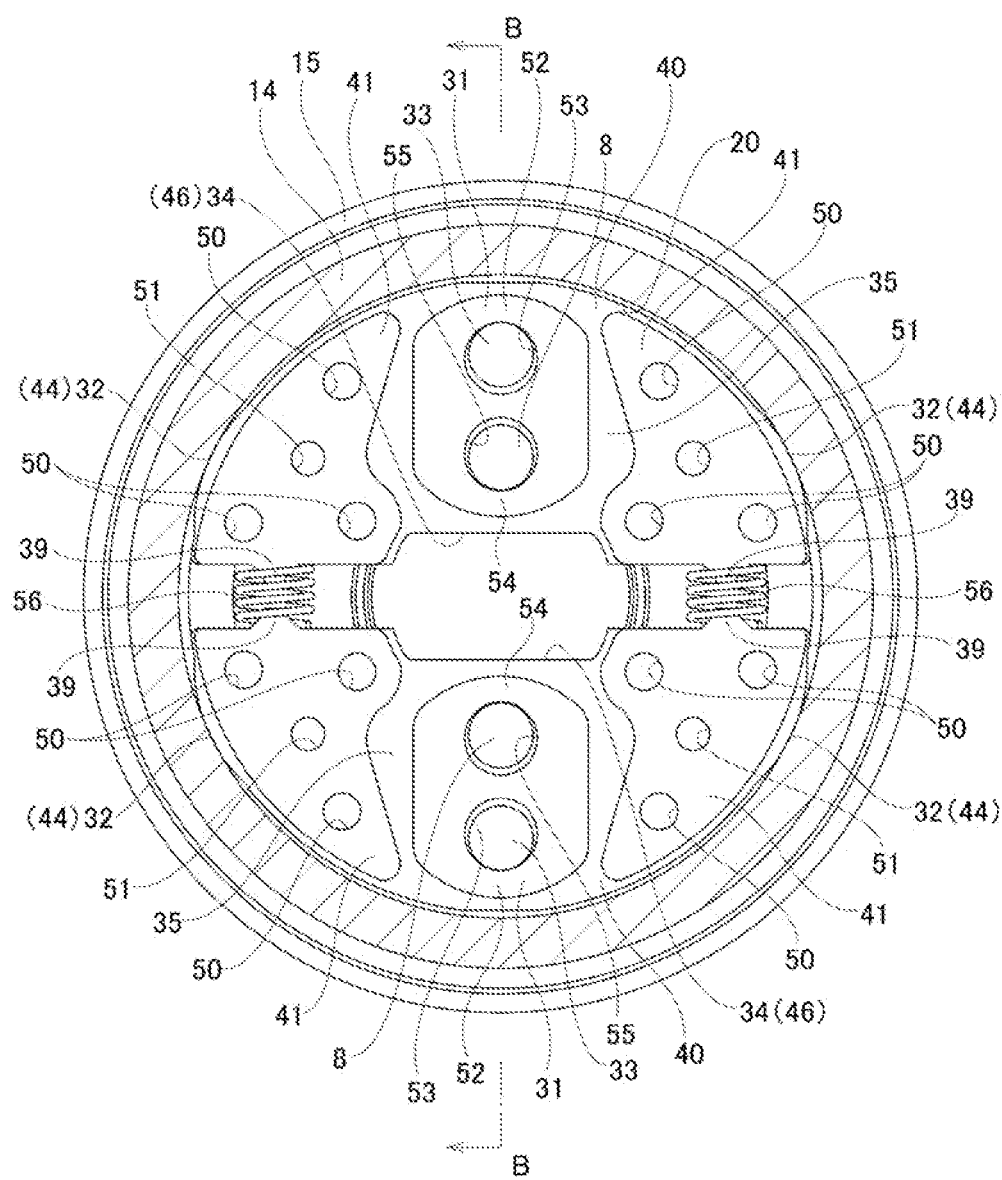
FIG. 8 is a view of the reverse input cutoff clutch illustrated in FIG. 3 and illustrates a state in which the output member, a left-side end portion of the output-side housing element, an output-side bearing, a main body plate on the left side, bolts, and nuts are removed.
Figure 9:
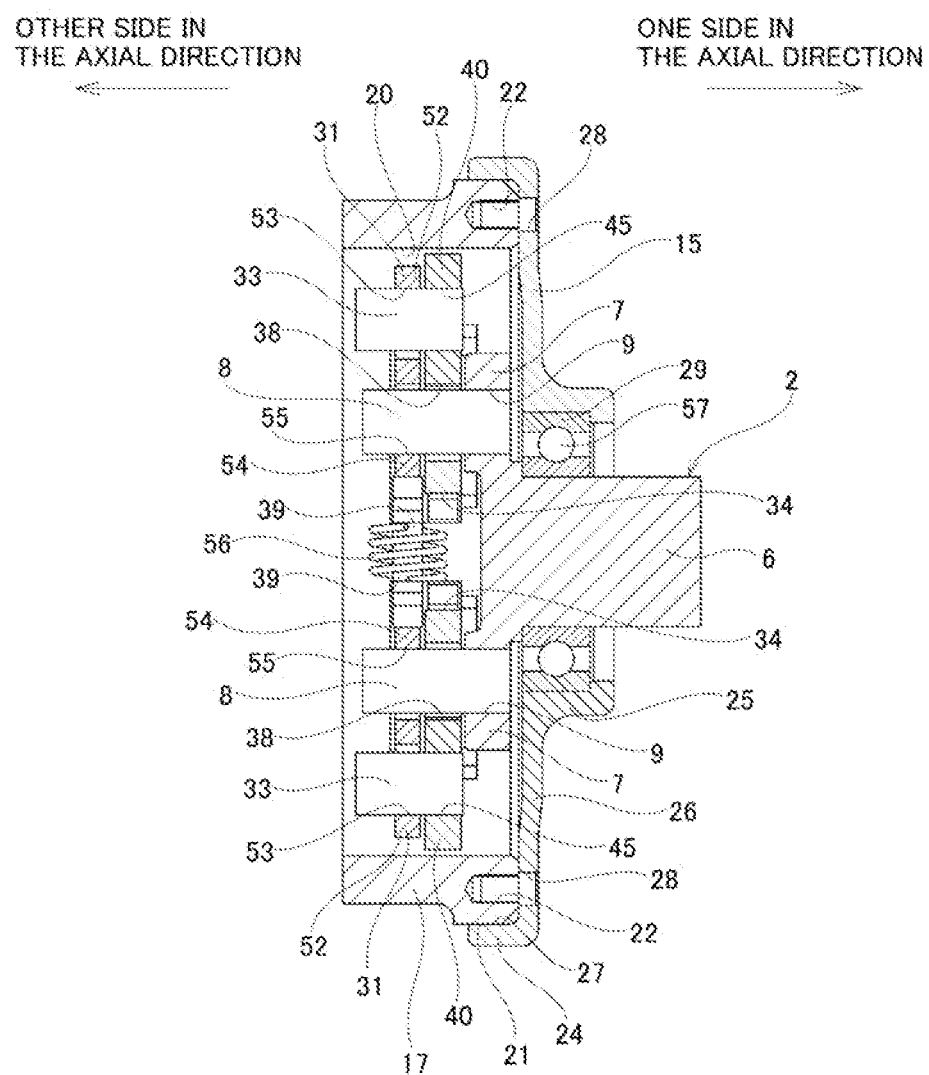
FIG. 9 is a cross-sectional view of section B-B in FIG. 8.
Figure 10:
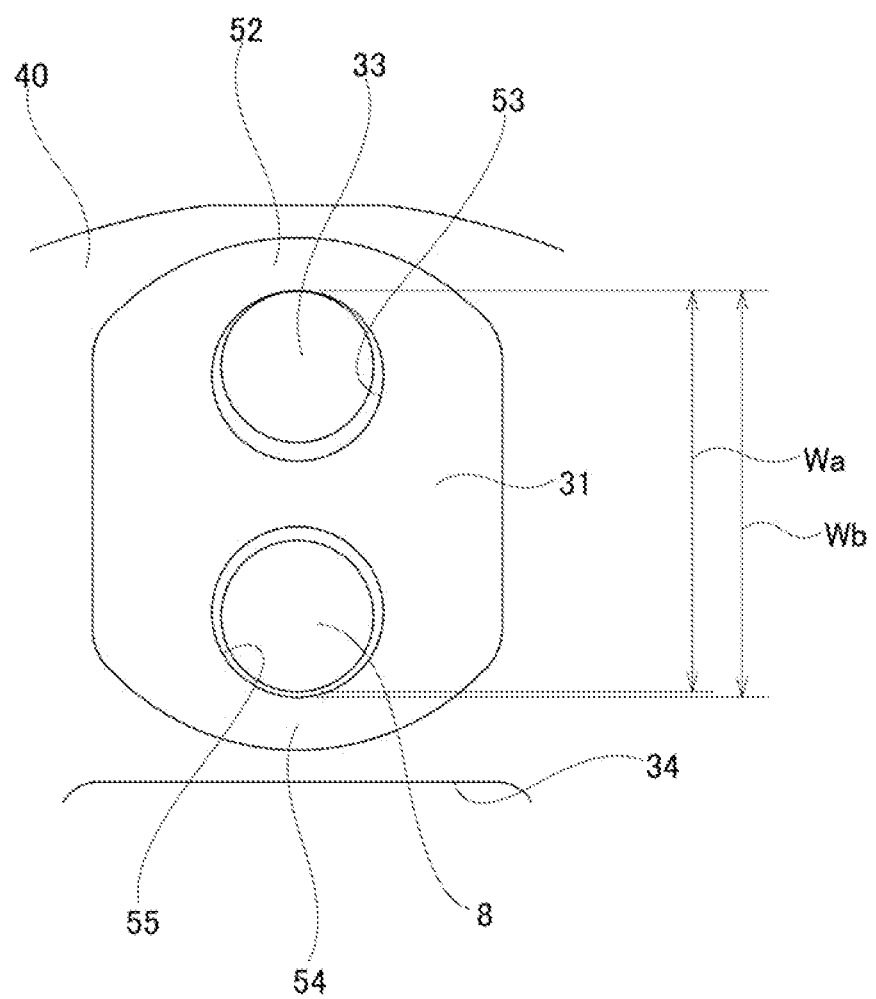
FIG. 10 is an enlarged view of the central portion in the left-right direction of the upper-half portion in FIG. 8.
Figure 11:
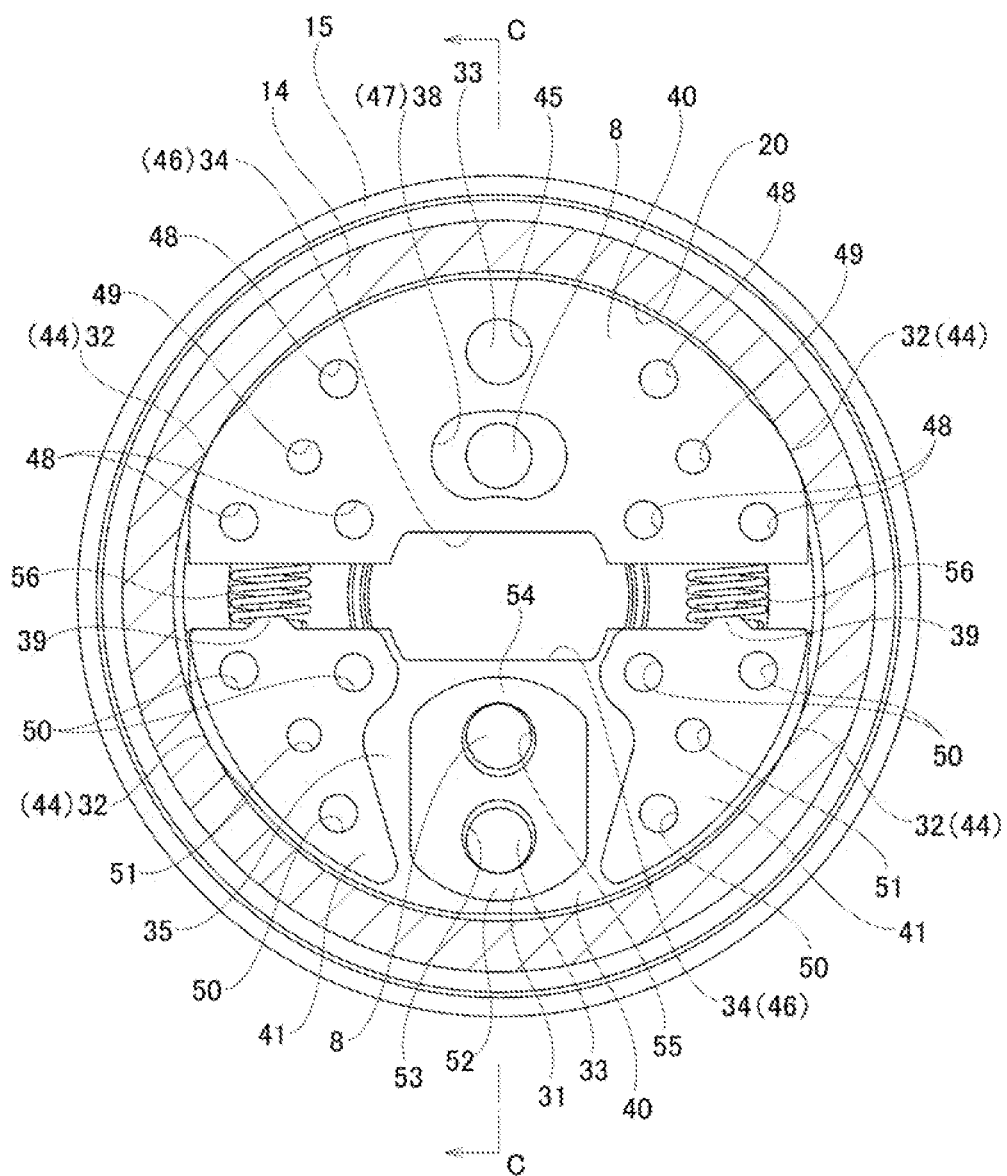
FIG. 11 is view in which an intermediate plates and link member are removed from the upper-half portion in FIG. 8.
Figure 12:
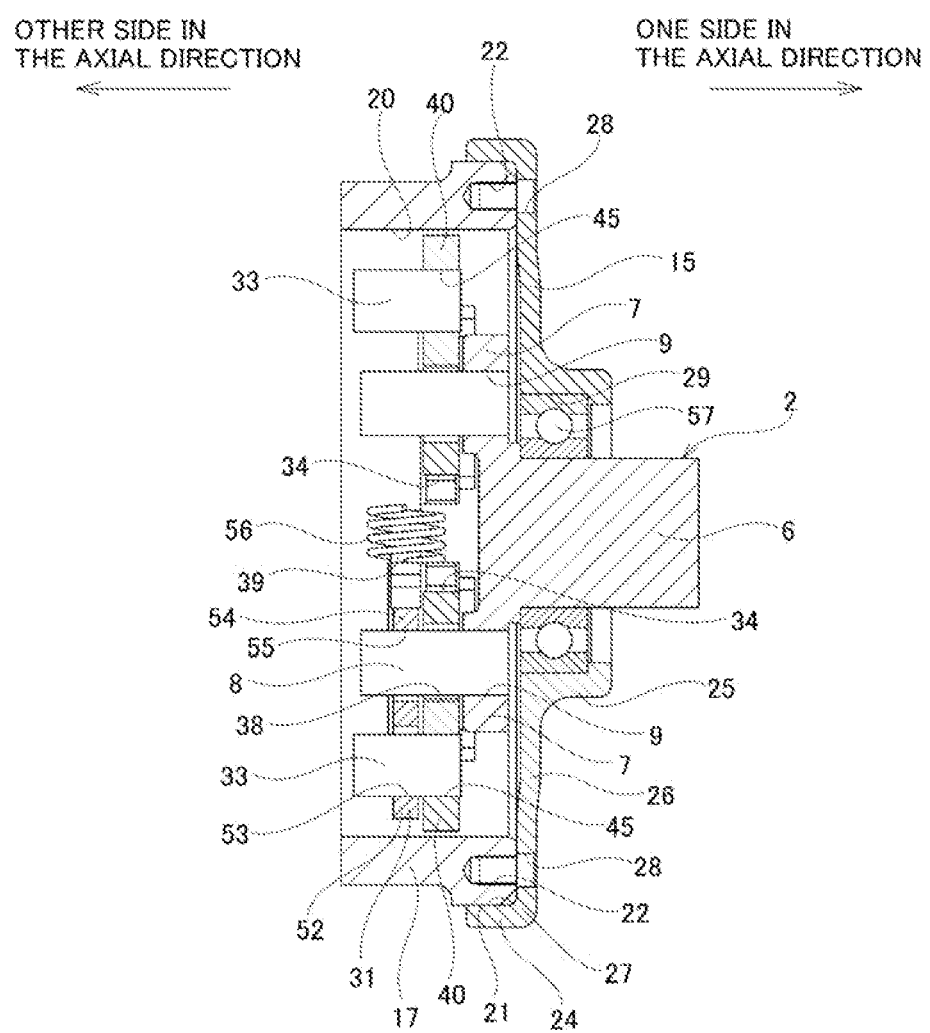
FIG. 12 is a cross-sectional view of section C-C in FIG. 11.
Figure 13:
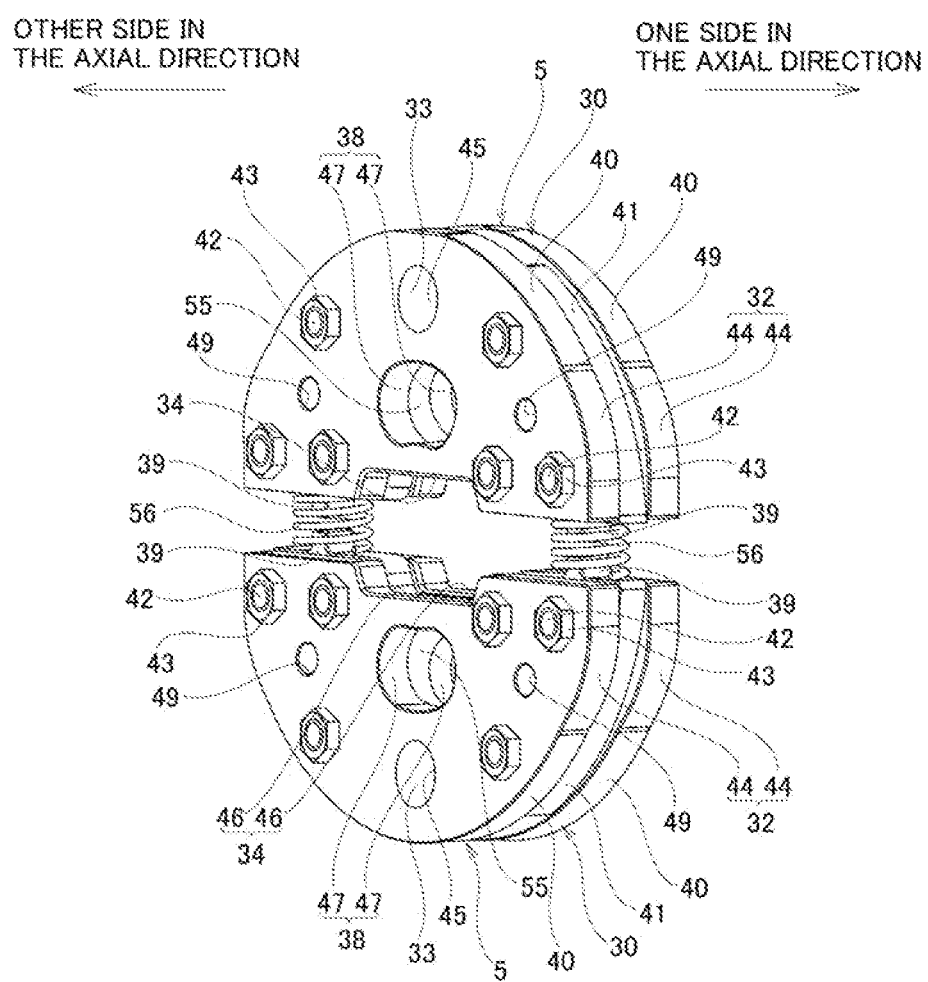
FIG. 13 is a perspective view of a pair of engaging elements and biasing members of the reverse input cutoff clutch of the first example.
Figure 14:
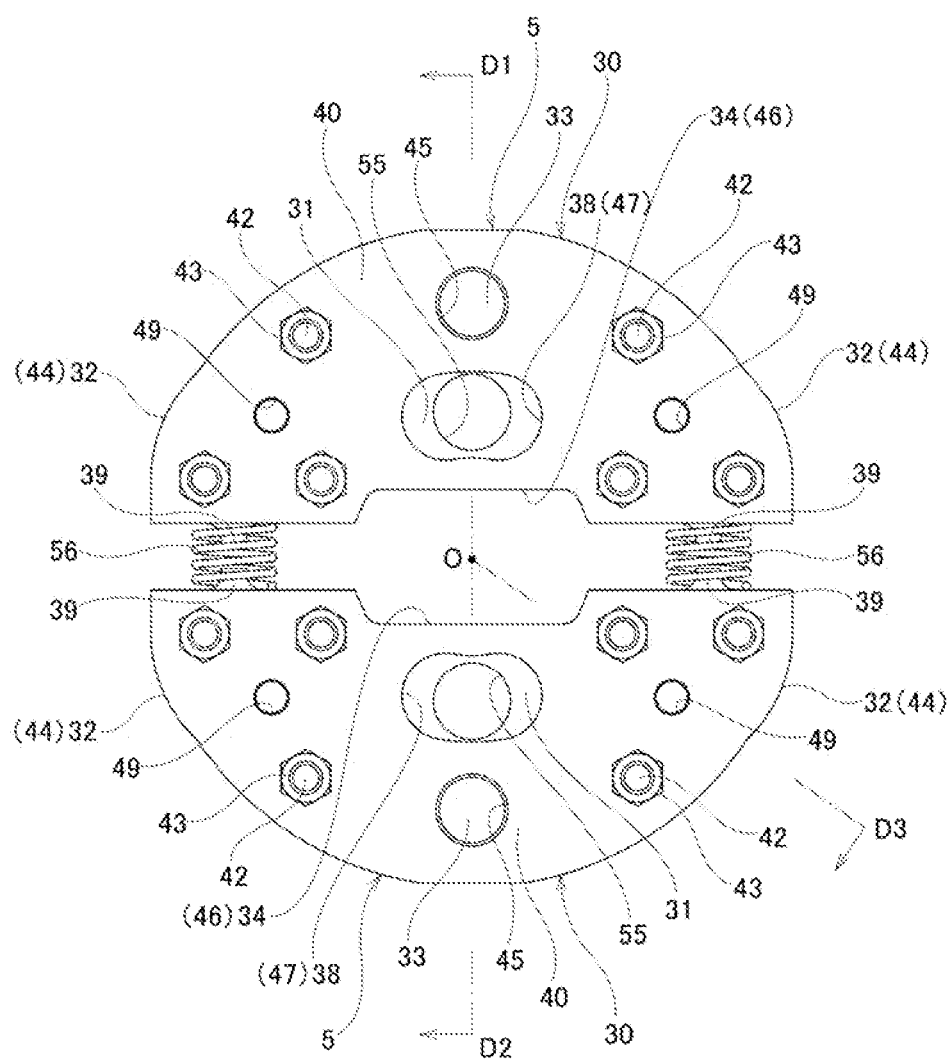
FIG. 14 is a view of the pair of engaging elements and biasing member of the reverse input cutoff clutch of the first example as viewed in the axial direction from the output member side.

The inner-diameter dimension of the first hole 53 is set to be larger than the outer-diameter dimension of the pivot-support shaft 33, and the inner-diameter dimension of the second hole 55 is set to be larger than the outer-diameter dimension of the input-side engaging portion 8. Furthermore, in this example, as illustrated in FIG. 5 and FIG. 8, in a state where the pair of pressing surfaces 32 of the engaging element 5 come in contact with the pressed surface 20, and the input-side engaging portion 8 is located in the central portion in the width direction of the main engaging element body 30, as illustrated in FIG. 10, the distance Wa between the edges of the ends on the far sides from each other of the pivot-support shaft 33 and the input-side engaging portion 8 is set to be equal to or less than the distance Wb between the edges of the ends on the far sides from each other of the first hole 53 and the second hole 55 (Wa≤Wb). Note that, from the aspect of simplifying the assembly of the reverse input cutoff clutch 1, the difference between these distances Wa and Wb (Wb−Wa) is preferably as large as possible; however, from the aspect of being able to achieve an unlocked state by immediately moving the engaging elements 5 inward in the radial direction when a rotational torque is inputted to the input member 2 as will be described later, the difference is preferably as small as possible.

(Pair of Biasing Members 56)

The pair of biasing members 56 are arranged between portions on both sides in the width direction of the inner-side surfaces in the radial direction of the pair of main engaging element bodies 30 of the pair of engaging elements 5. In other words, the pair of biasing members 56 are arranged in positions separated from the output-side engaging portion 11 in the width direction of the main engaging element bodies 30 that correspond to the second direction. The pair of biasing members 56 elastically press each of the pair of engaging elements 5 in directions outward in the radial direction, or in other words, press each of the pair of engaging elements 5 in directions toward the pressed surface 20. As a result, in a neutral state in which torque is not applied to either the input member 2 or output member 3, the pressing surfaces 32 of each of the pair of engaging elements 5 are put into a state of contact with the pressed surface 20.

In this example, the pair of biasing members 56 are configured by coil springs, and by inserting the holding convex portions 39 of the pair of engaging elements 5 inside the portions on both sides in the axial direction of the biasing members 56, the biasing members 56 are prevented from falling out from between the inner-side surfaces in the radial direction of the pair of main engaging element bodies 30.

Figure 15:
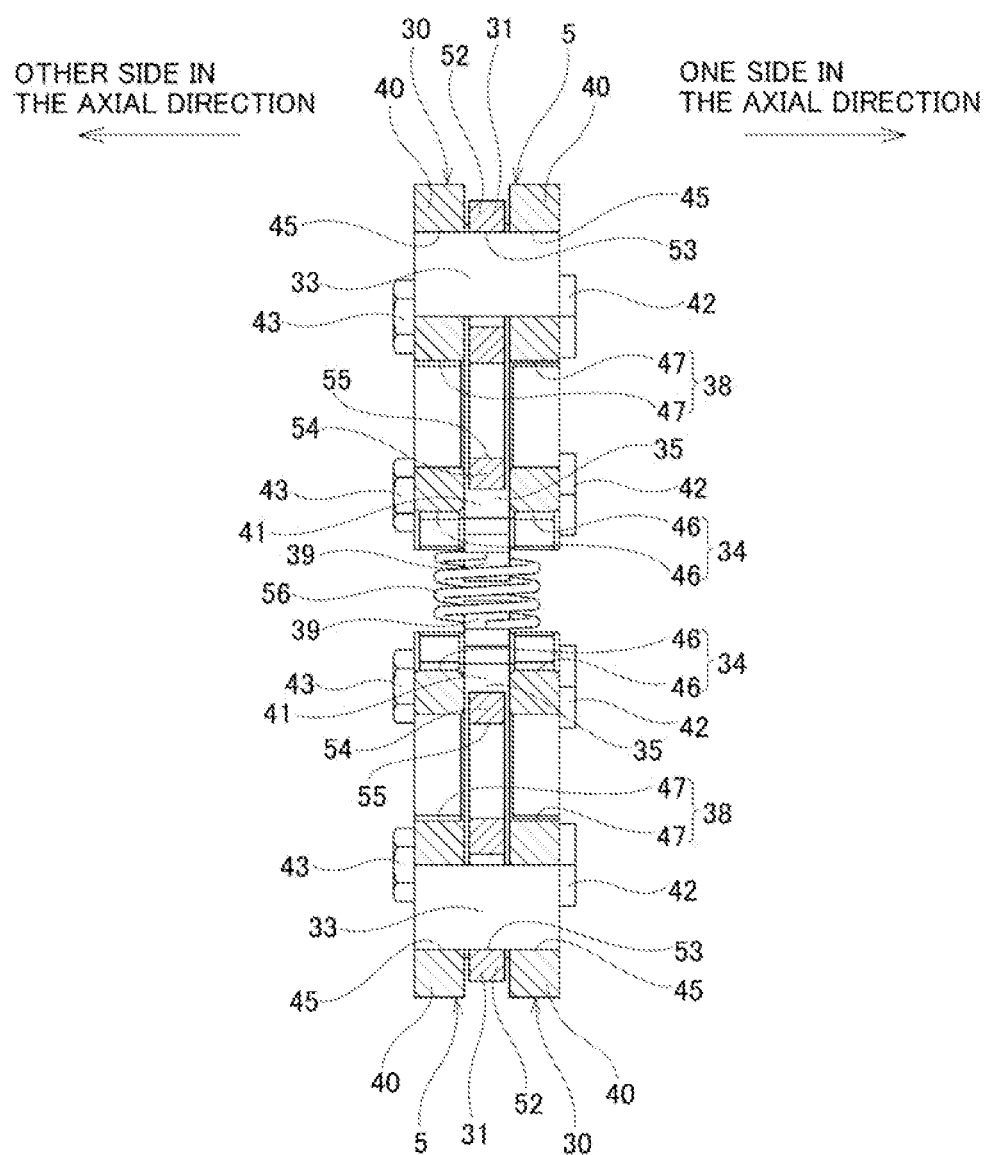
FIG. 15 is a cross-sectional view of section D1-D2 in FIG. 14.
Figure 16:
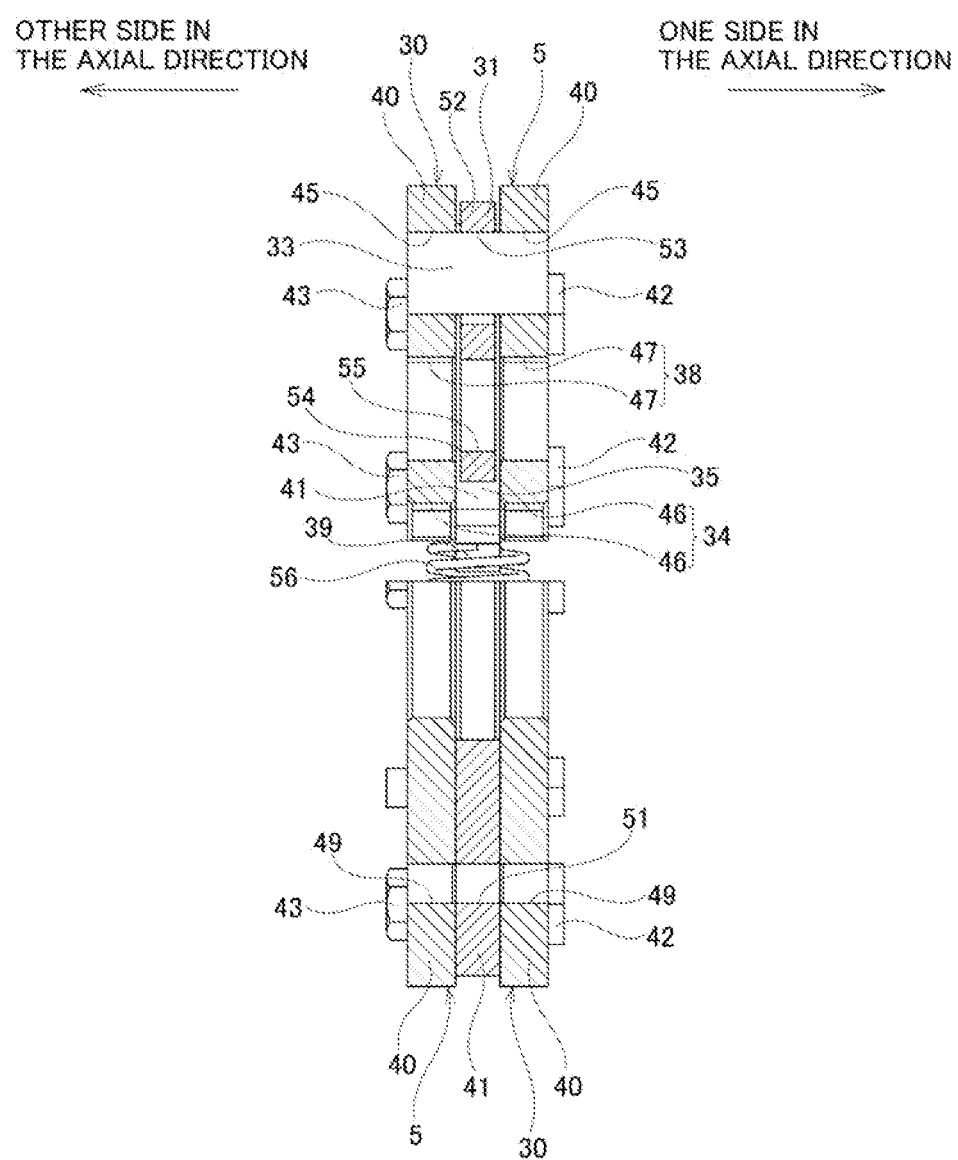
FIG. 16 is a cross-sectional view of section D1-O-D3 in FIG. 14.
Figure 17:
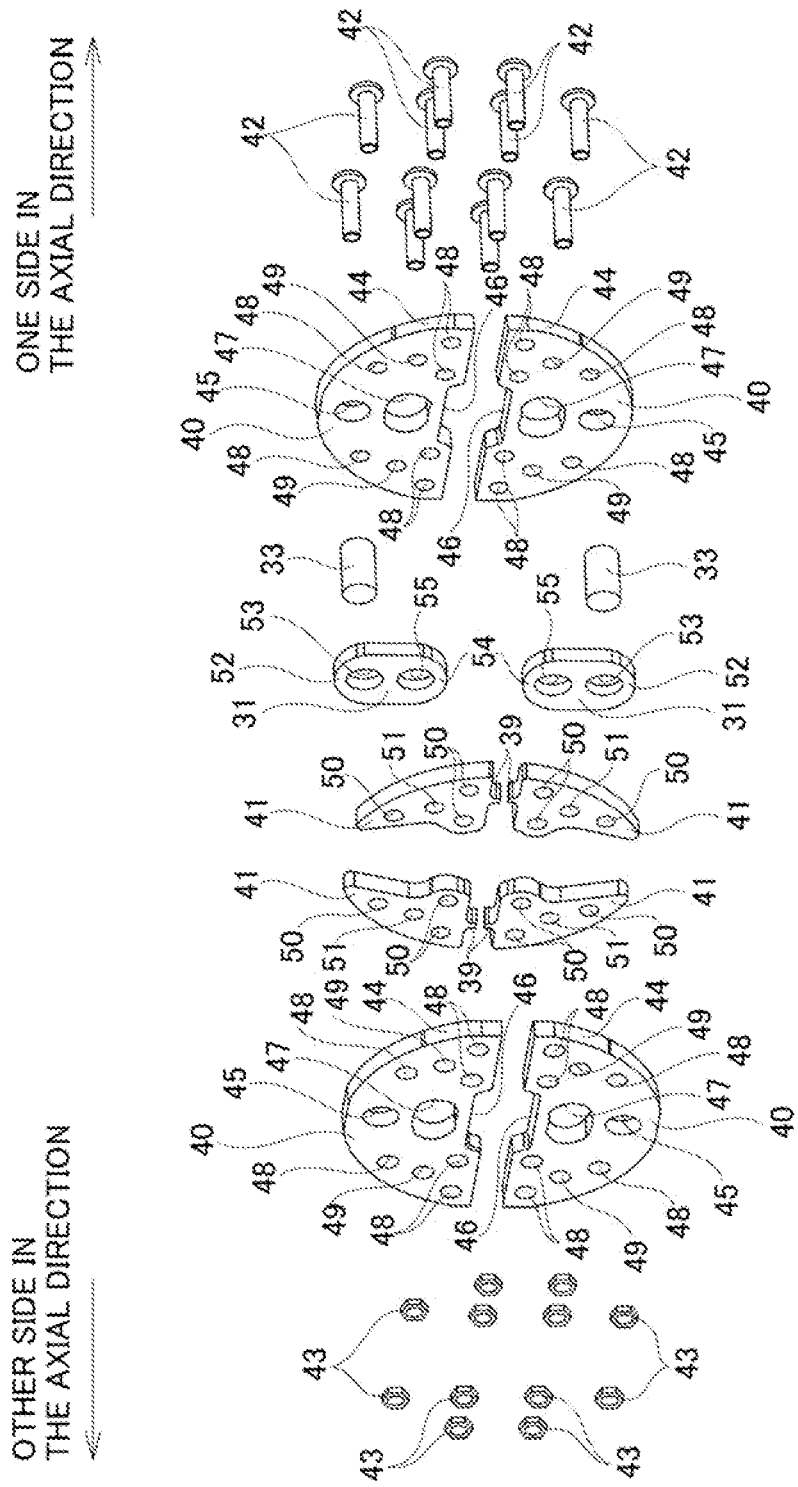
FIG. 17 is an exploded perspective view of the pair of engaging elements of the reverse input cutoff clutch of the first example.
Figure 18:
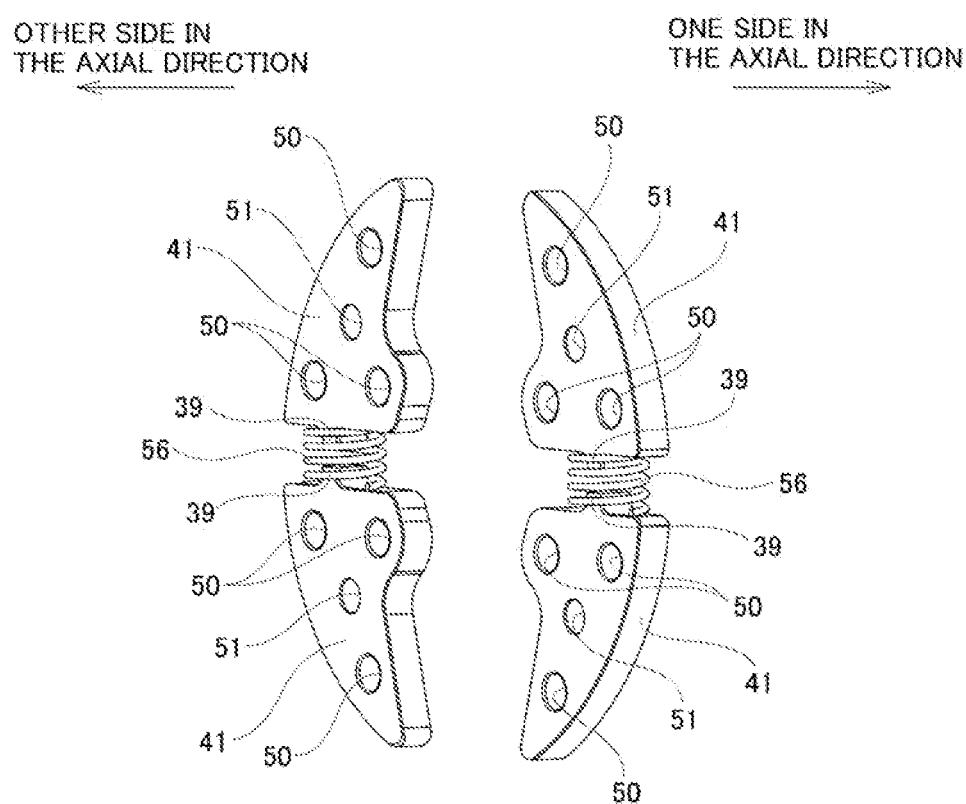
FIG. 18 is a perspective view of the intermediate plates and biasing members of the pair of engaging elements of the reverse input cutoff clutch of the first example.
Figure 19:
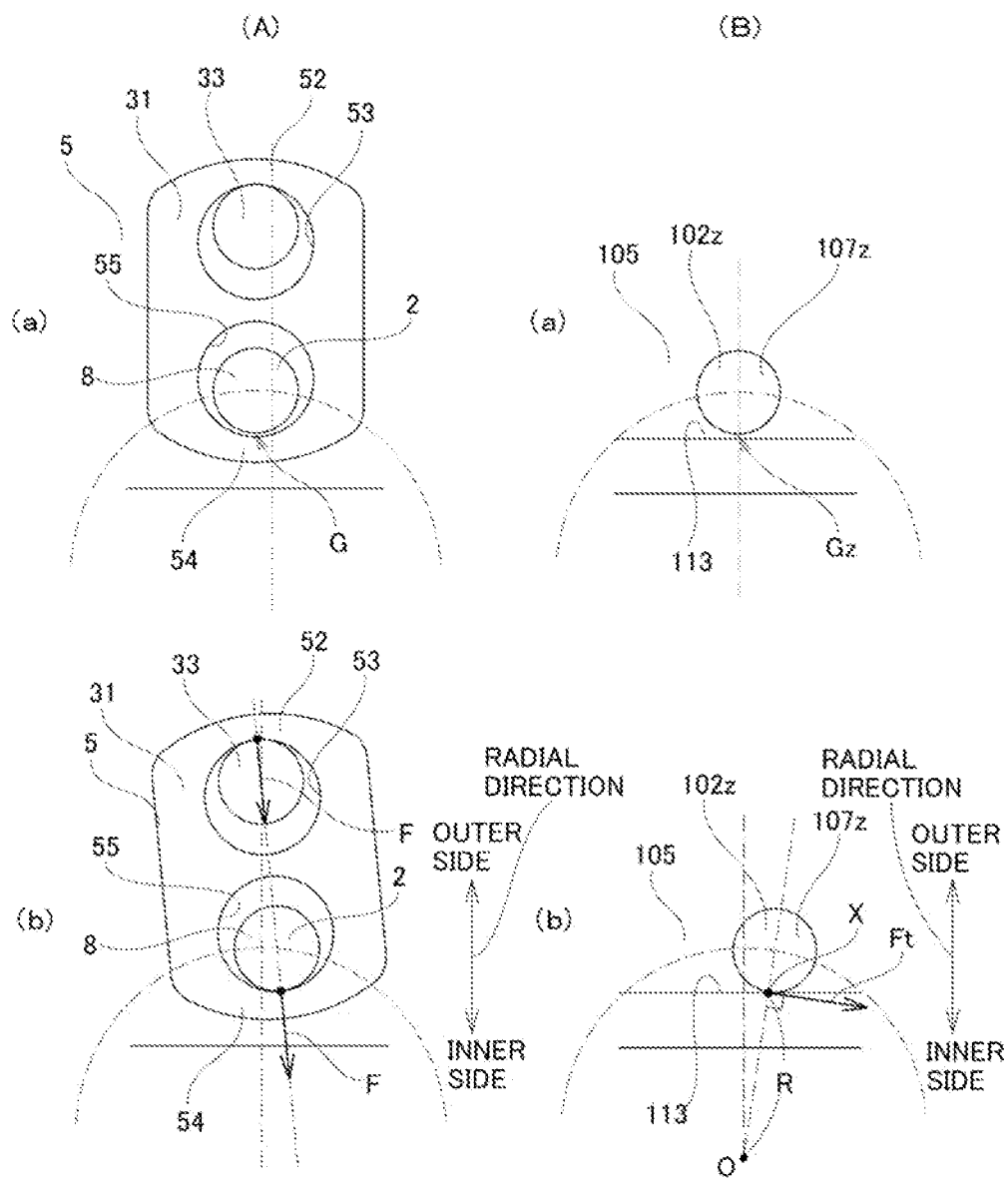
FIG. 19A (a) is a view illustrating the construction of the first example, and illustrates a state before rotational torque is inputted to the input member and the engagement portions between the engaging element and the input-side engaging portion.
FIG. 19B (a) is a view illustrating the construction of a comparative example corresponding to conventional construction, and illustrates a state before rotational torque is inputted to the input member and the engagement portions between the engaging elements and the input-side engaging portions.
Figure 20:
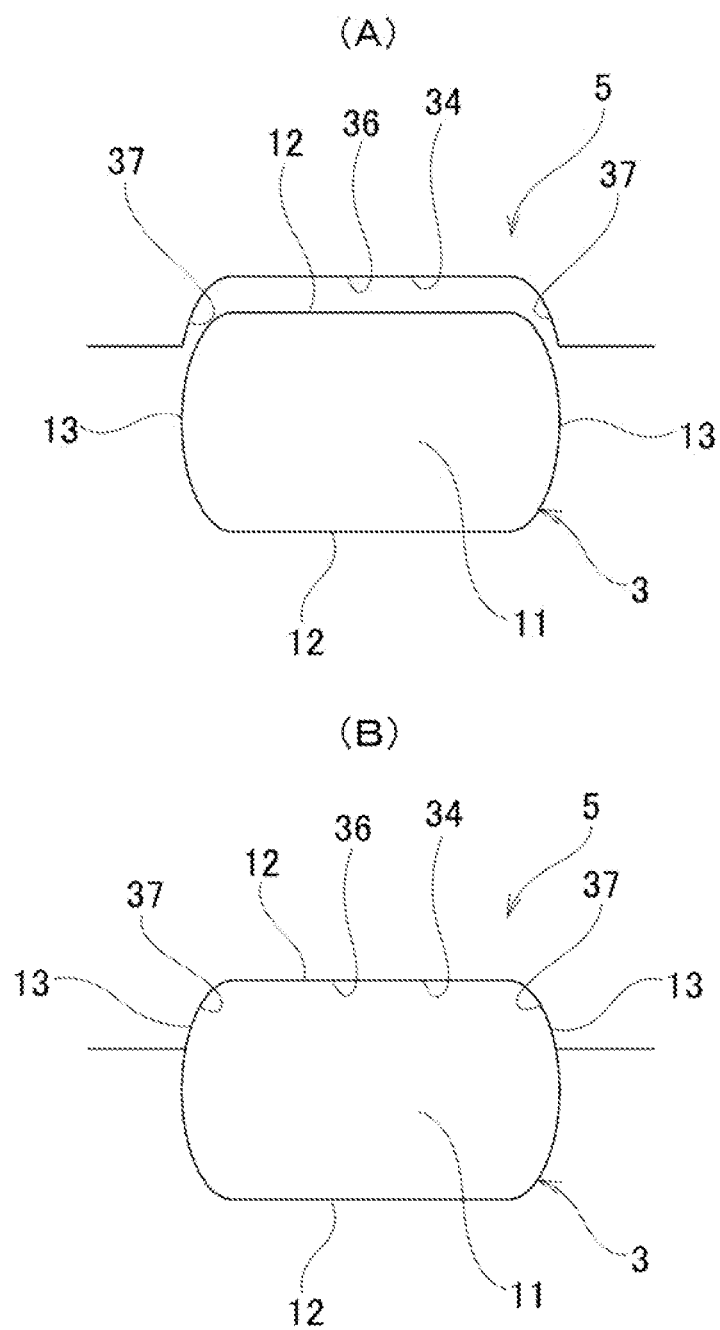
FIG. 20A and FIG. 20B are views illustrating states before and after engagement between the output-side engaging portion and the output-side engaged portion of the reverse input cutoff clutch of the first example.

In this example, the outer-diameter dimension of each of the pair of biasing members 56 is smaller than the thickness dimension in the axial direction of the main engaging element bodies 30. Therefore, the pair of biasing members 56, as illustrated in FIG. 15 and FIG. 16, do not protrude further toward both sides (toward the outside) in the axial direction than the side surfaces of both sides in the axial direction of the main engaging element bodies 30.

Note that in the neutral state as described above, the reason that the pressing surfaces 32 of each of the pair of engaging elements 5 is in a state of contact with the pressed surface 20 is so that a locked state can be immediately achieved when a rotational torque is reversely inputted to the output member 3 as will be described later.

In the assembled state of the reverse input cutoff clutch 1 of this example, the pair of input-side engaging portions 8 of the input member 2 that is arranged on the one side in the axial direction are inserted in the axial direction through each of the insertion holes 38 (each of the through holes 47 of the pair of main body plates 40) and the second holes 55 of the pair of engaging elements 5, and the output-side engaging portion 11 of the output member 3 arranged on the other side in the axial direction is inserted in the axial direction between the output-side engaged portions 34 of the pair of engaging elements 5. In other words, the pair of engaging elements 5 are arranged so that the output-side engaged portions 34 sandwich the output-side engaging portion 11 from the outer sides in the radial direction.

[Operation of the Reverse Input Cutoff Clutch]

As illustrated in FIG. 6, when a rotational torque is inputted to the input member 2 from an input-side mechanism, the input-side engaging portions 8 rotate on the inner side of insertion holes 38 of the main engaging element bodies 30 in the direction of rotation of the input member 2 (clockwise direction in the example in FIG. 6). When this occurs, as the link members 31 pivot around the pivot-support shafts 33, the input-side engaging portions 8 pull the pivot-support shafts 33 through the link members 31, which causes each of the pair of engaging elements 5 to move in directions (inward in the radial direction) away from the pressed surface 20. Accordingly, each of the pressing surfaces 32 of the pair of engaging elements 5 moves away from the pressed surface 20, the pair of output-side engaged portions 34 hold the output-side engaging portion 11 of the output member 3 from both sides in the radial direction, and the output-side engaging portion 11 and the output-side engaged portions 34 engage without looseness. As a result, rotational torque that is inputted to the input member 2 is transmitted to the output member 3 through the pair of engaging elements 5 and outputted from the output member 3.

Particularly, in the construction of this example, as illustrated in FIG. 5 to FIG. 6 and FIG. 20A to FIG. 20B, when the engaging elements 5 move in directions (inward in the radial direction) away from the pressed surface 20, the pair of guide surfaces 13 located on both sides in the major axis direction of the front-half portion of the minor axis direction of the output-side engaging portion 11 guide the pair of guided surfaces 37 located on both sides in the width direction of the output-side engaged portions 34 and restrict the movement of the engaging elements 5 in the width direction. Then as illustrated in FIG. 6 and FIG. 20B, the bottom surfaces 36 of the output-side engaged portions 34 come in surface contact with the side surfaces 12 of the output-side engaging portion 11, and the pair of guided surfaces 37 of the output-side engaged portions 34 come in surface contact with the pair of guide surfaces 13 of the output-side engaging portion 11. Therefore, in the construction of this example, after releasing the locked state or semi-locked state, it is possible to effectively prevent the engaging elements 5 from shifting in the width direction and coming into contact with the pressed surface 20. In the construction of this example, guiding the movement of the engaging elements 5 inward in the radial direction as described above can be performed by using the output-side engaging portion 11, and thus when compared with construction in which special parts are installed to be used just for performing such guidance, it is possible to reduce the number of parts.

Moreover, in the construction of this example, the pair of guided surfaces 37 of the output-side engaged portions 34 are configured by a pair of concave curved surfaces that are inclined in directions increasing the distance between each other while going inward in the radial direction, and the pair of guide surfaces 13 of the output-side engaging portion 11 are configured by a pair of convex curved surfaces that coincide with the pair of concave curved surfaces. Therefore, as illustrated in FIG. 20A, in a state in which the engaging elements 5 move outward in the radial direction away from the output-side engaging portion 11, gaps are formed between the pair of guided surfaces 37 and the pair of guide surfaces 13, and the size of the gaps (dimension in the width direction) increases as going outward in the radial direction. Therefore, in the construction of this example, in a state in which the engaging elements 5 move outward in the radial direction away from the output-side engaging portion 11, it is possible to appropriately allow movement of the engaging elements 5 in the width direction and the direction of rotation, and it is possible to effectively prevent unreasonable force from being applied to the engaging elements 5.

Figure 7:
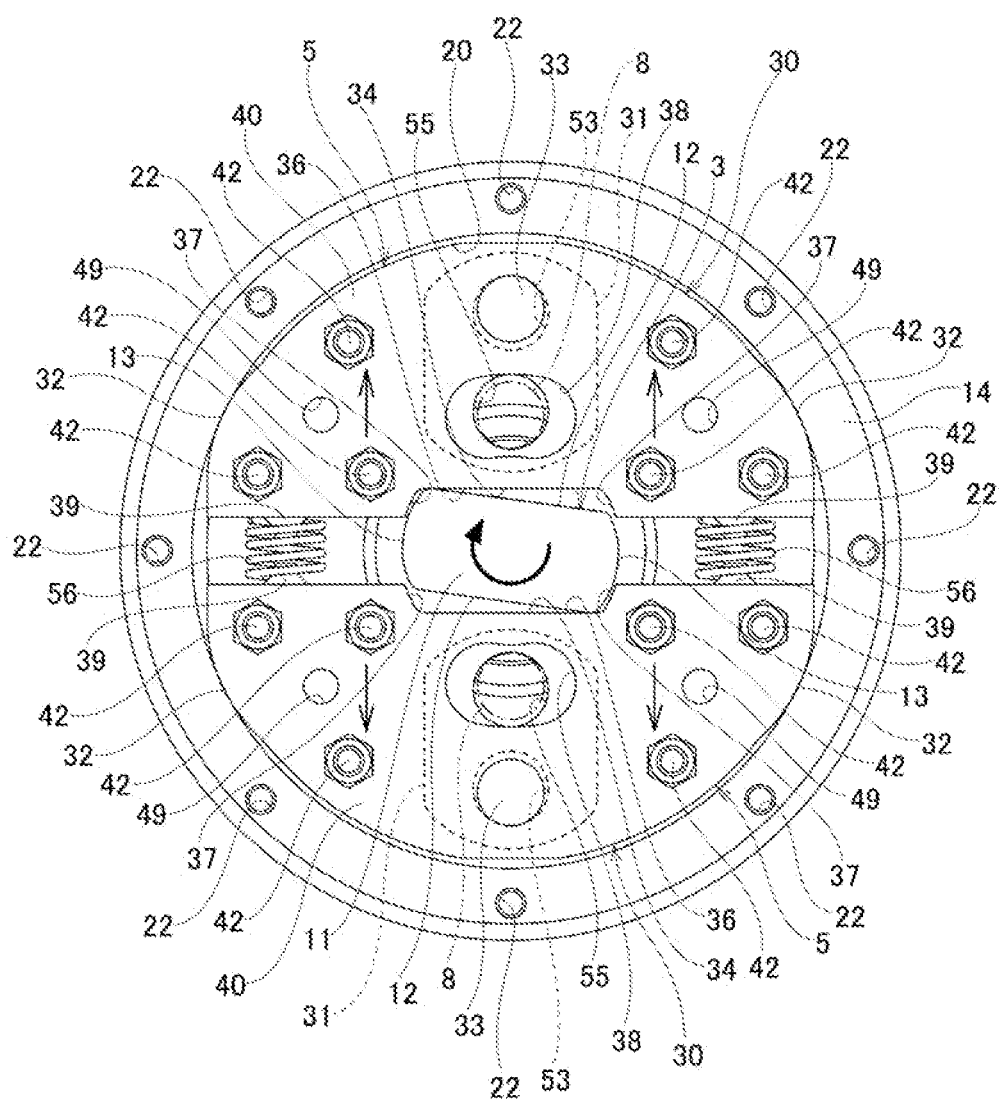
FIG. 7 is a view similar to FIG. 5 and illustrates a state in which a rotational torque is reversely inputted to the output member.

On the other hand, as illustrated in FIG. 7, when rotational torque is reversely inputted to the output member 3 from an output-side mechanism, the output-side engaging portion 11 rotates on the inner side of the pair of output-side engaged portions 34 in the direction of rotation (clockwise direction in the example in FIG. 7) of the output member 3. When this occurs, the corner portions that are the connecting portions between the side surfaces 12 and the guide surfaces 13 of the output-side engaging portion 11 press the bottom surfaces 36 of the output-side engaged portions 34 outward in the radial direction, which causes each of the pair of engaging elements 5 to move in directions (outward in the radial direction) toward the pressed surface 20. Accordingly, the pressing surfaces 32 of the pair of engaging elements 5 are pressed against the pressed surface 20, and each of the pressed surfaces 32 frictionally engages with the pressed surface 20. As a result, rotational torque that is reversely inputted to the output member 3 is transmitted to the housing 4 that is fixed to another member and does not rotate, and thus is completely cut off and is not transmitted to the input member 2, or only a part of the rotational torque that is reversely inputted to the output member 3 is transmitted to the input member 2 and the remaining part is cut off.

In order that rotational torque that is reversely inputted to the output member 3 is completely cut off so as not to be transmitted to the input member 2, the output member 3 is locked by wedging the pair of engaging elements 5 between the output-side engaging portion 11 and the pressed surface 20 so that the pressing surfaces 32 do not slide (rotate relative to) with respect to the pressed surface 20. On the other hand, in order that only a part of rotational torque that is reversely inputted to the output member 3 is transmitted to the input member 2 and the remaining portion is cut off, the output member 3 is semi-locked by wedging the pair of engaging elements 5 between the output-side engaging portion 11 and the pressed surface 20 so that the pressing surfaces 32 slide with respect to the pressed surface 20. In a state in which the output member 3 is semi-locked and rotational torque is further reversely inputted to the output member 3, the pair of engaging elements 5, due to the engagement between the output-side engaging portion 11 and the output-side engaged portions 34, rotate around the center of rotation of the output member 3 while allowing the pressing surfaces 32 to slide with respect to the pressed surface 20. As the pair of engaging elements 5 rotate, the input-side engaging portions 8 are pulled by the pivot-support shafts 33 through the link members 31, and part of the rotational torque is transmitted to the input member 2.

Note that in this example, each of the pair of engaging elements 5 has pressing surfaces 32 at two locations on the outer-side surface in the radial direction of the main engaging element body 30 that are separated in the circumferential direction, and thus when rotational torque is reversely inputted to the output member 3, it is possible to increase the frictional engagement force between the pressed surface 20 and the pressing surfaces 32 due to a wedge effect. However, in a case of implementing the present invention, it is also possible to employ construction in which there is a pressing surface at only one location on the outer-side surface in the radial direction of the main engaging element body in the circumferential direction.

With the reverse input cutoff clutch 1 of this example, when rotational torque is inputted to the input member 2, it is possible to smoothly switch from a locked state or a semi-locked state to an unlocked state. This will be explained with reference to FIG. 19A and FIG. 19B.

FIG. 19A (a) and FIG. 19A (b) illustrate the positional relationship between part of the input member 2 and part of an engaging element 5. More specifically, FIG. 19(A) (a) illustrates the positional relationship in a locked state or semi-locked state as illustrated in FIG. 7 when the input-side engaging portion 8 is located in the central portion in the width direction of the engaging element 5 and the link member 31 is at the innermost position in the radial direction. FIG. 19A (b) illustrates the positional relationship in a state in which, when a rotational torque T is inputted to the input member 2 in the state illustrated in FIG. 19A (a), the input-side engaging portion 8 rotates in the direction of rotation of the input member 2 (clockwise direction in the illustrated example) and a translational load F begins to be applied to the pivot-support shaft 33 from the input-side engaging portion 8 through the link member 31.

On the other hand, FIG. 19B (a) and FIG. 19B (b) illustrate a mutual positional relationship between a part of the input member 102z and a part of the engaging element 105 for construction of a comparative example (construction having the same configuration as the conventional construction described above except that the input-side engaging portion 107z of the input member 102z has a circular columnar shape). More specifically, FIG. 19B (a) illustrates a positional relationship in a locked state or semi-locked state when the input-side engaging portion 107z is located in the central portion in the width direction of the engaging element 105. FIG. 19B (b) illustrates the positional relationship in a state in which, when a rotational torque T is inputted to the input member 102z in the state illustrated in FIG. 19B (a), the input-side engaging portion 107z rotates in the direction of rotation of the input member 102z (clockwise direction in the illustrated example), the input-side engaging portion 107z comes in contact with the input-side engaged portion 113 of the engaging element 105, and a translational load Ft due to the rotational torque begins to be applied at the point of contact between the input-side engaging portion 107z and the input-side engaged portion 113.

As illustrated in FIG. 19B (b), in the construction of the comparative example, the direction of the translational load Ft, or in other words, the direction of the load acting on the engaging element 105 from the input member 102z is largely inclined with respect to the radial direction of the engaging element 105 that is the direction in which the engaging element 105 moves when switching from a locked state or semi-locked state to an unlocked state (direction of movement of the engaging element 105 when moving toward or away from the pressed surface).

On the other hand, as illustrated in FIG. 19A (b), in the construction of this example, the direction of the translational load F, or in other words, the direction of the load acting on the engaging element 5 from the input member 2, is mostly parallel to the radial direction of the engaging element 5 that is the direction in which the engaging element 5 moves when switching from a locked state or semi-locked state to an unlocked state (direction of movement of the engaging element 5 when moving toward or away from the pressed surface 20). In other words, the angle between the direction of the translational load F and the direction in which the engaging element 5 moves is smaller than the angle between the direction of the translational load Ft and the direction in which the engaging element 105 moves. That is, in the construction of this example, the rotational torque T that is inputted to the input member 2 can be efficiently converted to a load for moving the engaging element 5 inward in the radial direction. Therefore, with the construction of this example, when rotational torque is inputted to the input member 2, it is possible to smoothly switch from a locked state or semi-locked state to an unlocked state.

Note that in the structure of this example, from the aspect of simplifying assembly of the reverse input cutoff clutch, it is preferable that the size of the gap G (difference Wb−Wa described above) that exists between the inner-side surface of the input-side engaging portion 8 and the inner peripheral surface of the second hole 55 of the link member 31 in the state illustrated in FIG. 19A (a), and the size of the gap Gz that exists between the inner-side surface in the radial direction of the input-side engaging portion 107z and the input-side engaged portion 113 in the state illustrated in FIG. 19B (a) are both as large as possible; however, on the other hand, from the aspect of being able to achieve an unlocked state by immediately moving the engaging elements 5, 105 inward in the radial direction when rotational torque is inputted to the input member 2, 102z, the gaps G, Gz are preferably as small as possible. Therefore, in manufacturing a reverse input cutoff clutch, taking into consideration these circumstances, it is necessary that the size of the gaps G, Gz be adjusted to an appropriate size.

In the comparative example, in order to adjust the size of the gap Gz, in some cases it may be necessary to finish the portion of the input-side engaged portion 113 that is in contact with the inner-side surface in the radial direction of the input-side engaging portion 107z with high precision such as by using a machining process; and in such a case, it is expected that the cost would increase. However, in the construction of this example, it is possible to adjust the size of the gap G by simply managing the distance between centers of the first hole 53 and second hole 55 of the link member 31; and since the link member 31 is made using inexpensive press working, it is easy to keep costs down.

Second Example

Figure 21:
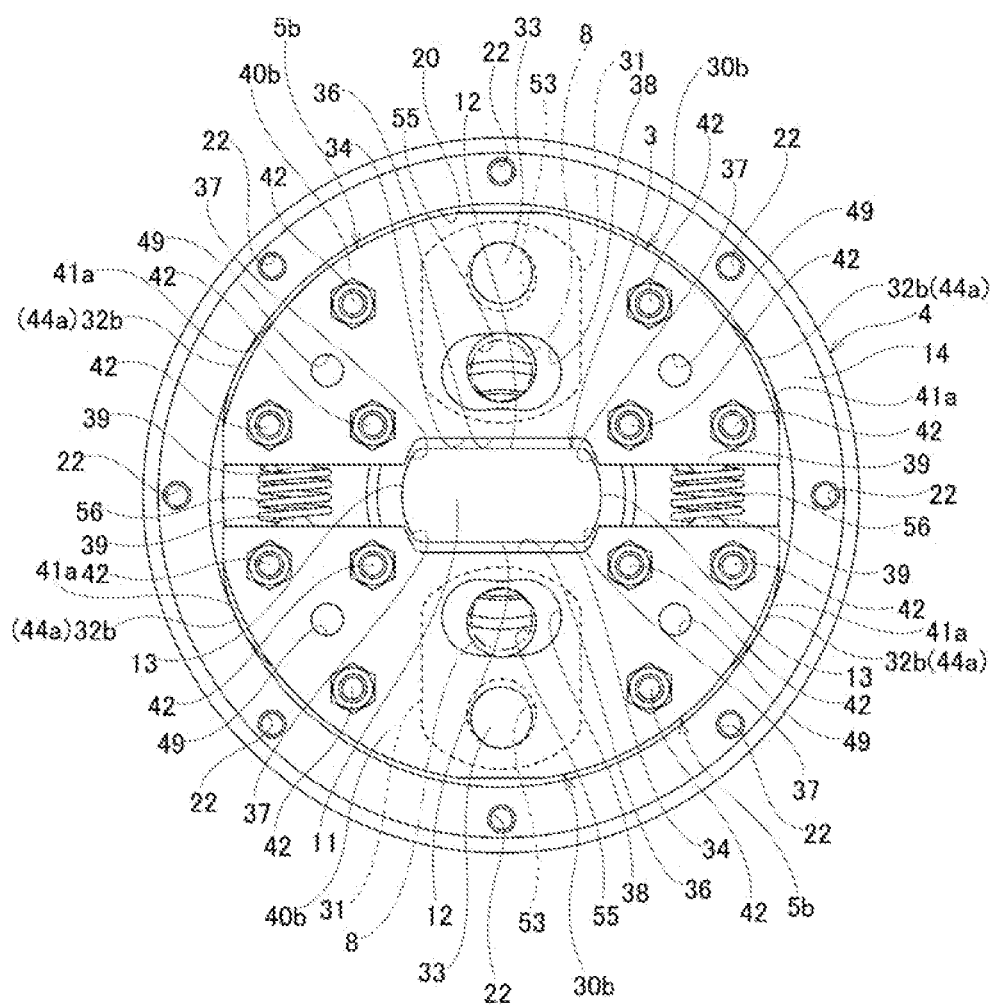
FIG. 21 is a view corresponding to FIG. 5, and illustrates a reverse input cutoff clutch of a second example of an embodiment of the present invention.
Figure 22:
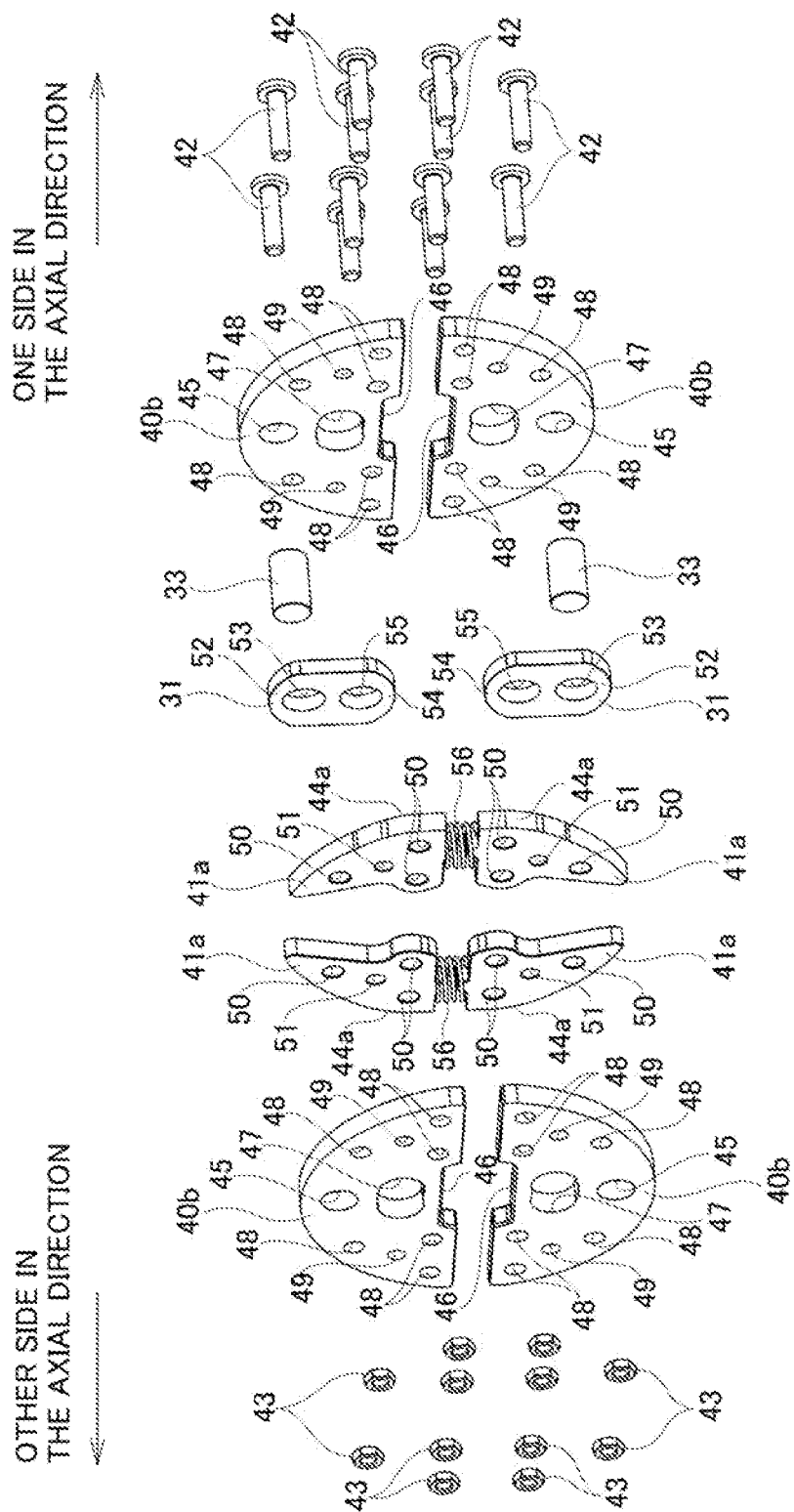
FIG. 22 is an exploded perspective view of the pair of engaging elements of the reverse input cutoff clutch of the second example.
Figure 23:
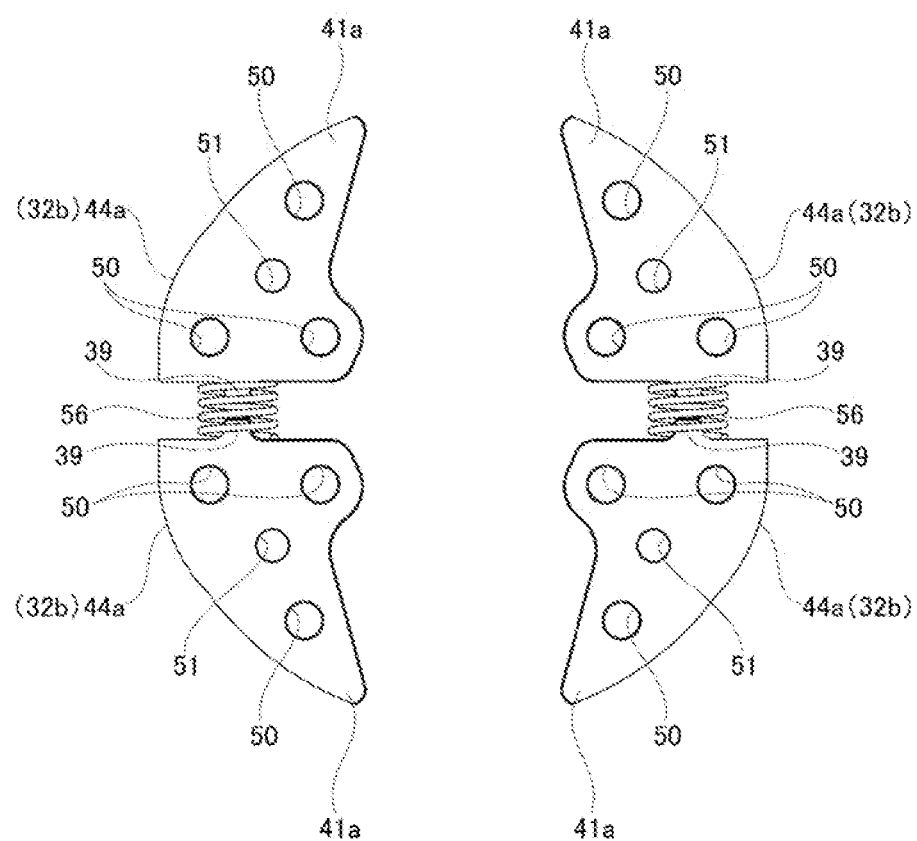
FIG. 23 is a front view of the intermediate plates and biasing members of the pair of engaging elements of the reverse input cutoff clutch of the second example.

A second example of an embodiment of the present invention will be described using FIG. 21 to FIG. 23.

In the case of this example as well, each of the pair of engaging elements 5b includes a pair of pressing surfaces 32b on both side portions in the circumferential direction of the outer-side surface in the radial direction of the main engaging element bodies 30b. Each of the pair of pressing surfaces 32b is a partially cylindrical convex surface having a radius of curvature that is smaller than the radius of curvature of the pressed surface 20 that is provided on the inner peripheral surface of the housing 4, and protrudes further toward the pressed surface 20 than the portions of the outer-side surfaces in the radial direction of the main engaging element body 30b that are separated from the pressing surface 32b in the circumferential direction.

In this example, convex surfaces that form the pressing surfaces 32b are not provided on the outer-side surface in the radial direction of each of the pair of main body plates 40b that form both side portions in the thickness direction of the main engaging element body 30; however, convex surfaces 44a that form the pressing surfaces 32b are provided on parts (intermediate portion in the circumferential direction) of the outer-side surface in the radial direction of each of the pair of intermediate plates 41a that form the intermediate portion in the thickness direction of the main engaging element body 30b. In other words, in this example, each of the convex surfaces 44a forms a pressing surface 32b.

The convex surfaces 44a that are provided on the pair of intermediate plates 41a protrude further toward the pressed surface 20 than the outer-side surfaces in the radial direction of the main body plates 40b. In other words, the outer-side surfaces in the radial direction of the main body plates 40b are located further on the inner side in the radial direction than the outer-side surfaces in the radial direction of the intermediate plates 41a at least at positions that are aligned with the convex surfaces 44a in the circumferential direction, and do not come in contact with the pressed surface 20. In a case of implementing the present invention, the shape of the outer-surface sides in the radial direction of the main body plates is not particularly limited. As long as the convex surfaces 44a provided on the pair of intermediate plates 41a protrude further toward the pressed surface 20 than the outer-side surfaces in the radial direction of the main body plates 40b, it is possible to use a shape for the outer-side surfaces in the radial direction of the intermediate plates that includes, for example, flat surfaces (notch surfaces) or the like at positions that are aligned with the convex surfaces 44a in the circumferential direction.

In the construction of the first example, four convex surfaces 44 that are provided on the outer-side surfaces in the radial direction of the pair of main engaging element bodies 30 come in contact with the pressed surface 20 of the housing 4; however, in this example two convex surfaces 44a that are provided on the outer-side surfaces in the radial direction of the pair of main engaging element bodies 30b come in contact with the pressed surface 20. Therefore, in this example, it is possible for the pair of pressing surfaces 32b provided on the main engaging element bodies 30b to stably come into contact with the pressed surface 20. Particularly, in the construction of the first example, each of the pair of pressing surfaces 32 is configured by a pair of convex surfaces 44 provided on each pair of main body plates 40 and arranged apart from each other in the axial direction, and thus not only processing error that occurs in each convex surface 44, but also assembly error that occurs when aligning the pairs of main body plates 40 affect the precision of the pressing surfaces 32; however, in this example, each of the pair of pressing surfaces 32b is configured by one convex surface 44b, and thus it is possible to prevent assembly error from affecting the precision of the pressing surfaces 32b.

Moreover, of the outer-side surfaces of the main engaging element bodies 30b, the convex surfaces 44a of the pressing surfaces 32b must have higher processing precision that the other portions. In this example, the number of convex surfaces 44a can be less (can be half as many) than in the construction of the first example, and thus it is possible to keep costs down for manufacturing the main engaging element bodies 30b. The other configuration and operational effects are the same as those of the first example.

Third Example

A third example of an embodiment of the present invention will be described using FIG. 24 to FIG. 28.

In this example, the holding structure for holding the biasing members (coil springs) 56a by the engaging elements 5c differs from that of the first example. In other words, in this example, the main engaging element bodies 30c of the engaging elements 5c have holding concave portions 63a that hold the biasing members 56a by inserting an end portion of each of the biasing members 56a therein. Particularly, in this example, the intermediate plates 41b of the main engaging element bodies 30c have holding concave portions 63a.

Figure 24:
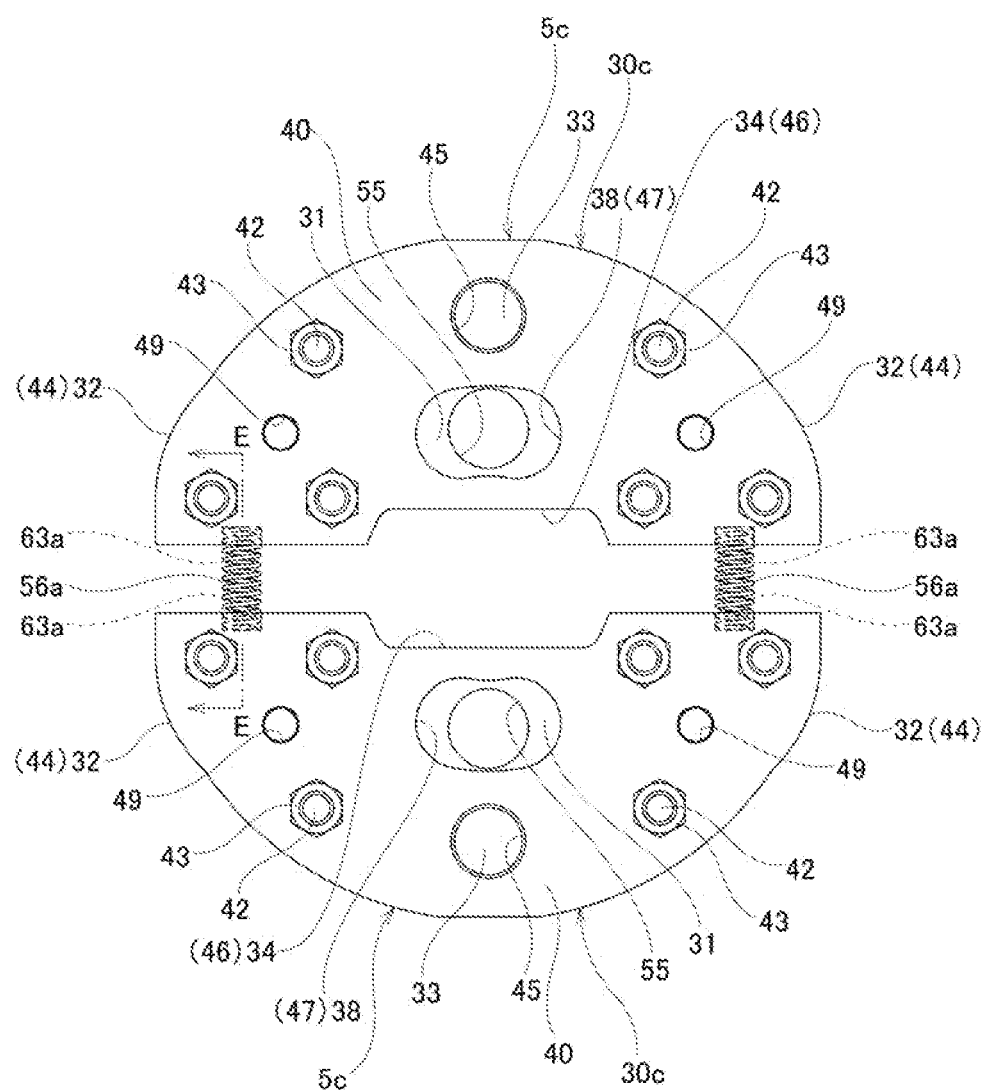
FIG. 24 is a view corresponding to FIG. 14, and illustrates the pair of engaging elements and biasing members of a reverse input cutoff clutch of a third example of an embodiment of the present invention.
Figure 25:
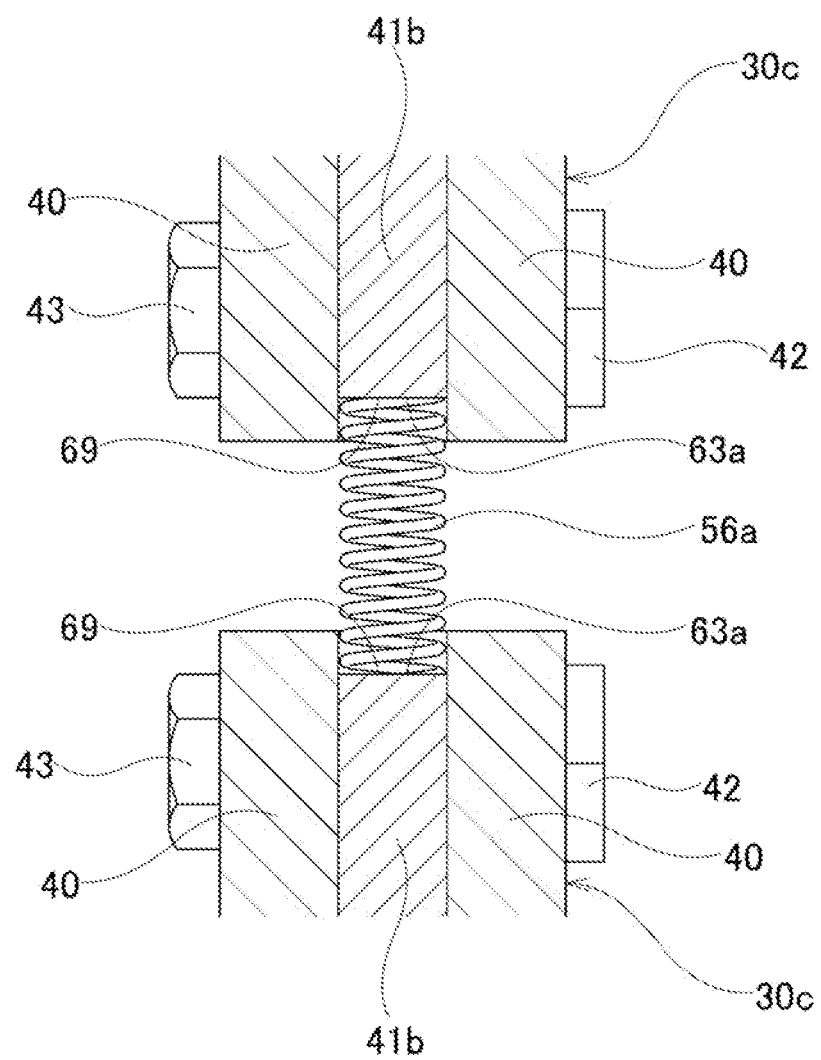
FIG. 25 is a cross-sectional view of section E-E in FIG. 24.
Figure 26:
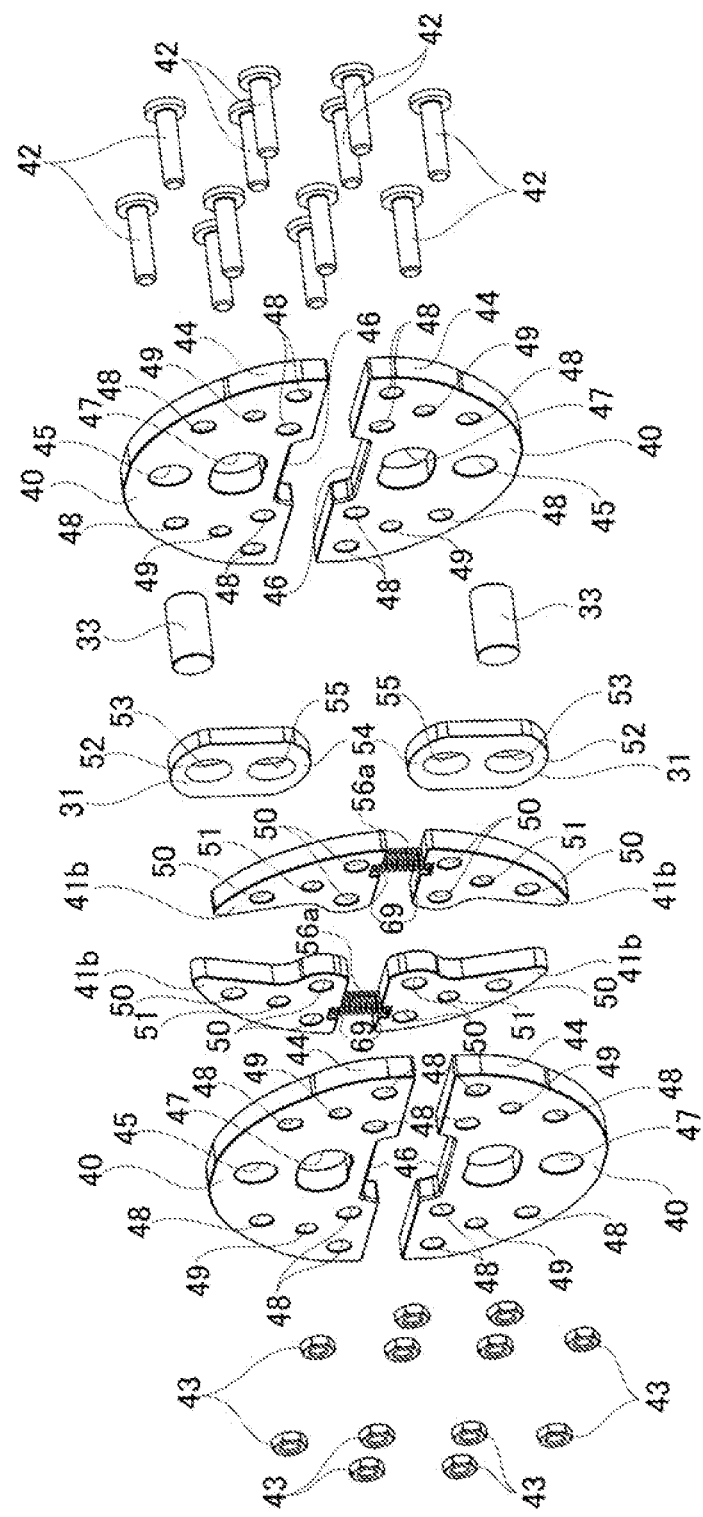
FIG. 26 is an exploded perspective view of the pair of engaging elements and biasing members of the reverse input cutoff clutch of the third example.
Figure 27:
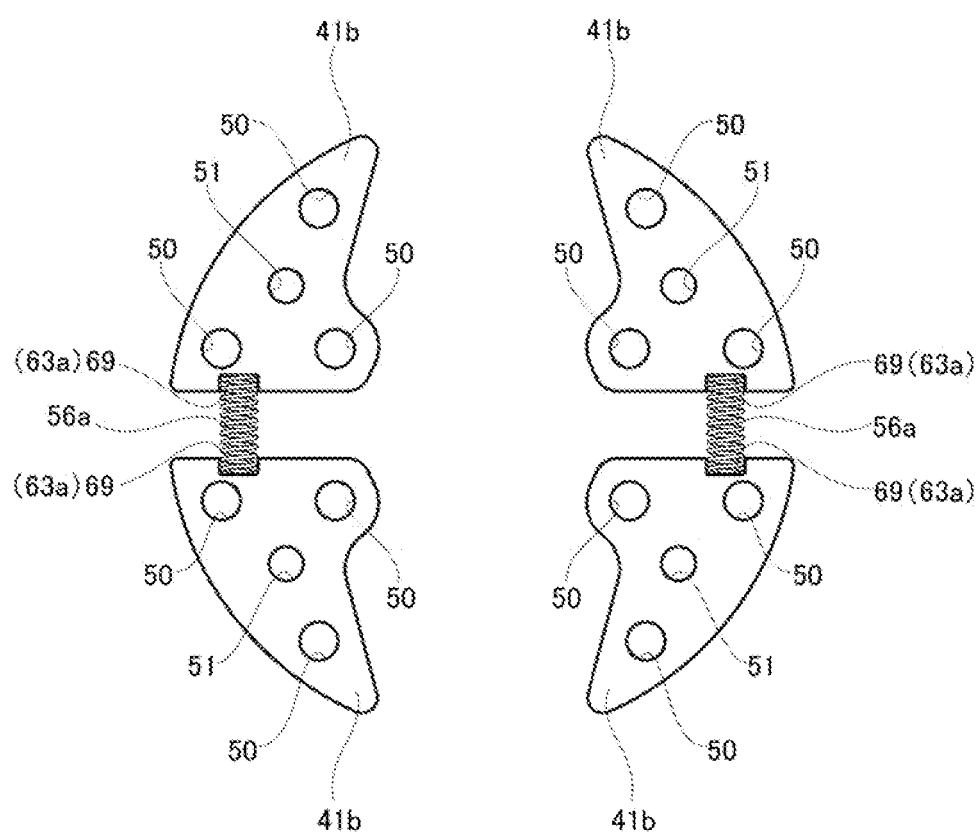
FIG. 27 is a front view of the intermediate plates and biasing members of the pair of engaging elements of the reverse input cutoff clutch of the third example.

To describe this in more detail, the main engaging element bodies 30c have holding concave portions 63a that are recessed toward the outer side in the radial direction in central portions in the thickness direction on both end portions in the width direction of the inner-side surfaces in the radial direction (axial direction of the pressed surface 20 (refer to FIG. 5), front-back direction in FIG. 24, and left-right direction in FIG. 25). The holding concave portions 63a are configured by rectangular notches 69 that are provided in intermediate portions in the width direction of end portions on the inner side in the radial direction of the intermediate plates 41b of the main engaging element bodies 30c. The notches 69 are open in three directions: toward the inner side in the radial direction, and toward both sides in the axial direction. As illustrated in FIG. 25, the notches 69 of the holding concave portions 63a are arranged at positions that are sandwiched in the thickness direction of the main engaging element bodies 30c between the end portions on the inner sides in the radial direction of the pair of main body plates 40 of the main engaging element bodies 30c. In other words, the opening portions on both sides in the axial direction of the notches 69 of the holding concave portions 63a are covered by the end portions on the inner sides in the radial direction of the pair of main body plates 40. Therefore, in the construction of this example, the holding concave portions 63a that are configured by notches 69 are open only inward in the radial direction of the main engaging element bodies 30c.

Figure 28:
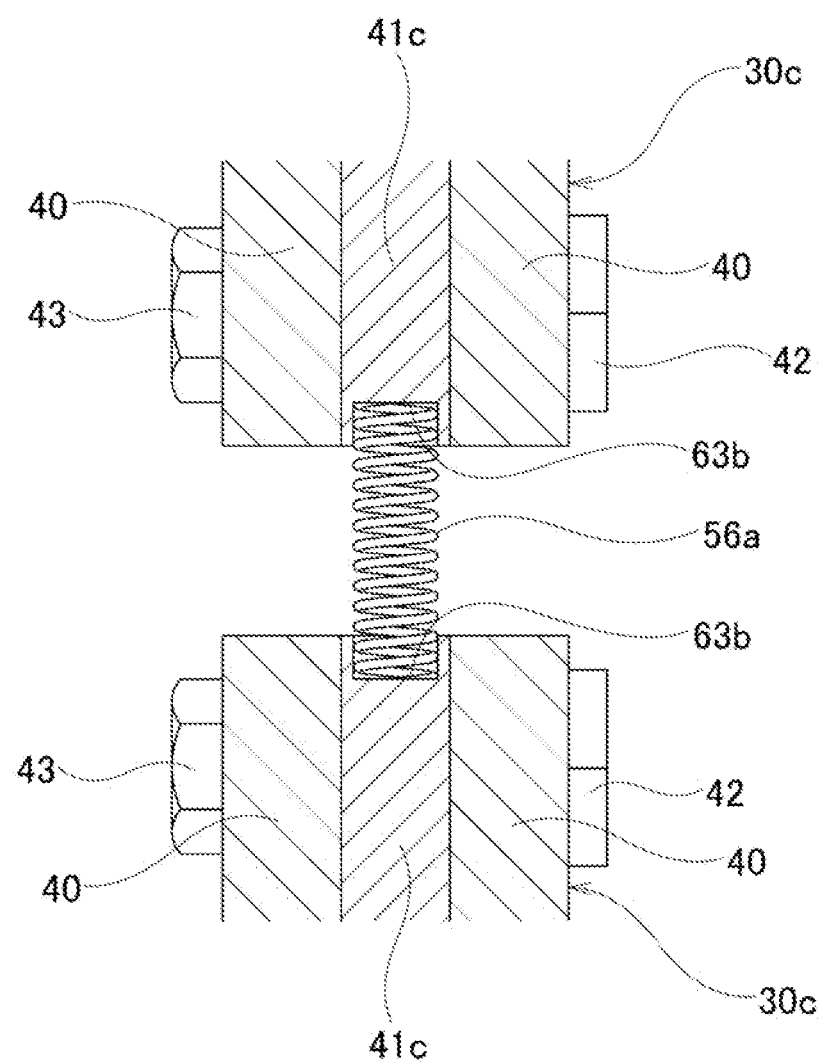
FIG. 28 is a view corresponding to FIG. 25 and illustrates a modified example of the third example.

In the assembled state of the reverse input cutoff clutch, the pair of biasing members 56a are held in these holding concave portions 63a by inserting the end portions on both sides in the axial direction into the holding concave portions 63a of the pair of main engaging element bodies 30c that face each other. As a result, the pair of biasing members 56a are prevented from falling out from between the inner-side surfaces in the radial direction of the pair of main engaging element bodies 30c in the width direction and in the axial direction of the pressed surface 20. Note that the end portions in the axial direction of the biasing members 56a may be inserted (pressure fitted) into the holding concave portions 63a with a tightening allowance, or may be inserted into the holding concave portions 63a without a tightening allowance (inserted with a small gap). Note that in a case of implementing the present invention, as illustrated in FIG. 28, the holding concave portions into which the end portions in the axial direction of the biasing members (coil springs) are inserted may be holding concave portions 63a that are open only to the intermediate portion in the thickness direction (left-right direction of FIG. 28) of the intermediate portion in the width direction (front-rear direction in FIG. 28) of the inner-side surfaces in the radial direction of the intermediate plates 41c.

The construction of this example differs from the construction of the first example in that convex portions for holding the biasing members are not provided on the inner-side surfaces in the radial direction of the pair of main engaging element bodies 30c. Accordingly, it is possible to bring the inner-side surfaces in the radial direction of the pair of main engaging element bodies 30c close to each other to shorten the distance between the inner-side surfaces in the radial direction of the pair of main engaging element bodies 30c. Therefore, it becomes easy to reduce the size in the radial direction of the reverse input cutoff clutch. The other configuration and operational effects are the same as in the first example.

Modified Examples for First to Third Examples

In a case of implementing the present invention, as modified examples for the first to third examples, it is possible to use other coupling means such as rivets, welding, adhesive, crimping or the like as coupling means for coupling the input-side housing element and the output-side housing element of the housing, or as coupling means for coupling the pair of main body plates and pair of intermediate plates of the main engaging element bodies. Moreover, as another such coupling means, it is possible to employ coupling means in which the intermediate portions in the axial direction of coupling shafts are inserted into through holes formed at positions that align a plurality of parts to be coupled with each other, retaining rings are fastened at both end portions in the axial direction of the coupling shafts, and the plurality of parts are held from both sides in the axial direction by the retaining rings.

Moreover, as modified examples for the first to third examples, it is also possible to form one intermediate plate of the pair of intermediate plates on one main body plate of the pair of main body plates as one body, and form the other intermediate plate of the pair of intermediate plates on the other main body plate of the pair of main body plates as one body. Alternatively, it is also possible to form each of the pair of intermediate plates on one main body plate of the pair of main body plates as one body. By employing these configurations, it is possible to configure the main engaging element body by combining a pair of main body plates and thus reduce the number of parts.

Figure 29:
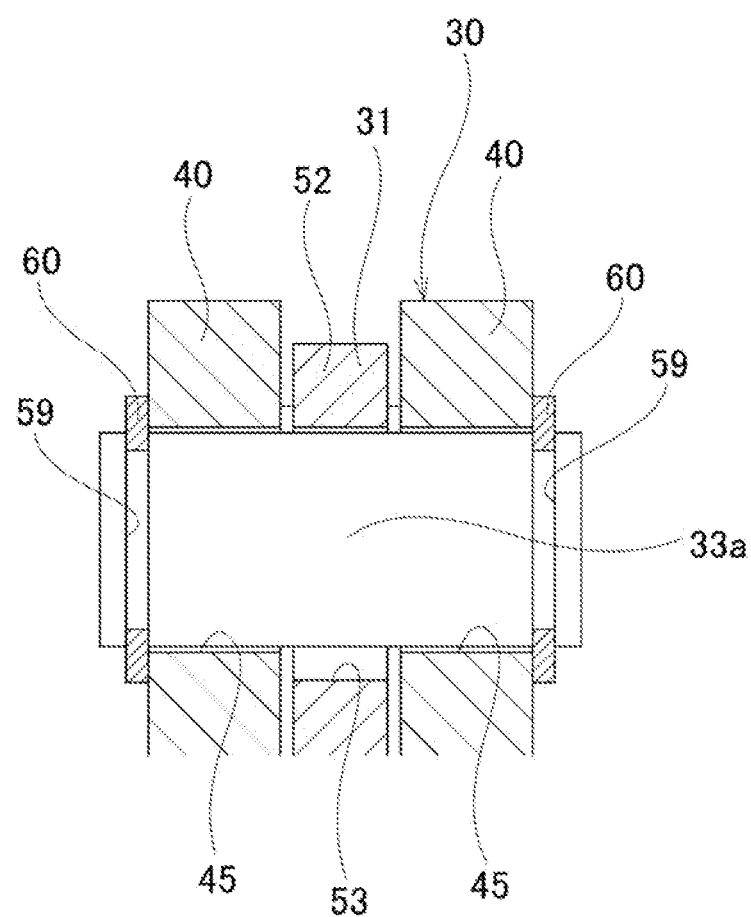
FIG. 29 illustrates a modified example of the first through third examples, and is a view corresponding to the upper-end portion in FIG. 15.
Figure 30:
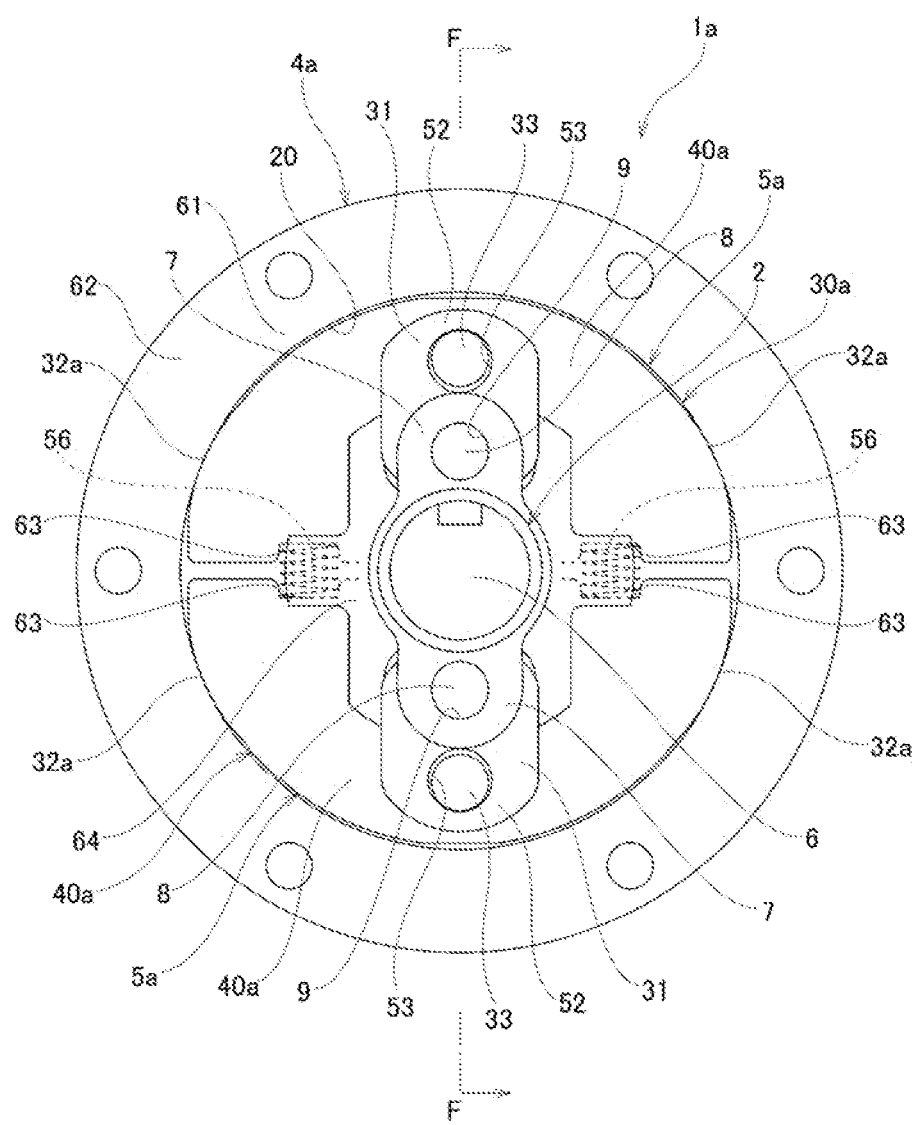
FIG. 30 is a view of a reverse input cutoff clutch of a fourth example of an embodiment of the present invention as viewed in the axial direction from the input member side.
Figure 31:
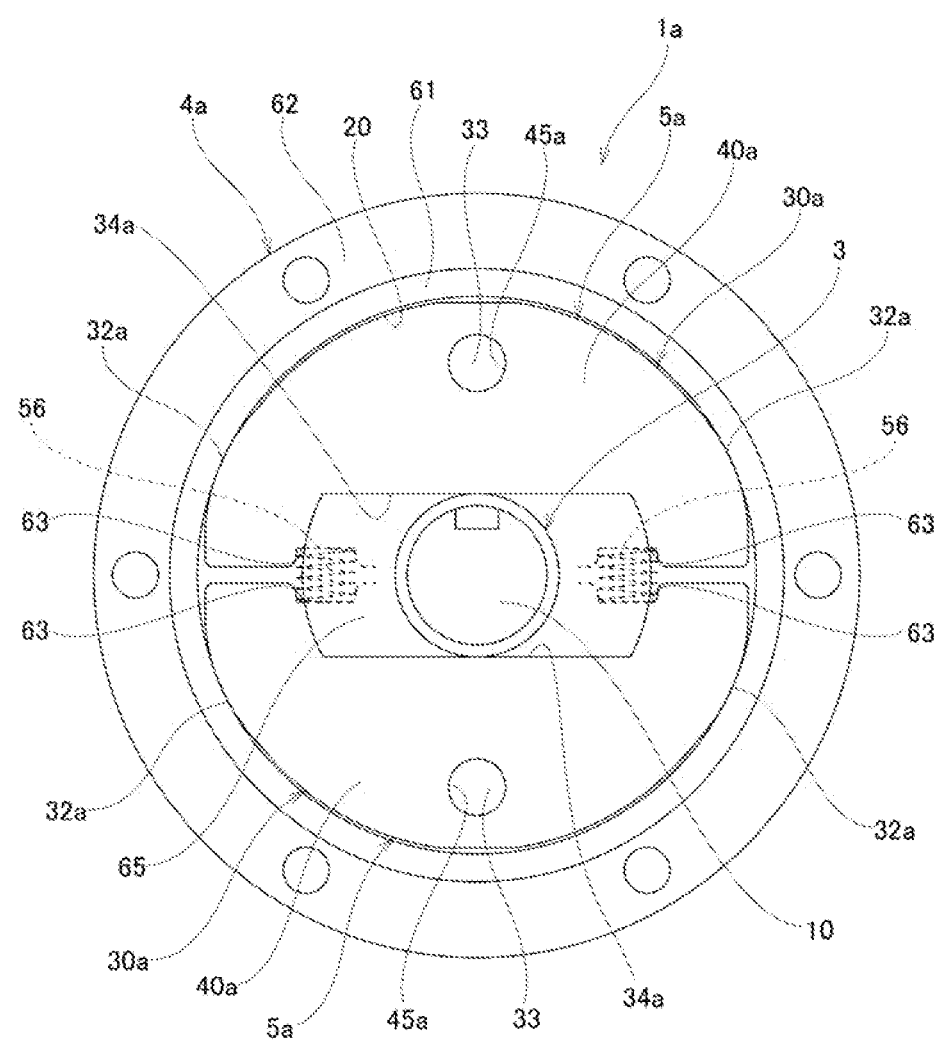
FIG. 31 is a view of the reverse input cutoff clutch of the fourth example as viewed in the axial direction from the output member side.
Figure 32:
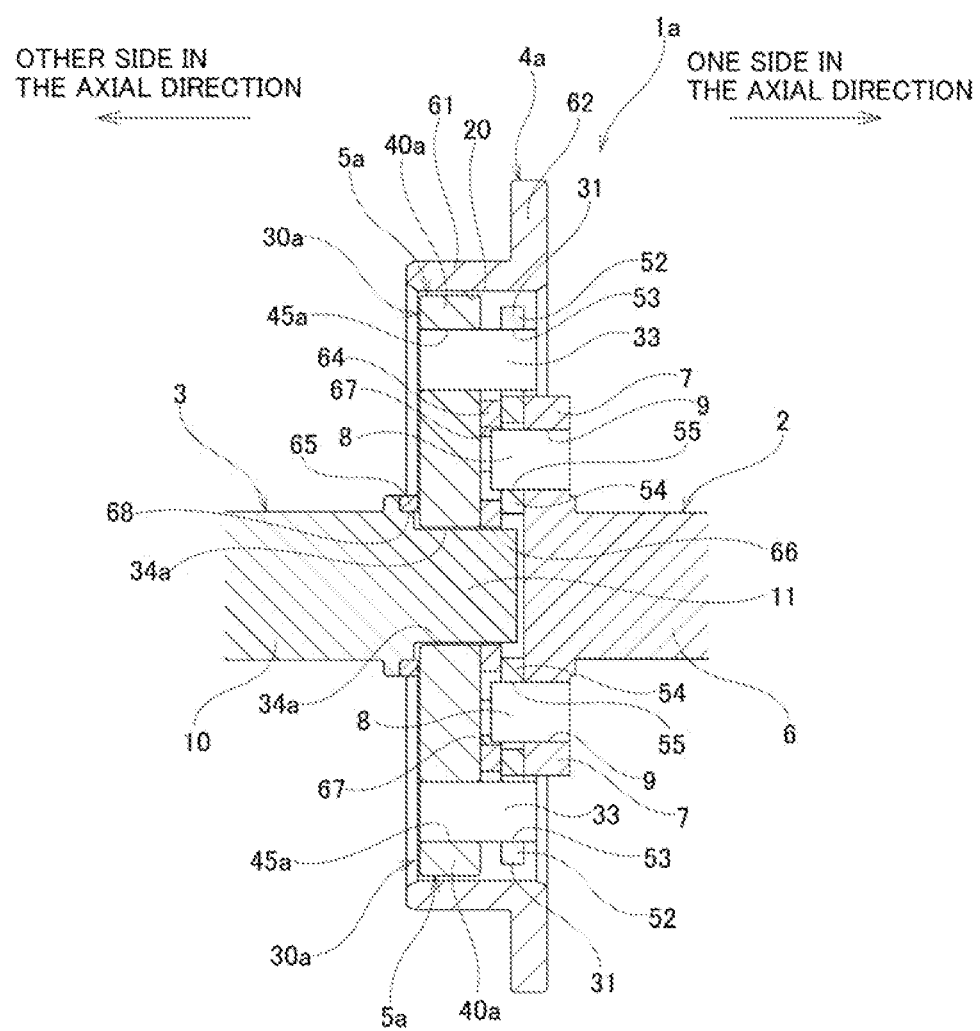
FIG. 32 is a cross-sectional view of section F-F in FIG. 30.
Figure 33:
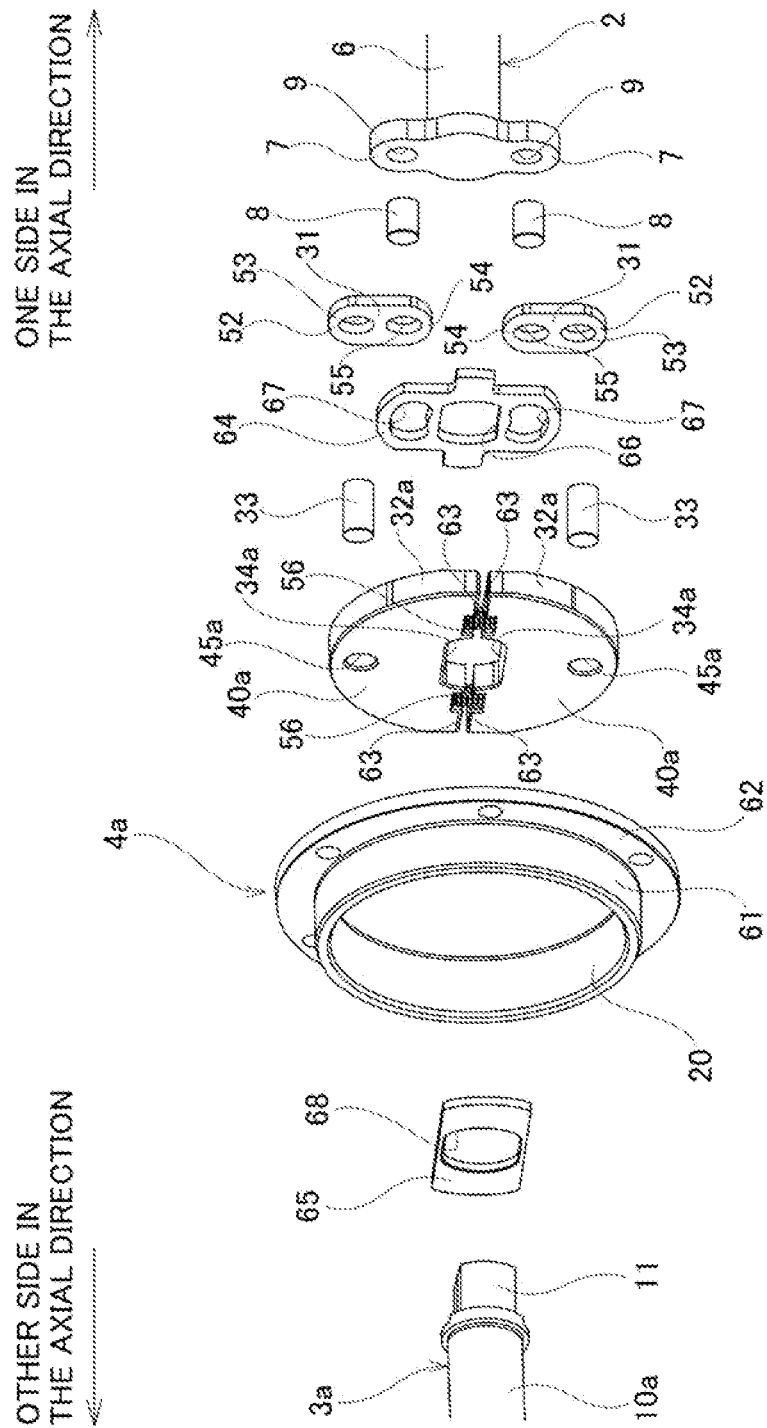
FIG. 33 is an exploded perspective view of the reverse input cutoff clutch of the fourth example.

Moreover, as modified examples for the first to third examples, it is possible to employ a configuration such as illustrated in FIG. 29. In this modified example, the portions near both ends in the axial direction of the pivot-support shaft 33a are inserted through support holes 45 in each of the pair of main body plates 40 with no tightening allowance, retaining rings 60 are fastened to fastening grooves 59 in the circumferential direction that are provided around the outer peripheral surfaces of the end portions on both sides in the axial direction of the pivot-support shaft 33a, and the pair of main body plates 40 are lightly held from both sides in the axial direction by these retaining rings 60. In this state, the pivot-support shaft 33a is able to rotate around the center axis of the pivot-support shaft 33a with respect to the pair of main body plates 40. With this kind of configuration, the link member 31 can be rotated together with the pivot-support shaft 33a with respect to the main engaging element body 30, or in other words, the link member 31 can be rotated more smoothly, and thus it is possible to perform operation when rotational torque is applied to the input member more smoothly. Note that when it is desired that the link member 31 be pivotally moved more smoothly, it is possible to employ a configuration of rotatably supporting the pivot-support shaft (pin) about the center axis of the pivot-support shaft with respect to the main body plates 40 by a bearing, or configuration of rotatably supporting the input-side engaging portion (pin) about the center axis of the input-side engaging portion with respect to the input-shaft portion of the input member by a bearing.

In the first to third examples, a configuration is employed in which one link member is pivotally arranged between a pair of main body plates; however, as modified examples when implementing the present invention, it is also possible to employ a configuration in which a pair of link members is pivotally arranged on both sides in the thickness direction of one main body plate (the input-side engaging portion pulls the main engaging element body inward in the radial direction through the pair of link members).

In the first to third examples, a pair of engaging elements are provided as the engaging elements. However, as long as the construction allows for the engaging element to move toward or away from the pressed surface, in the first to third examples, it is possible to employ construction in which one engaging element is provided, and that one engaging element is combined with one input-side engaging portion. Moreover, in the first to third examples, it is possible to employ construction in which three or more engaging elements are provided, and the engaging elements are combined with corresponding input-side engaging portions. These kinds of construction are also included in the scope of the present invention.

Fourth Example

A fourth example of an embodiment of the present invention will be described using FIG. 30 to FIG. 33.

In the reverse input cutoff clutch 1a of this example, the housing 4a has an L-shaped cross-sectional shape, and has an annular shape as a whole that includes a cylindrical portion 61, and a circular-ring portion 62. The cylindrical portion 61 has a pressed surface 20 around the inner peripheral surface thereof. The circular-ring portion 62 extends outward in the radial direction from the end portion on the one side in the axial direction of the cylindrical portion 61.

Each of the pair of engaging elements 5a is configured by a main engaging element body 30a that is a combination of one main body plate 40a and one pivot-support shaft 33. The main body plate 40a is a press-molded part that is made by punching a metal plate such as steel plate or the like by press working, and has a substantially semi-circular plate shape. The main body plate 40a has pressing surfaces 32a at two locations on a convex circular arc-shaped outer-side surface in the radial direction corresponding to the arc of the main body plate 40a. The main body plate 40a has a circular support hole 45 in an outer-side portion in the radial direction of the central portion in the width direction. The main body plate 40a has an output-side engaged portion 34a in the central portion in the width direction of the inner-side surface in the radial direction corresponding to the chord of the main body plate 40a, and is recessed outward in the radial direction. The main body plate 40a has holding concave portions 63 in each of both side portions in the width direction of the end portions on the inner side in the radial direction, and the concave portions 63 are configured by notches. In other words, each holding concave portion 63 is configured so as to be open in three directions: the inner side in the radial direction and both sides in the axial direction. The portion on the other side in the axial direction, which is the portion on the base-end side in the axial direction, of the pivot-support shaft 33 is pressure fitted and fixed inside the support hole 45a of the main body plate 40a. In other words, the portion on the other side in the axial direction of the pivot-support shaft 33 is supported in a cantilever form by the main body plate 40a.

For each of the pair of engaging elements 5a, the link member 31 is arranged on the one side in the axial direction of the main body plate 40a. Then, the pivot-support shaft 33 is inserted through a first hole 53 of the link member 31, and the input-side engaging portion 8 of the input member 2 is inserted through a second hole 55 of the link member 31, the second hole 55 corresponding to the input-side engaged portion.

The pair of biasing members 56 are arranged between holding concave portions 63 that are provided on both side portions in the width direction of the end portion on the inner side in the radial direction of the pair of main body plates 40a of the pair of engaging elements 5a.

The reverse input cutoff clutch 1a of this example further includes a pair of holding plates 64, 65. The holding plate 64 is arranged at a position in the axial direction that is sandwiched between the side surfaces on the one side in the axial direction of the pair of main body plates 40a and the side surfaces on the other side in the axial direction of the pair of link members 31. The holding plate 65 is arranged at a position in the axial direction sandwiched between the pair of main body plates 40a and the end surface on the one side in the axial direction of the output-shaft portion 10a of the output member 3a. Both side portions in the width direction of the pair of holding plates 64, 65 cover the opening portions on both sides in the axial direction of each of the holding concave portions 63. In other words, both side portions in the width direction of the pair of holding plates 64, 65 are arranged on both sides of the pair of biasing members 56 in the axial direction. As a result, the pair of biasing members 56 are prevented from falling out in the axial direction from between the opposing holding concave portions 63 of the pair of main body plates 40a. Note that the holding plate 64 has a fitting hole 66 in the central portion into which the tip-end portion of the output-side engaging portion 11 is internally fitted so that relative rotation is not possible, and has insertion holes 67 in both side portions in the radial direction through which the tip-end portions of the input-side engaging portions 8 are loosely inserted. The holding plate 65 has a fitting hole 68 in the central portion into which the tip-end portion of the output-shaft portion 10a is internally fitted so that relative rotation is not possible.

With the reverse input cutoff clutch 1a of this example, it is possible to reduce the number of parts of both the housing 4a and the pair of engaging elements 5a. The other configuration and operational effects are the same as those in the first example.

Fifth Example

A fifth example of an embodiment of the present invention will be described using FIG. 34 to FIG. 37.

Figure 34:
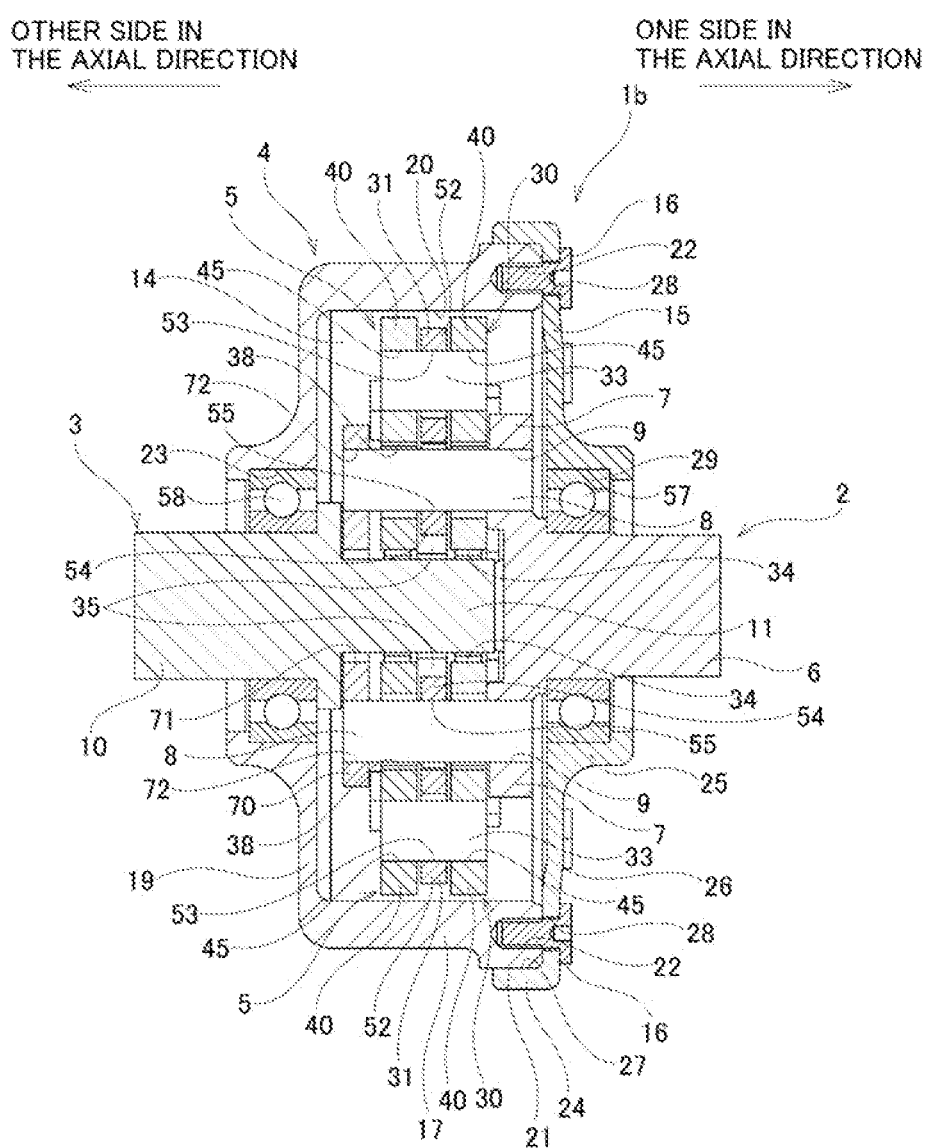
FIG. 34 is a cross-sectional view of a reverse input cutoff clutch of a fifth example of an embodiment of the present invention.
Figure 35:
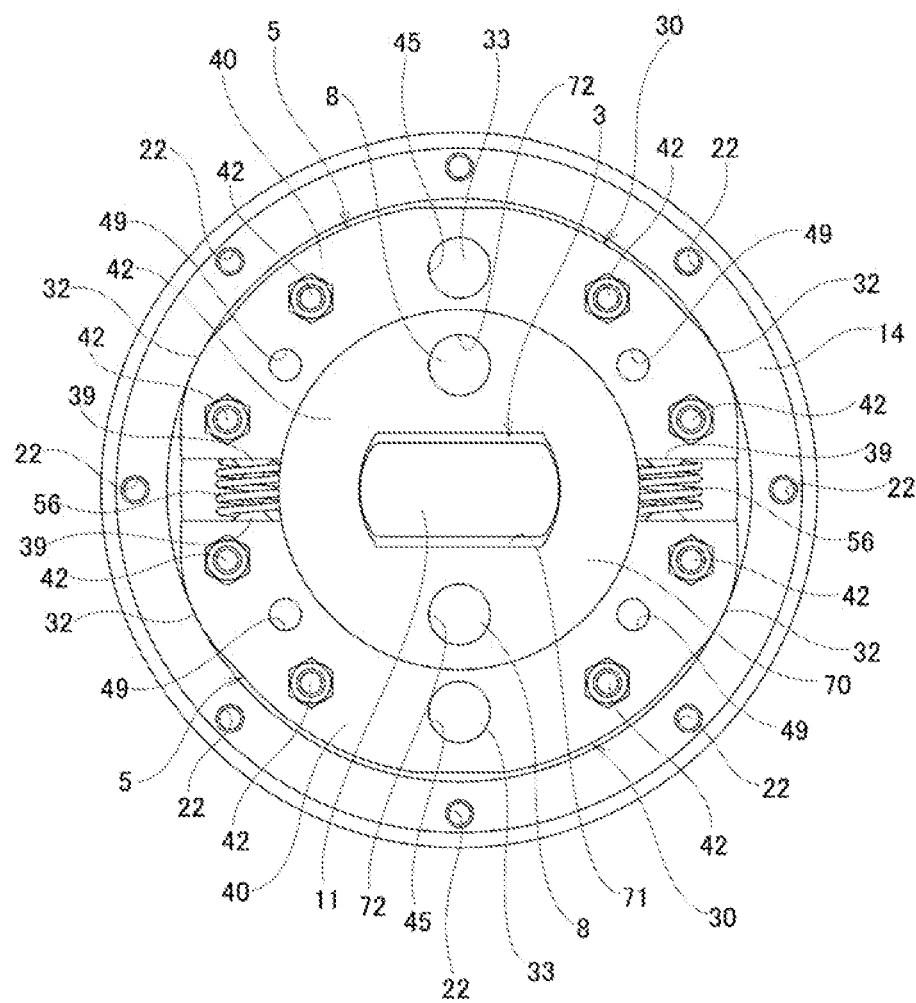
FIG. 35 is a view of the reverse input cutoff clutch of the fifth example as viewed in the axial direction from the output member and illustrates a state with the input member, the pair of engaging elements, the pair of biasing members, and reinforcing members removed.

The reverse input cutoff clutch 1b of this example further includes a reinforcing member 70 that spans between each of the tip-end portions of the pair of input-side engaging portions 8 of the input member 2 (end portions on the other side in the axial direction; the end portions on the left side in FIG. 34). Therefore, in this example, the dimension in the axial direction of the input-side engaging portions 8 (amount of protrusion from the side surface on the other side in the axial direction of the input-arm portion 7) is longer than that in the construction of the first example.

Figure 36:
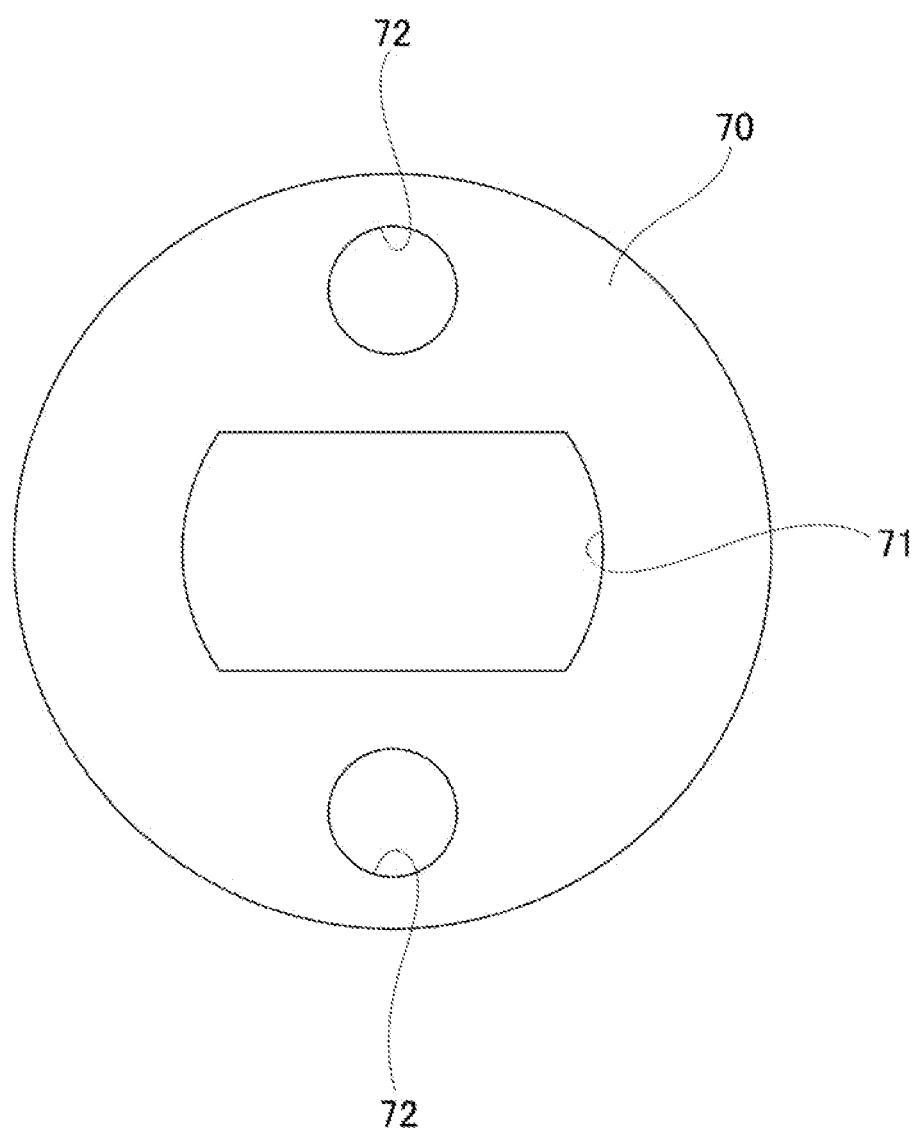
FIG. 36 and end view of the reinforcing member of the reverse input cutoff clutch of the fifth example.
Figure 37:
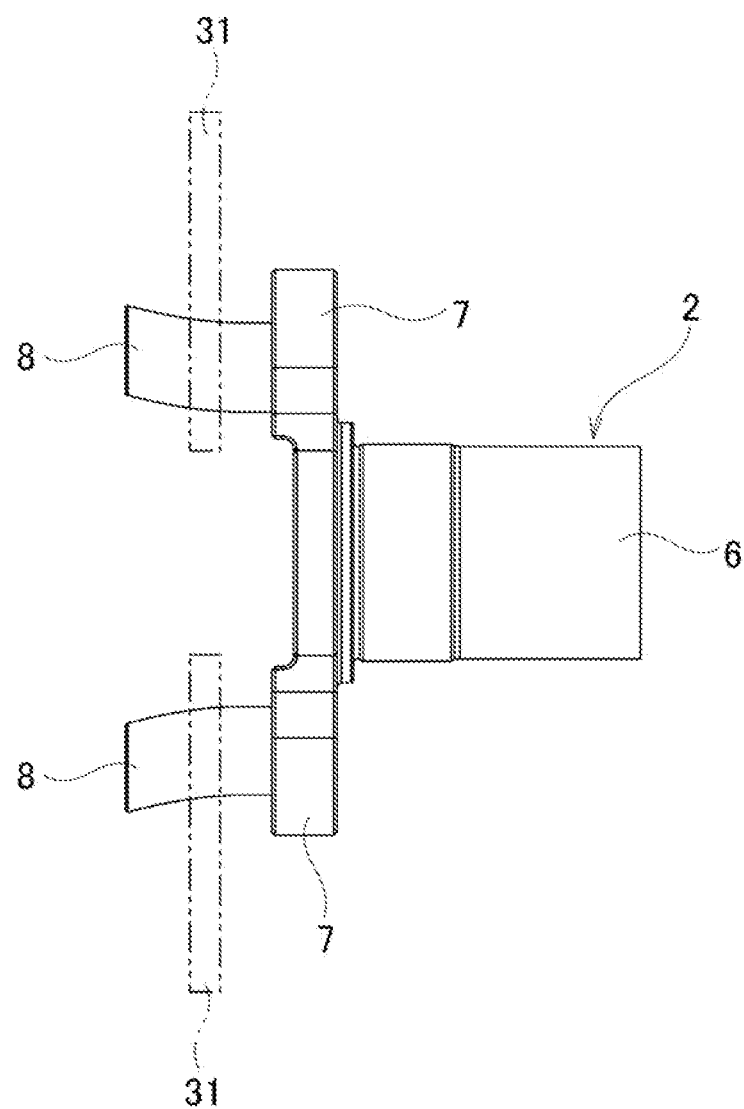
FIG. 37 is a side view for describing an effect of having the reinforcing member.
Figure 38:
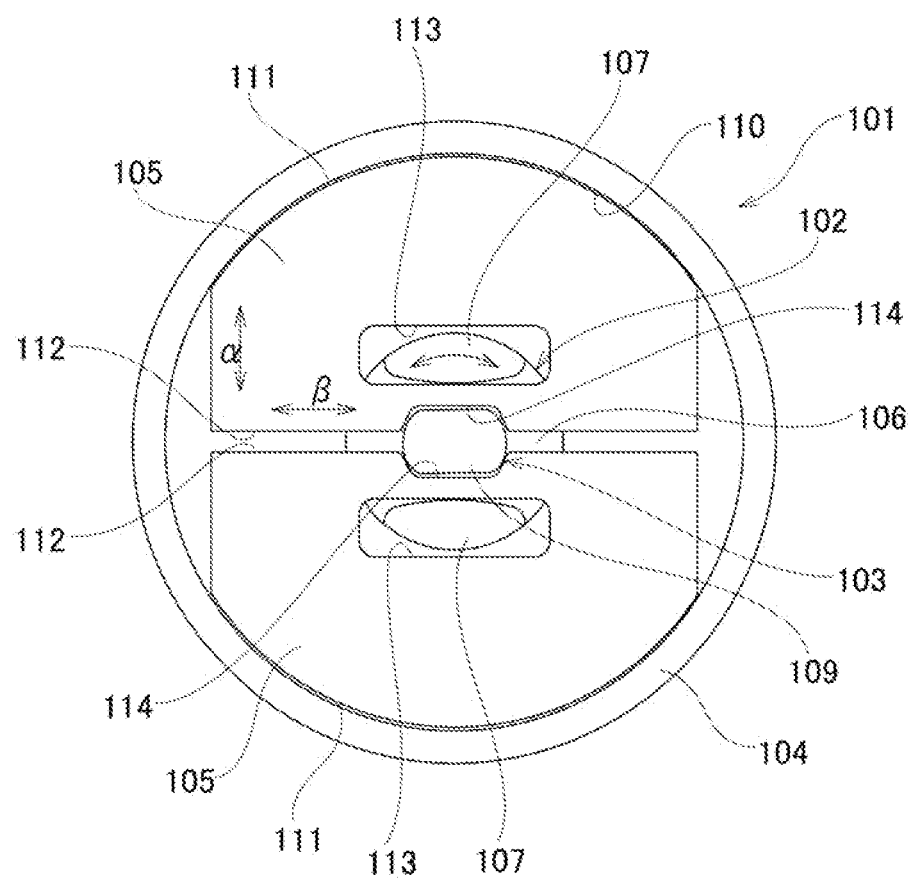
FIG. 38 is a view illustrating a conventional reverse input cutoff clutch.
Figure 39:
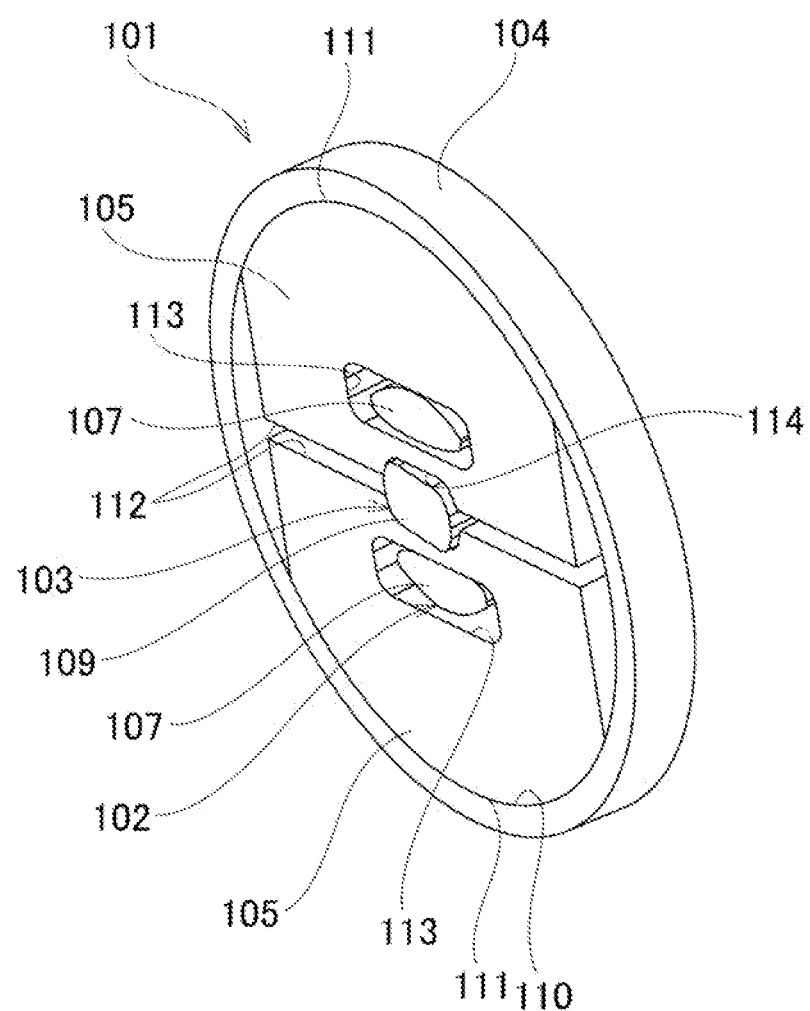
FIG. 39 is a perspective view of a conventional reverse input cutoff clutch.
Figure 40:
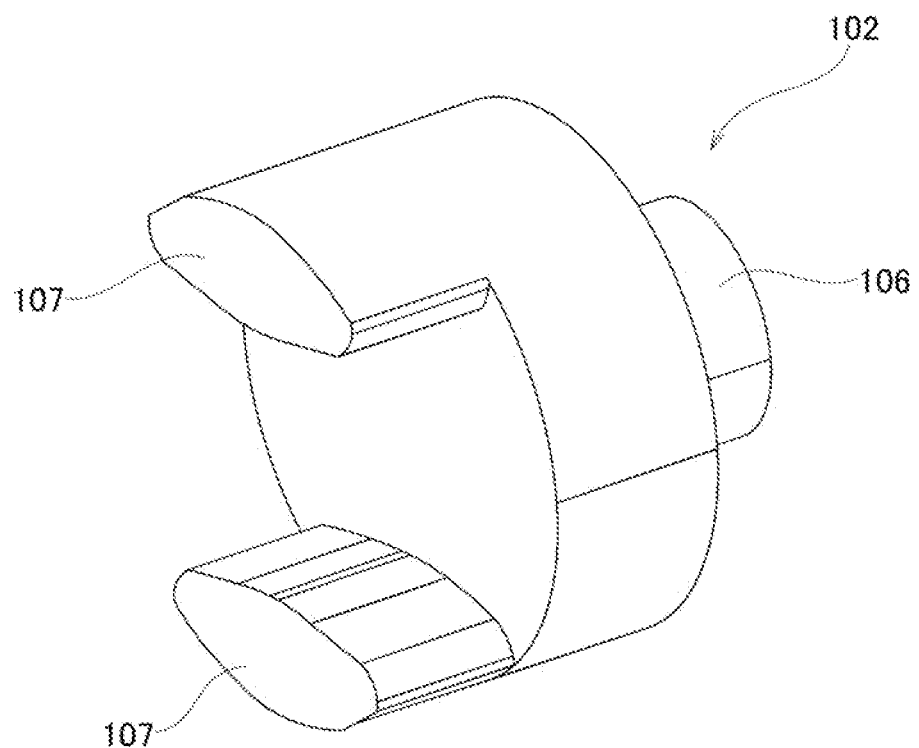
FIG. 40 is a perspective view illustrating part of an input member of a conventional reverse input cutoff clutch.
Figure 41:
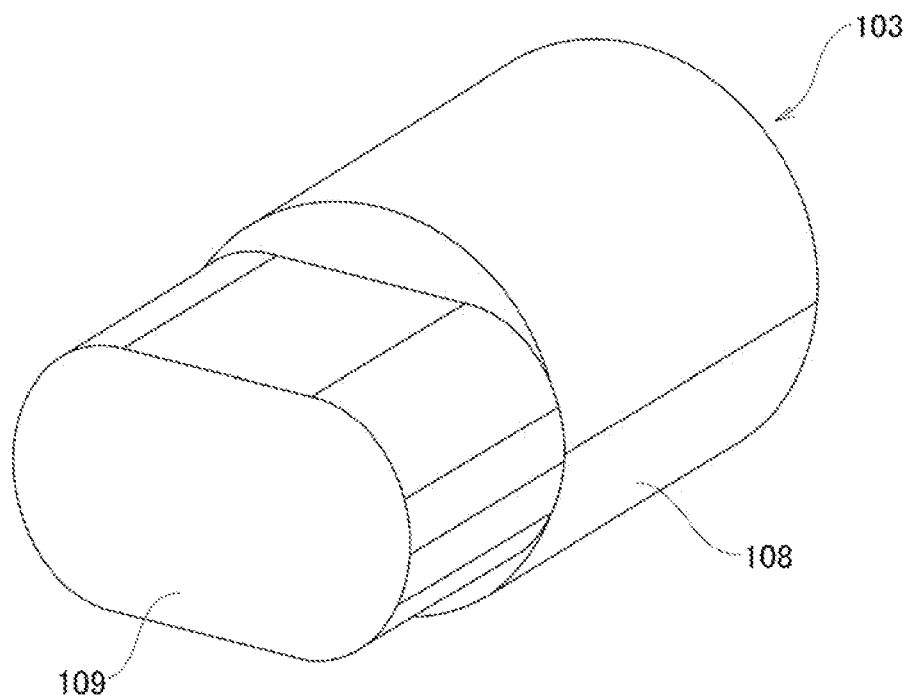
FIG. 41 is a perspective view illustrating part of an output member of a conventional reverse input cutoff clutch.
Figure 42:
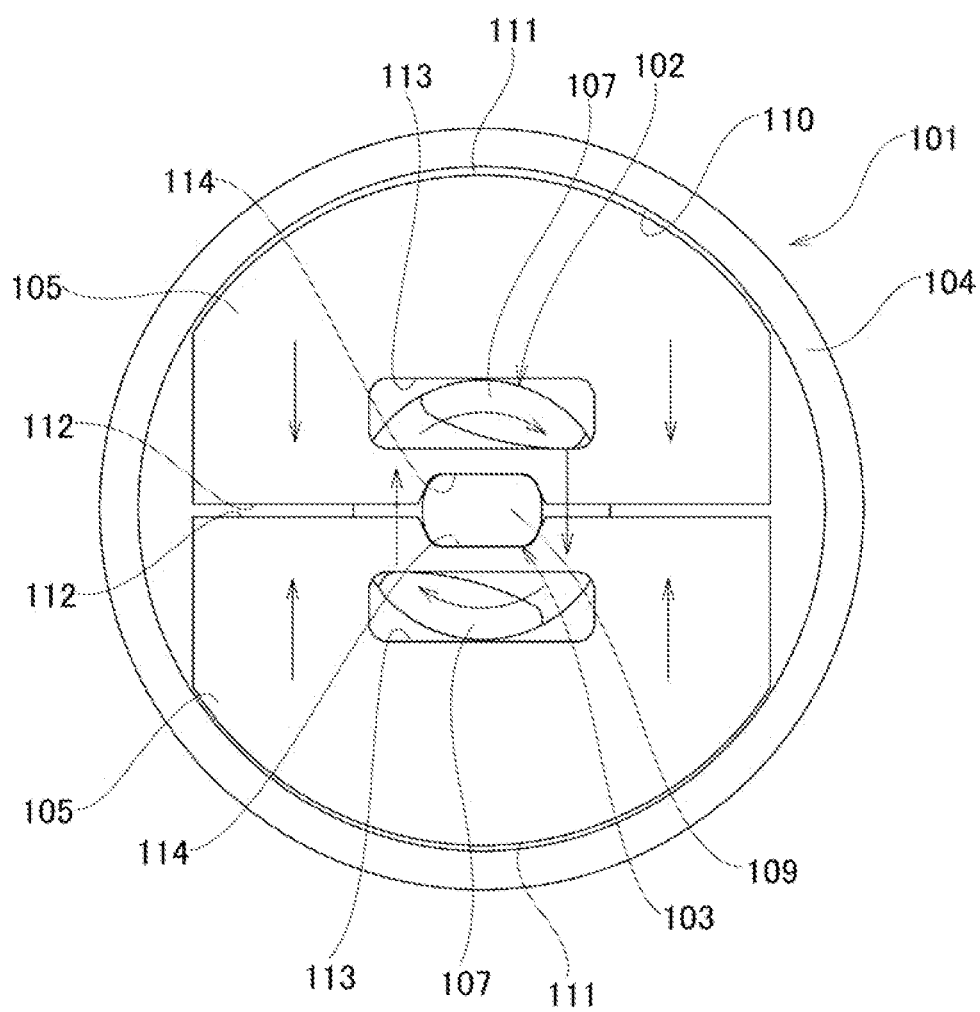
FIG. 42 is a view of a conventional reverse input cutoff clutch, and illustrates a state in which rotational torque is inputted to the input member.
Figure 43:
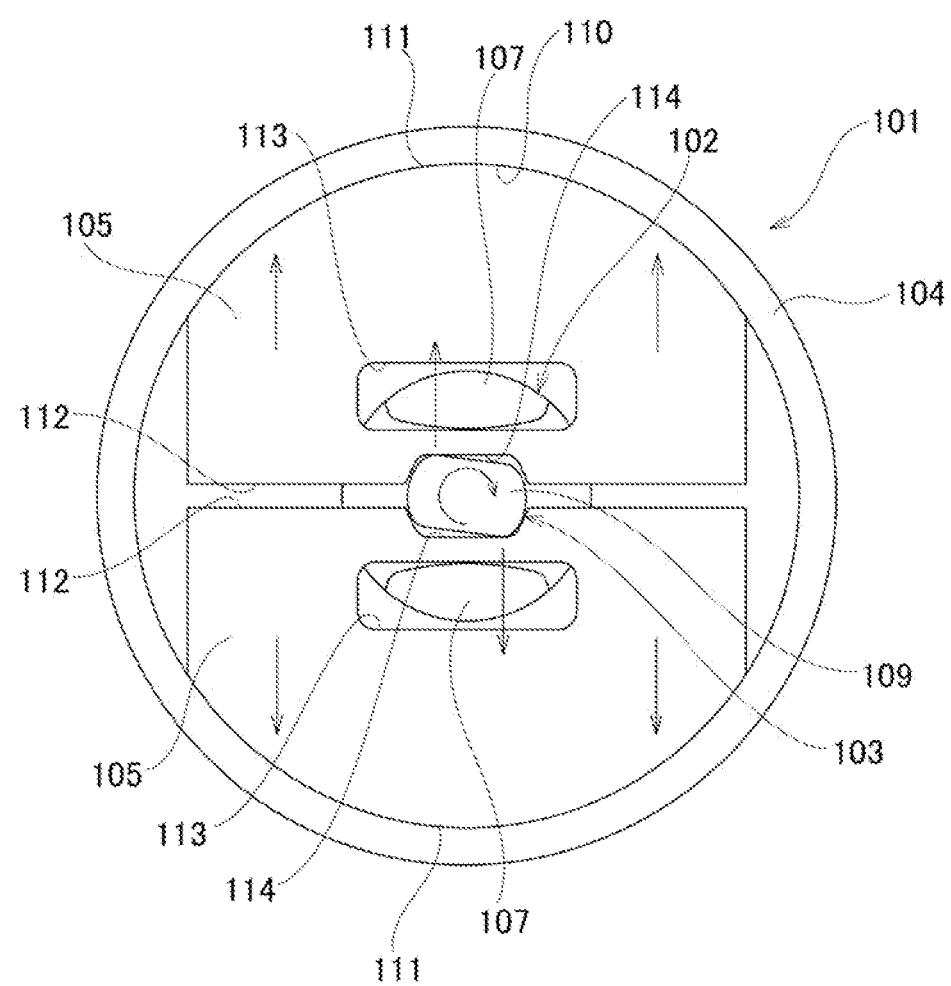
FIG. 43 is a view of a conventional reverse input cutoff clutch, and illustrates a state in which rotational torque is reversely inputted to the output member.
Figure 44:
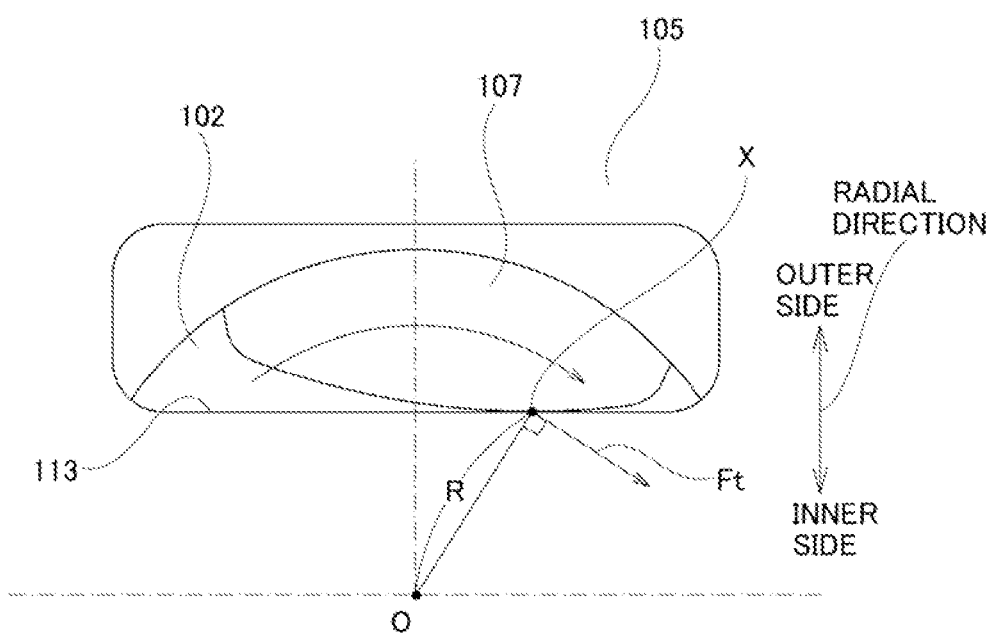
FIG. 44 is a partial enlarged view of FIG. 42.

The reinforcing member 70, as illustrated in FIG. 36, has a circular plate shape, and in the central portion, includes an insertion hole 71 having a long rectangular-shaped opening, and includes pressure-fitting holes 72 in portions sandwiching the insertion hole 71 from both sides in the minor axis direction of the insertion hole 71.

The insertion hole 71 has a size that allows the output-side engaging portion 11 to be loosely inserted therein. Therefore, the output-side engaging portion 11 is able to rotate on the inner side of the insertion hole 71 relative to the insertion hole 71 (reinforcing member 70).

Each of the pressure-fitting holes 72 has an inner-diameter dimension that is slightly smaller than the outer-diameter dimension of each of the tip-end portions of the input-side engaging portions 8. Each of the pressure-fitting holes 72 is externally fitted by pressure fitting over each of the tip-end portions of the input-side engaging portions 8 (portions of the input-side engaging portions 8 that protrude from the side surfaces on the other side in the axial direction of the main body plates 40 on the other side in the axial direction), whereby a reinforcing member 70 is proved so as to span to each of the tip-end portions of the input-side engaging portions 8. Therefore, the reinforcing member 70 rotates together with the input member 2 as the input member 2 rotates.

In this example, the reinforcing member 70 spans to each of the tip-end portions of the input-side engaging portions 8, and thus it is possible to prevent the input-side engaging portions 8 from deforming in the directions away from each other. The reason for this will be explained below.

When rotational torque is reversely inputted to the output member 3, each of the pressing surfaces 32 of the pair of engaging elements 5 is pressed toward the pressed surface 20, each of the pressing surfaces 32 frictionally engages with the pressed surface 20, and the reverse input cutoff clutch 1a is switched to a locked state or semi-locked state. As the rotational torque that is reversely inputted to the output member 3 becomes larger, the force pressing each of the pressing surfaces 32 against the pressed surface 20 becomes larger, and the frictional engagement force that acts between each of the pressing surfaces 32 and the pressed surface 20 becomes larger.

When rotational torque is inputted to the input member 2, the input-side engaging portions 8, through the link members 31 and the pivot-support shafts 33, cause each of the pressing surfaces 32 of the main engaging element bodies 30 to move in directions away from the pressed surface 20, and each of the pressing surfaces 32 becomes separated from the pressed surface 20 (the frictional engagement force acting between each of the pressing surfaces 32 and the pressed surface 20 is lost). As a result, the reverse input cutoff clutch 1b is switched to the unlocked state.

Here, in a case where the reverse input cutoff clutch 1b is switched to the locked state or the semi-locked state and a large rotational torque is reversely inputted to the output member 3 and the frictional engagement force due to the wedge effect that acts between each of the pressing surfaces 32 and the pressed surface 20 is large, the torque required for switching the reverse input cutoff clutch 1b from the locked state or semi-locked state to an unlocked state (release torque) becomes large. When the release torque becomes large and the reverse input cutoff clutch 1b is switched from a locked state or semi-locked state to an unlocked state, as the force in a direction toward the outer side in the radial direction of the main engaging element bodies 30 applied to the input-side engaging portions 8 from the link members 31 of the engaging elements 5 in the engaged state with the pressed surface 20 becomes large, then as exaggeratedly illustrated in FIG. 37, there is a possibility that the pair of input-side engaging portions 8 of the input member 2 will deform so as to become curved in directions away from each other. When such deformation occurs, there is a possibility that it will become easy for unbalanced contact and wear to occur between the input-side engaging portions 8 and the second holes 55 that correspond to the input-side engaged portions (refer, for example, to FIG. 6), and when the reverse input cutoff clutch 1a is switched from the locked state or the semi-locked state to the unlocked state, the main engaging element bodies 30 will incline so as to tilt in the axial direction, and there is a possibility that it will become difficult to smoothly switch to the unlocked state.

The reverse input cutoff clutch 1b of this example is provided with a reinforcing member 70 that spans to each of the tip-end portions of the input-side engaging portions 8, and thus is capable of preventing the input-side engaging portions 8 from deforming in directions away from each other. As a result, it is possible to prevent unbalanced contact between the input-side engaging portions 8 and the second holes 55, it is possible to suppress the occurrence of wear, it is possible to prevent inclination of the main engaging element bodies 30 so as to tilt in the axial direction, and it is possible to smoothly switch to the unlocked state. The configuration and operational effects of the other parts are the same as those in the first example.

The configurations of the first to fifth examples of an embodiment of the present invention described above (including the modified examples and alternative examples) can be appropriately combined and implemented within a range of no contradiction.

In a case of implementing the present invention, the biasing members that elastically press the pair of engaging elements toward the pressed surface are not limited to being coil springs and could be other kinds of springs such as leaf springs, disc springs, and the like, or could be an elastic member. The biasing members that elastically press the pair of engaging elements toward the pressed surface, in addition to being arranged so as to be sandwiched between the pair of engaging elements, may also be arranged so as to be sandwiched between the engaging element and another member, (for example, the output member).

Note that in the present invention, the configuration of the pair of guide surfaces of the output-side engaging portion and the pair of guided surfaces of the output-side engaged portions, and the reinforcing member that spans the pair of input-side engaging portions may also be applied to the conventional reverse input cutoff clutch described above.

REFERENCE SIGNS LIST 1, 1a Reverse input cutoff clutch
2 Input member
3 Output member
4, 4a Housing
5, 5a, 5b, 5c Engaging element
6 Input-shaft portion
7 Input-arm portion
8 Input-side engaging portion
9 Support hole
10, 10a Output-shaft portion
11 Output-side engaging portion
12 Side surface
13 Guide surface
14 Output-side housing element
15 Input-side housing element
16 Bolt
17 Outer-diameter-side tubular portion
18 Inner-diameter-side tubular portion
19 Side plate portion
20 Pressed surface
21 Output-side in-row fitting surface
22 Screw hole
23 Output-side bearing fitting surface
24 Outer-diameter-side tubular portion
25 Inner-diameter-side tubular portion
26 Side plate portion
27 Input-side in-row fitting surface
28 Through hole
29 Input-side bearing fitting surface
30, 30a, 30b, 30c Main engaging element body
31 Link member
32, 32a, 32b Pressing surface
33, 33a Pivot-support shaft
34, 34a Output-side engaged portion
35 Internal space
36 Bottom surface
37 Guided surface
38 Insertion hole
39 Holding convex portion
40, 40a, 40b Main body plate
41, 41a, 41b, 41c Intermediate plate
42 Bolt
43 Nut
44, 44a Convex surface
45, 45a Support hole
46 Concave portion
47 Through hole
48 Through hole
49 Positioning hole
50 Through hole
51 Positioning hole
52 First end portion
53 First hole
54 Second end portion
55 Second hole (Input-side engaged portion)
56, 56a Biasing member
57 Input-side bearing
58 Output-side bearing
59 Fastening groove
60 Retaining ring
61 Cylindrical portion
62 Circular-ring portion
63, 63a, 63b Holding concave portion
64 Holding plate
65 Holding plate
66 Fitting hole
67 Insertion hole
68 Fitting hole
69 Notch
70 Reinforcing member
71 Insertion hole
72 Pressure-fitting hole
101 Reverse input cutoff clutch
102, 102z Input member
103 Output member
104 Pressed member
105 Engaging element
106 Input-shaft portion
107, 107z Input-side engaging portion
108 Output-shaft portion
109 Output-side engaging portion
110 Pressed surface
111 Pressing surface
112 Bottom surface
113 Input-side engaged portion
114 Output-side engaged portion

The invention claimed is:

1. A reverse input cutoff clutch, comprising:
a pressed member having a pressed surface around an inner peripheral surface thereof;
an input member having an input-side engaging portion arranged on an inner side in a radial direction of the pressed surface, the input member being coaxially arranged with the pressed surface;
an output member having an output-side engaging portion on the inner side in the radial direction of the pressed surface arranged further on the inner side in the radial direction than the input-side engaging portion, the output member being coaxially arranged with the pressed surface; and
an engaging element having a main engaging element body and a link member, the engaging element being arranged on the inner side in the radial direction of the pressed surface so as to be able to move in a first direction as a direction away from or toward the pressed surface;
the main engaging element body comprising a pressing surface facing the pressed surface, a pivot-supporting portion located on a side nearer to the pressed surface than the input-side engaging portion in the first direction, an output-side engaged portion engaging with the output-side engaging portion, a pair of main body plates coupled together and arranged so as to overlap in an axial direction of the pressed surface; and a pivot-support shaft having both side portions in the axial direction supported by the pair of main body plates;
the output-side engaged portion provided in the pair of main body plates;
the pivot-supporting portion configured by the pivot-support shaft;
the link member comprising a first end portion pivotally linked to the pivot-supporting portion, and a second end portion pivotally linked to the input-side engaging portion, the link member arranged between the pair of main body plates; and
the engaging element, by the pivot-supporting portion being pulled by the input-side engaging portion through the link member when rotational torque is inputted to the input member, displacing so as to move away from the pressed surface, and by causing the output-side engaged portion to engage with the output-side engaging portion, transmitting the rotational torque inputted to the input member to the output member; and when rotational torque is reversely inputted to the output member, by pressing the pressing surface against the pressed surface due to engagement between the output-side engaging portion and the output-side engaged portion, causing the pressing surface to frictionally engage with the pressed surface.

2. The reverse input cutoff clutch according to claim 1, wherein
the main engaging element body has an insertion hole;
the input-side engaging portion is inserted through the insertion hole; and
between the input-side engaging portion and the inner surface of the insertion hole, there is a gap that allows the input-side engaging portion to displace in a direction of rotation of the input member with respect to the main engaging element body, and there is a gap that allows the main engaging element body to displace in the first direction with respect to the input-side engaging portion.

3. The reverse input cutoff clutch according to claim 1, wherein
the main engaging element body further comprises an intermediate plate between the main body plates on both side portions in a second direction, the second direction being orthogonal to both the first direction and the axial direction of the pressed surface, the intermediate plate being held in the axial direction between the pair of main body plates;
the both side portions in the axial direction of the pivot-support shaft is supported by an intermediate portion in the second direction of the pair of main body plates; and
the link member is pivotally arranged in an intermediate portion in the second direction between the pair of main body plates.

4. The reverse input cutoff clutch according to claim 3, wherein
the pressing surface is provided on the intermediate plate.

5. The reverse input cutoff clutch according to claim 1, wherein
the pressing surface is provided on the pair of main body plates.

6. The reverse input cutoff clutch according to claim 1, wherein
the pivot-support shaft has both side portions in the axial direction rotatably supported by the pair of main body plates.

7. The reverse input cutoff clutch according to claim 1, wherein
a pair of the engaging elements is provided so as to sandwich the output-side engaging portion from both sides in the radial direction, and the input member has a pair of the input-side engaging portions.

8. The reverse input cutoff clutch according to claim 7, further comprising
a reinforcing member spanning between tip-end portions of each of the input-side engaging portions.

9. The reverse input cutoff clutch according to claim 1, wherein
the output-side engaged portion is configured by a concave portion provided on a side surface of the main engaging element body on a far side from the pressed surface in the first direction;
the inner surface of the concave portion has a pair of guided surfaces on both side portions in the second direction that is orthogonal to both the first direction and the axial direction of the pressed surface, with the pair of guided surfaces facing each other in the second direction;
the output-side engaging portion has a pair of guide surfaces at two locations facing the pair of guided surfaces; and
by the pair of guided surfaces being guided by the pair of guide surfaces when the engaging element displaces in a direction away from the pressed surface in the first direction due to rotational torque being inputted to the input member, the engaging element is restricted so as to move in the second direction.

10. The reverse input cutoff clutch according to claim 9, wherein
the pair of guided surfaces is configured by a pair of concave curved surfaces inclined in directions such that a space between the pair of guided surfaces becomes larger as going in a direction away from the pressed surface in the first direction; and the pair of guide surfaces are configured by a pair of convex curved surfaces that are capable of coming in contact with the pair of concave curved surfaces.

11. A reverse input cutoff clutch, comprising:
a pressed member having a pressed surface around an inner peripheral surface thereof;
an input member having an input-side engaging portion arranged on an inner side in a radial direction of the pressed surface, the input member being coaxially arranged with the pressed surface;
an output member having an output-side engaging portion on the inner side in the radial direction of the pressed surface arranged further on the inner side in the radial direction than the input-side engaging portion, the output member being coaxially arranged with the pressed surface; and
an engaging element having a main engaging element body and a link member, the engaging element being arranged on the inner side in the radial direction of the pressed surface so as to be able to move in a first direction as a direction away from or toward the pressed surface;
the main engaging element body comprising a pressing surface facing the pressed surface, a pivot-supporting portion located on a side nearer to the pressed surface than the input-side engaging portion in the first direction, and an output-side engaged portion engaging with the output-side engaging portion;
the link member comprising a first end portion pivotally linked to the pivot-supporting portion, and a second end portion pivotally linked to the input-side engaging portion;
the engaging element, by the pivot-supporting portion being pulled by the input-side engaging portion through the link member when rotational torque is inputted to the input member, displacing so as to move away from the pressed surface, and by causing the output-side engaged portion to engage with the output-side engaging portion, transmitting the rotational torque inputted to the input member to the output member; and when rotational torque is reversely inputted to the output member, by pressing the pressing surface against the pressed surface due to engagement between the output-side engaging portion and the output-side engaged portion, causing the pressing surface to frictionally engage with the pressed surface;
a pair of the engaging elements being provided so as to sandwich the output-side engaging portion from both sides in the radial direction, and the input member has a pair of the input-side engaging portions, and
the reverse input cutoff clutch further comprising a reinforcing member spanning between tip-end portions of each of the input-side engaging portions.

12. The reverse input cutoff clutch according to claim 11, wherein
the main engaging element body comprises a main body plate, and a pivot-support shaft, the base-end side portion of the pivot-support shaft being supported by the main body plate in a cantilever form;
the pressing surface and the output-side engaged portion are provided on the main body plate; and
the pivot-supporting portion is configured by the pivot-support shaft.

13. The reverse input cutoff clutch according to claim 11, further comprising
a biasing member arranged between the pair of engaging elements and that elastically presses each of the engaging elements in a direction toward the pressed surface.

14. The reverse input cutoff clutch according to claim 13, wherein
the biasing member is a coil spring; and
the main engaging element body has a holding convex portion that holds the coil spring by being inserted into the coil spring.

15. The reverse input cutoff clutch according to claim 14, wherein
the main engaging element body further comprises an intermediate plate between the main body plates on both side portions in a second direction, the second direction being orthogonal to both the first direction and the axial direction of the pressed surface, the intermediate plate being held in the axial direction between the pair of main body plates;
the both side portions in the axial direction of the pivot-support shaft is supported by an intermediate portion in the second direction of the pair of main body plates
the link member is pivotally arranged in an intermediate portion in the second direction between the pair of main body plates;
the main engaging element body further comprises an intermediate plate between the main body plates on both side portions in a second direction, the second direction being orthogonal to both the first direction and the axial direction of the pressed surface, the intermediate plate being held in the axial direction between the pair of main body plates;
the both side portions in the axial direction of the pivot-support shaft is supported by an intermediate portion in the second direction of the pair of main body plates; and
the link member is pivotally arranged in an intermediate portion in the second direction between the pair of main body plates
the intermediate plate of the main engaging element body has the holding convex portion.

16. The reverse input cutoff clutch according to claim 13, wherein
the biasing member is a coil spring; and
the main engaging element body has a holding concave portion that holds the coil spring by an end portion of the coil spring being inserted into the holding concave portion.

17. The reverse input cutoff clutch according to claim 16, wherein
the holding concave portion is open on a far side in the first direction from the pressed surface, and is covered on both sides in the axial direction of the pressed surface.

18. The reverse input cutoff clutch according to claim 16, wherein
the main engaging element body further comprises an intermediate plate between the main body plates on both side portions in a second direction, the second direction being orthogonal to both the first direction and the axial direction of the pressed surface, the intermediate plate being held in the axial direction between the pair of main body plates;
the both side portions in the axial direction of the pivot-support shaft is supported by an intermediate portion in the second direction of the pair of main body plates;
the link member is pivotally arranged in an intermediate portion in the second direction between the pair of main body plates; and
the intermediate plate of the main engaging element body has the holding concave portion.

19. The reverse input cutoff clutch according to claim 18, wherein
- the holding concave portion is configured by a notch provided in an end portion of the intermediate plate on a far side in the first direction from the pressed surface; and
- openings on both sides of the notches in the axial direction of the pressed surface are covered by the pair of main body plates.

* * * * *